United States Patent
McAlister

(10) Patent No.: US 8,669,014 B2
(45) Date of Patent: Mar. 11, 2014

(54) FUEL-CELL SYSTEMS OPERABLE IN MULTIPLE MODES FOR VARIABLE PROCESSING OF FEEDSTOCK MATERIALS AND ASSOCIATED DEVICES, SYSTEMS, AND METHODS

(71) Applicant: McAlister Technologies, LLC, Phoenix, AZ (US)

(72) Inventor: Roy Edward McAlister, Phoenix, AZ (US)

(73) Assignee: McAlister Technologies, LLC, Phoenix, AZ (US)

( * ) Notice: Subject to any disclaimer, the term of this patent is extended or adjusted under 35 U.S.C. 154(b) by 0 days.

(21) Appl. No.: 13/764,346

(22) Filed: Feb. 11, 2013

(65) Prior Publication Data

US 2013/0149621 A1 Jun. 13, 2013

Related U.S. Application Data

(63) Continuation-in-part of application No. 13/584,748, filed on Aug. 13, 2012.

(60) Provisional application No. 61/523,270, filed on Aug. 12, 2011.

(51) Int. Cl.
 *H01M 8/06* (2006.01)
(52) U.S. Cl.
 USPC .......................................................... 429/411
(58) Field of Classification Search
 None
 See application file for complete search history.

(56) References Cited

U.S. PATENT DOCUMENTS

| | | | |
|---|---|---|---|
| 3,613,792 A | 10/1971 | Hyde et al. | |
| 3,633,372 A | 1/1972 | Kimmel et al. | |
| 3,662,832 A | 5/1972 | Keeler et al. | |
| 3,788,389 A | 1/1974 | Waters | |
| 3,807,491 A | 4/1974 | Van Hulsen | |
| 3,840,068 A | 10/1974 | Waters | |

(Continued)

FOREIGN PATENT DOCUMENTS

CN 101042261 A 9/2007
CN 101091900 A 12/2007

(Continued)

OTHER PUBLICATIONS

U.S. Appl. No. 13/685,075, filed Nov. 26, 2012, McAlister.
U.S. Appl. No. 13/684,743, filed Nov. 26, 2012, McAlister.
U.S. Appl. No. 13/832,740, filed Mar. 15, 2012, McAlister.
"Carnot Thermochemical Cycles." Digital image. Wikipedia, the Free Encyclopedia, Published: Aug. 31, 2010. Accessed: Jan. 4, 2011. Printed: May 20, 2011. <http://en.wikipedia.org/wiki/File:Carnot_thermochemical_cycles.PNG>. p. 1.

(Continued)

*Primary Examiner* — Patrick Ryan
*Assistant Examiner* — Jose Colucci Rios
(74) *Attorney, Agent, or Firm* — Perkins Coie LLP

(57) ABSTRACT

Fuel cells for selectively reacting a feedstock material with or without generating electricity, and associated systems and methods are disclosed. A fuel cell system in accordance with a particular embodiment includes a first electrode positioned in a first region, a second electrode positioned in a second region, an ion-transport medium between the first and second regions, and an electrical circuit connected between the first and second electrodes. The system is operable in a first mode to react the feedstock material by a non-electricity-generating reaction to produce a product and in a second mode to react the feedstock material by an electricity-generating reaction to produce electricity. A controller receives an input (e.g., corresponding to a change in demand for electricity) and causes the system to switch between operating in the first mode and operating in the second mode in response to the input.

24 Claims, 22 Drawing Sheets

(56) References Cited

U.S. PATENT DOCUMENTS

| | | |
|---|---|---|
| 3,882,937 A | 5/1975 | Robinson |
| 3,936,652 A | 2/1976 | Levine |
| 3,986,362 A | 10/1976 | Baciu |
| 4,019,868 A | 4/1977 | Sebacher et al. |
| 4,053,576 A | 10/1977 | Fletcher |
| 4,070,861 A | 1/1978 | Scragg et al. |
| 4,099,489 A | 7/1978 | Bradley |
| 4,138,993 A | 2/1979 | Conley |
| 4,158,354 A | 6/1979 | Carden |
| 4,169,460 A | 10/1979 | Popovich et al. |
| 4,172,506 A | 10/1979 | Terry |
| 4,229,184 A | 10/1980 | Gregg |
| 4,257,239 A | 3/1981 | Partin et al. |
| 4,343,338 A | 8/1982 | Hart |
| 4,382,189 A | 5/1983 | Wilson |
| 4,386,801 A | 6/1983 | Chapman et al. |
| 4,401,689 A | 8/1983 | Ban |
| 4,455,045 A | 6/1984 | Wheeler |
| 4,519,342 A | 5/1985 | Yoon |
| 4,549,528 A | 10/1985 | Gibson |
| 4,601,508 A | 7/1986 | Kerian |
| 4,611,847 A | 9/1986 | Sullivan |
| 4,620,580 A | 11/1986 | Groezinger et al. |
| 4,704,267 A | 11/1987 | DiMartino |
| 4,706,651 A | 11/1987 | Yudow |
| 4,746,160 A | 5/1988 | Wiesemeyer |
| 4,848,445 A | 7/1989 | Harper |
| 4,921,580 A | 5/1990 | Martes et al. |
| 4,978,162 A | 12/1990 | Labbe |
| 5,058,945 A | 10/1991 | Elliott, Sr. et al. |
| 5,119,897 A | 6/1992 | Moriwake |
| 5,132,090 A | 7/1992 | Volland |
| 5,222,698 A | 6/1993 | Nelson et al. |
| 5,280,990 A | 1/1994 | Rinard |
| 5,315,868 A | 5/1994 | Jacobi et al. |
| 5,348,774 A | 9/1994 | Golecki et al. |
| 5,407,245 A | 4/1995 | Geropp |
| 5,498,059 A | 3/1996 | Switlik |
| 5,560,443 A | 10/1996 | DuBose |
| 5,618,134 A | 4/1997 | Balch |
| 5,647,877 A | 7/1997 | Epstein |
| 5,881,559 A | 3/1999 | Kawamura |
| 5,882,382 A | 3/1999 | Hachisuka et al. |
| 5,986,429 A | 11/1999 | Mula, Jr. |
| 6,012,065 A | 1/2000 | Boucher et al. |
| 6,068,328 A | 5/2000 | Gazdzinski |
| 6,081,183 A | 6/2000 | Mading et al. |
| 6,089,224 A | 7/2000 | Poulek |
| 6,092,861 A | 7/2000 | Whelan |
| 6,155,212 A | 12/2000 | McAlister |
| 6,200,069 B1 | 3/2001 | Miller |
| 6,216,599 B1 | 4/2001 | Cavanagh |
| 6,220,193 B1 | 4/2001 | Dilks |
| 6,242,752 B1 | 6/2001 | Soma et al. |
| 6,309,010 B1 | 10/2001 | Whitten |
| 6,378,932 B1 | 4/2002 | Fasel et al. |
| 6,409,252 B1 | 6/2002 | Andrus |
| 6,464,755 B2 | 10/2002 | Nakanishi et al. |
| 6,502,533 B1 | 1/2003 | Meacham |
| 6,508,209 B1 | 1/2003 | Collier, Jr. |
| 6,531,704 B2 | 3/2003 | Yadav et al. |
| 6,534,210 B2 * | 3/2003 | Luken et al. ............ 429/429 |
| 6,571,747 B1 | 6/2003 | Gerstweiler |
| 6,585,785 B1 | 7/2003 | Warren et al. |
| 6,749,043 B2 | 6/2004 | Brown et al. |
| 6,756,140 B1 | 6/2004 | McAlister |
| 6,838,782 B2 | 1/2005 | Vu |
| 6,854,788 B1 | 2/2005 | Graham |
| 6,881,508 B2 | 4/2005 | Penev |
| 6,886,249 B2 | 5/2005 | Smalc |
| 6,897,575 B1 | 5/2005 | Yu |
| 6,908,297 B2 | 6/2005 | Dafft et al. |
| 6,919,062 B1 | 7/2005 | Vasileiadis et al. |
| 6,923,004 B2 | 8/2005 | Chandran et al. |
| 6,926,345 B2 | 8/2005 | Ortega et al. |
| 6,979,049 B2 | 12/2005 | Ortega et al. |
| 7,014,737 B2 | 3/2006 | Harutyunyan et al. |
| 7,033,570 B2 | 4/2006 | Weimer et al. |
| 7,051,794 B2 | 5/2006 | Luo |
| 7,140,181 B1 | 11/2006 | Jensen et al. |
| 7,152,908 B2 | 12/2006 | Shahbazi |
| 7,165,804 B2 | 1/2007 | Shahbazi |
| 7,185,944 B2 | 3/2007 | Shahbazi |
| 7,207,620 B2 | 4/2007 | Cosgrove et al. |
| 7,210,467 B2 | 5/2007 | Kweon et al. |
| 7,211,905 B1 | 5/2007 | McDavid, Jr. |
| 7,237,827 B2 | 7/2007 | Shahbazi |
| 7,243,980 B2 | 7/2007 | Vala |
| 7,250,151 B2 | 7/2007 | Tonkovich et al. |
| 7,293,533 B2 | 11/2007 | Hemsath |
| 7,337,612 B2 | 3/2008 | Skinnes et al. |
| 7,420,004 B2 | 9/2008 | Hardy et al. |
| 7,449,158 B2 | 11/2008 | Haueter et al. |
| 7,484,553 B2 | 2/2009 | Lai et al. |
| 7,527,094 B2 | 5/2009 | McKinzie et al. |
| 7,568,479 B2 | 8/2009 | Rabinowitz |
| 7,585,339 B2 | 9/2009 | Dahl et al. |
| 7,628,137 B1 | 12/2009 | McAlister |
| 7,692,170 B2 | 4/2010 | Gaus et al. |
| 7,714,258 B2 | 5/2010 | Dalton |
| 7,753,122 B2 | 7/2010 | Curlett |
| 7,775,261 B2 | 8/2010 | Valenzuela |
| 7,788,924 B2 | 9/2010 | Hines |
| 7,789,182 B2 | 9/2010 | Bradley et al. |
| 7,808,121 B1 | 10/2010 | Glynn |
| 7,884,308 B1 | 2/2011 | Mejia |
| 7,943,045 B2 | 5/2011 | Rohrich et al. |
| 7,955,478 B2 | 6/2011 | McClure |
| 7,971,861 B2 | 7/2011 | Soininen |
| 8,053,916 B2 | 11/2011 | Edwards et al. |
| 8,083,520 B2 | 12/2011 | Mueller et al. |
| 8,136,740 B2 | 3/2012 | Hagen et al. |
| 8,187,549 B2 | 5/2012 | McAlister |
| 8,187,550 B2 | 5/2012 | McAlister |
| 8,220,539 B2 | 7/2012 | Vinegar et al. |
| 8,318,100 B2 | 11/2012 | McAlister |
| 8,318,131 B2 | 11/2012 | McAlister |
| 8,318,269 B2 | 11/2012 | McAlister |
| 8,449,634 B2 | 5/2013 | Tamura et al. |
| 2001/0044043 A1* | 11/2001 | Badding et al. ............ 429/40 |
| 2002/0102188 A1 | 8/2002 | Hsu et al. |
| 2003/0008183 A1 | 1/2003 | Hsu |
| 2003/0178195 A1 | 9/2003 | Agee et al. |
| 2004/0020125 A1* | 2/2004 | Retallick et al. ............ 48/198.7 |
| 2004/0131912 A1* | 7/2004 | Keefer et al. ............ 429/34 |
| 2004/0200618 A1 | 10/2004 | Piekenbrock |
| 2004/0219737 A1 | 11/2004 | Quon |
| 2004/0247957 A1 | 12/2004 | Hatano et al. |
| 2004/0253168 A1 | 12/2004 | Chu |
| 2004/0265448 A1 | 12/2004 | Shiau et al. |
| 2004/0266615 A1 | 12/2004 | Watson et al. |
| 2005/0029120 A1 | 2/2005 | Bar-Gadda |
| 2005/0061486 A1 | 3/2005 | Yang |
| 2005/0079977 A1 | 4/2005 | Choi et al. |
| 2005/0265919 A1 | 12/2005 | Lomax et al. |
| 2005/0272856 A1 | 12/2005 | Cooper et al. |
| 2006/0005738 A1 | 1/2006 | Kumar |
| 2006/0005739 A1 | 1/2006 | Kumar |
| 2006/0048808 A1 | 3/2006 | Ruckman et al. |
| 2007/0031718 A1 | 2/2007 | Fujimura et al. |
| 2007/0065686 A1 | 3/2007 | Fan et al. |
| 2007/0077462 A1* | 4/2007 | Warner et al. ............ 429/13 |
| 2007/0138006 A1 | 6/2007 | Oakes et al. |
| 2007/0175680 A1* | 8/2007 | Gouker ............ 180/65.3 |
| 2007/0191664 A1 | 8/2007 | Hershkowitz et al. |
| 2007/0205298 A1 | 9/2007 | Harrison et al. |
| 2007/0264184 A1* | 11/2007 | Krass ............ 423/345 |
| 2008/0086946 A1 | 4/2008 | Weimer et al. |
| 2008/0170975 A1 | 7/2008 | Ahn et al. |
| 2008/0175766 A1 | 7/2008 | Mankins et al. |
| 2008/0295883 A1 | 12/2008 | Ducellier et al. |
| 2009/0062591 A1 | 3/2009 | Bingue et al. |
| 2009/0206666 A1* | 8/2009 | Sella et al. ............ 307/43 |
| 2009/0258278 A1 | 10/2009 | Steinberg |

(56) References Cited

U.S. PATENT DOCUMENTS

| | | |
|---|---|---|
| 2009/0313886 A1 | 12/2009 | Hinman et al. |
| 2010/0000874 A1 | 1/2010 | Hinman et al. |
| 2010/0043404 A1 | 2/2010 | Hebbale et al. |
| 2010/0107994 A1 | 5/2010 | Moriarty et al. |
| 2010/0140950 A1 | 6/2010 | Pitre |
| 2010/0174124 A1 | 7/2010 | Tonkovich et al. |
| 2010/0255392 A1* | 10/2010 | Spear et al. ............ 429/421 |
| 2011/0061295 A1 | 3/2011 | McAlister |
| 2011/0061383 A1 | 3/2011 | McAlister |
| 2011/0200516 A1 | 8/2011 | McAlister |
| 2011/0203776 A1 | 8/2011 | McAlister |
| 2011/0206565 A1 | 8/2011 | McAlister |
| 2011/0220040 A1 | 9/2011 | McAlister |
| 2012/0118878 A1 | 5/2012 | Kim et al. |
| 2012/0119510 A1 | 5/2012 | Herzen et al. |
| 2013/0094909 A1 | 4/2013 | McAlister |
| 2013/0098035 A1 | 4/2013 | McAlister |
| 2013/0101492 A1 | 4/2013 | McAlister |
| 2013/0101502 A1 | 4/2013 | McAlister |
| 2013/0101908 A1 | 4/2013 | McAlister |
| 2013/0136658 A1 | 5/2013 | McAlister |
| 2013/0145761 A1 | 6/2013 | McAlister |
| 2013/0149208 A1 | 6/2013 | McAlister |
| 2013/0149621 A1 | 6/2013 | McAlister |
| 2013/0153399 A1 | 6/2013 | McAlister |
| 2013/0156504 A1 | 6/2013 | McAlister |
| 2013/0158828 A1 | 6/2013 | McAlister |
| 2013/0174486 A1 | 7/2013 | McAlister |
| 2013/0213256 A1 | 8/2013 | McAlister |

FOREIGN PATENT DOCUMENTS

| | | |
|---|---|---|
| CN | 101597025 A | 12/2009 |
| EA | 200702287 A1 | 4/2008 |
| EP | 1658892 | 5/2006 |
| JP | 59046375 | 3/1984 |
| JP | 2001181846 A | 7/2001 |
| JP | 2001262353 A | 9/2001 |
| JP | 03215670 B2 | 10/2001 |
| JP | 2003040601 A | 2/2003 |
| JP | 2003166059 A | 6/2003 |
| JP | 2005511467 A | 6/2003 |
| JP | 2005021876 A | 1/2005 |
| JP | 2005213069 A | 8/2005 |
| JP | 2007254180 A | 10/2007 |
| JP | 2010003568 A | 1/2010 |
| JP | 2010006653 A | 1/2010 |
| JP | 2010025031 A | 2/2010 |
| KR | 100794943 B1 | 1/2008 |
| RU | 2011864 C1 | 4/1994 |
| RU | 2120913 C1 | 10/1998 |
| RU | 2312059 C1 | 12/2007 |
| RU | 2403379 C1 | 11/2010 |
| SU | 1498908 A1 | 8/1989 |
| SU | 1776298 | 11/1992 |
| WO | WO-2008031488 A1 | 3/2008 |
| WO | WO-2008035776 A1 | 3/2008 |
| WO | WO-2009098375 A1 | 8/2009 |

OTHER PUBLICATIONS

"Closed Loop Thermochemical Energy Storage System Using Ammonia." Australian National University College of Engineering & Computer Science—Solar Thermal Group. Accessed: Jan. 4, 2011. Printed: May 20, 2011. <http://solar-thermal.anu.edu.au/high-temperature/thermochemical-energy-storage/>. pp. 1-2.

"SI Cycle." Digital image. Sandia National Laboratories: Energy, Resources and Nonproliferation. Accessed: Jan. 4, 2011. Printed: Jun. 13, 2011. <http://www.sandia.gov/ERN/images/SI-cycle2.jpg>. p. 1.

"Solar Hydrogen." Digital image. Swiss Federal Institute of Technology, Department of Mechanical and Process Engineering, Zurich. Accessed: Jan. 4, 2011. Printed: May 23, 2011. p. 1. <http://www.pre.ethz.ch/research/projects/imgs/solarhydro_1.jpg>.

"The Carbon Cycle : Feature Articles." NASA Earth Observatory : Home. Web. Accessed: Jul. 1, 2010. Printed: Jun. 13, 2011. 12 Pages. <http://earthobservatory.nasa.gov/Features/CarbonCycle>.

"The Solar Zinc Route." Digital image. Swiss Federal Institute of Technology, Department of Mechanical and Process Engineering, Zurich. Accessed: Jan. 4, 2011. Printed: May 20, 2011. <http://www.pre.ethz.ch/research/projects/imgs/solzinc_1.jpg>. p. 1.

"Zinc Zinc-oxide Thermochemical Cycle." Digital image. Wikipedia, the Free Encyclopedia, Published: Dec. 21, 2008. Accessed: Jan. 4, 2011. Printed: May 20, 2011. <http://en.wikipedia.org/wiki/File:Zinc_zinc-oxide_thermochemical_cycle.jpg>. p. 1.

Chen et al. "Thermochemistry Concept Map." Teacherknowledge Wikispace, Published: Nov. 20, 2006. <http://teacherknowledge.wikispaces.com/file/view/Thermochemistry+concept+map+-+Extended.pdf>. p. 1.

Food and Agriculture Organization of the United Nations. "Carbon Sequestration Options under the Clean Development Mechanism to Address Land Degradation." World Soil Resources Reports. Rome, 2000. pp. 1-45.

Foust et al. "An Economic and Environmental Comparison of a Biochemical and a Thermochemical Lignocellulosic Ethanol Conversion Processes." Cellulose, vol. 16, Issue 4. Jun. 10, 2009. pp. 547-565.

Funk, James E. "Thermochemical Processes for the Production of Hydrogen from Water." College of Engineering, University of Kentucky, Lexington, Kentucky. 1975. pp. 1-9.

Hackett et al. "Evaluation of Conversion Technoloigy Processes and Products: Appendix A—Discussion of Thermochemical Process Definitions." University of California, Davis. Sep. 2004. pp. 1-7.

International Search Report and Written Opinion for PCT Application No. PCT/US2012/050657; Date of Mailing: Feb. 15, 2013; 12 pages.

Kasting, James F. "The Carbon Cycle, Climate, and the Long-Term Effects of Fossil Fuel Burning." U.S. Global Change Research Information Office. 1998. Web. Accessed: Jul. 1, 2010. Printed: Jun. 13, 2011. <http://www.gcrio.org/CONSEQUENCES/vol4no1/carbcycle.html>.

Solar Collectors, Energy Storage, and Materials, pp. 443-444 (DeWinter, Francis, 1991).

U.S. Energy Information Administration."Greenhouse Gases—Energy Explained, Your Guide to Understanding Energy." Web. Accessed: Jul. 1, 2010. Printed: Jun. 13, 2011. 1 Pages. <http://www.eia.gov/energyexplained/index.cfm?page=environment_about_ghg>.

US Environmental Protection Agency. "Cap and Trade." Web. Accessed: Jul. 1, 2010. Printed: Jun. 13, 2011. <http://www.epa.gov/captrade/>.

US Environmental Protection Agency. "Carbon Dioxide—Geologic Sequestration | Climate Change—Greenhouse Gas Emissions | U.S. EPA." Web. Accessed: Jul. 1, 2010. Printed: Jun. 13, 2011. <http://www.epa.gov/climatechange/emissions/co2_geosequest.html>.

US Environmental Protection Agency. "Carbon Dioxide | Climate Change—Greenhouse Gas Emissions | U.S. EPA". Web. Accessed: Jul. 1, 2010. Printed: Jun. 13, 2011. 1 Page. <http://www.epa.gov/climatechange/emissions/co2.html>.

US Environmental Protection Agency. "EPA Preliminary Analysis of the Waxman-Markey Discussion Draft". Web. Accessed: Jul. 1, 2010. Printed: Jun. 13, 2011. <http://www.epa.gov/climatechange/economics/pdfs/WM-Analysis.pdf>.

Vegners, Raimonds Maris; "Collodial Carbon and Silica : Their Use in Solar Energy" Table of Contents and Introduction of Thesis, University of Sydney, Feb. 1985, 5 pages.

Wikipedia > Aerogel > Carbon—"Carbon aerogels are also extremely 'black' in the infrared spectrum, reflecting only 0.3% of radiation between 250 nm and 14.3 μm, making them efficient for solar energy collectors," 1 page, viewed in 2011 as provided by Attorney Theodore Baker on Oct. 30, 2013.

* cited by examiner

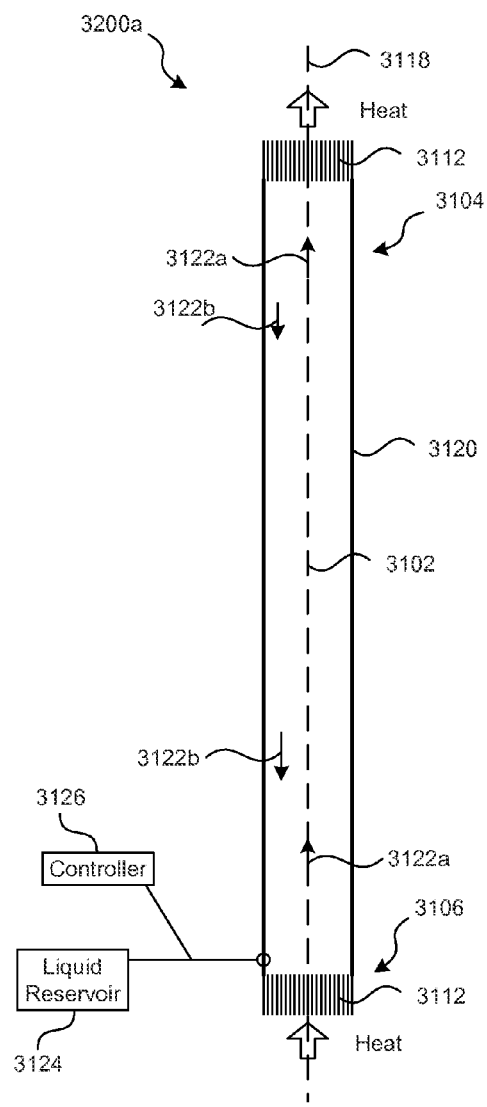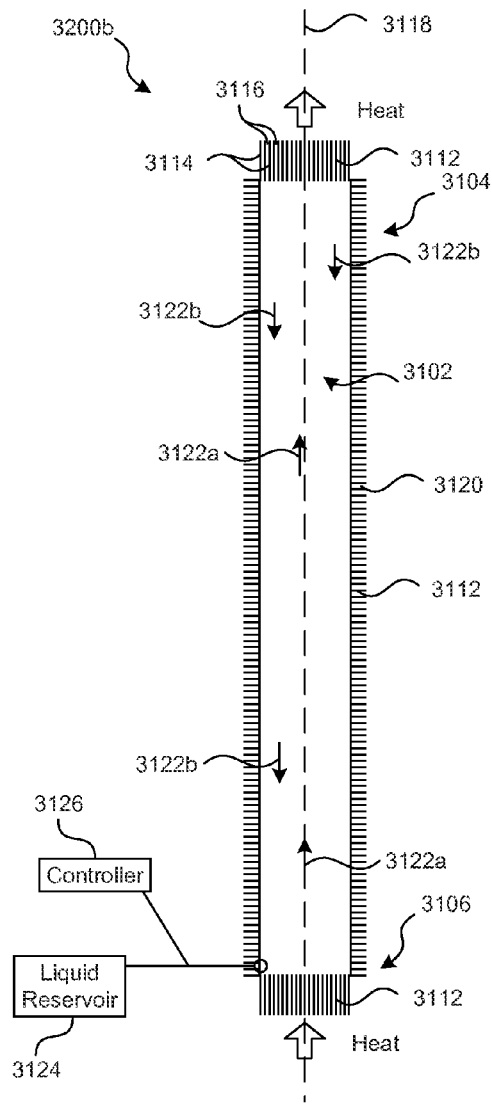
*FIG. 11A*  *FIG. 11B*

FUEL-CELL SYSTEMS OPERABLE IN MULTIPLE MODES FOR VARIABLE PROCESSING OF FEEDSTOCK MATERIALS AND ASSOCIATED DEVICES, SYSTEMS, AND METHODS

CROSS-REFERENCE TO RELATED APPLICATION

The present disclosure is a continuation-in-part of prior U.S. application Ser. No. 13/584,748, filed Aug. 13, 2012, which claims priority to U.S. Provisional Application No. 61/523,270, filed Aug. 12, 2011. The foregoing applications are incorporated herein by reference. To the extent the foregoing applications and/or any other materials incorporated herein by reference conflict with the present disclosure, the preset disclosure controls.

TECHNICAL FIELD

The present disclosure is directed generally to devices, systems, and methods for variable processing of feedstock materials to form useful reaction products and/or to generate electricity. In a particular embodiment, a fuel cell and a fuel-cell system are operable in a first mode for thermally decomposing a feedstock material without generating electricity and in a second mode for utilizing portions of the feedstock material and generating electricity. For example, a hydrocarbon feedstock material can decompose thermally to form hydrogen and carbon (e.g., as a structural material) in a first mode and electrolytically form carbon dioxide, electrical current, and water in a second mode. In another example, a silane feedstock material can thermally decompose to form hydrogen and silicon (e.g., as a structural material) in a first mode and electrolytically form silicon dioxide, electrical current, and water in a second mode.

BACKGROUND

Renewable energy sources such as solar, wind, wave, falling water, and biomass have tremendous potential, but various technical challenges have prevented their widespread adoption. For example, using renewable energy sources in the production of electricity is dependent on the availability of the energy sources, which can be intermittent. Solar energy is limited by the sun's availability (i.e., daytime only); wind energy is limited by the variability of wind; falling water energy is limited by droughts; and biomass energy is limited by seasonal variances. As a result of these and other factors, much of the energy from renewable sources, captured or not captured, tends to be wasted.

The inefficiencies associated with conventional approaches to capturing and storing energy often lead to high costs for producing energy from renewable energy sources. These high costs limit the widespread adoption of renewable energy sources in many regions of the world. Thus, the world continues to rely on oil and other fossil fuels as primary energy sources because, at least in part, government subsidies and other programs supporting technology developments associated with fossil fuels make it deceptively convenient and seemingly inexpensive to use such fuels. At the same time, the replacement cost for the expended resources, and the costs of environmental degradation, health impacts, and other byproducts of fossil-fuel use are not included in the purchase price of the energy resulting from these fuels.

In light of the foregoing and other drawbacks currently associated with sustainably using renewable resources, there remains a need for improving the efficiencies and commercial viabilities of producing products and fuels with such resources.

BRIEF DESCRIPTION OF THE DRAWINGS

FIGS. 11A and 11B are schematic cross-sectional views of thermal transfer devices configured in accordance with other embodiments of the present technology.

DETAILED DESCRIPTION

1. Overview

Figure 1:
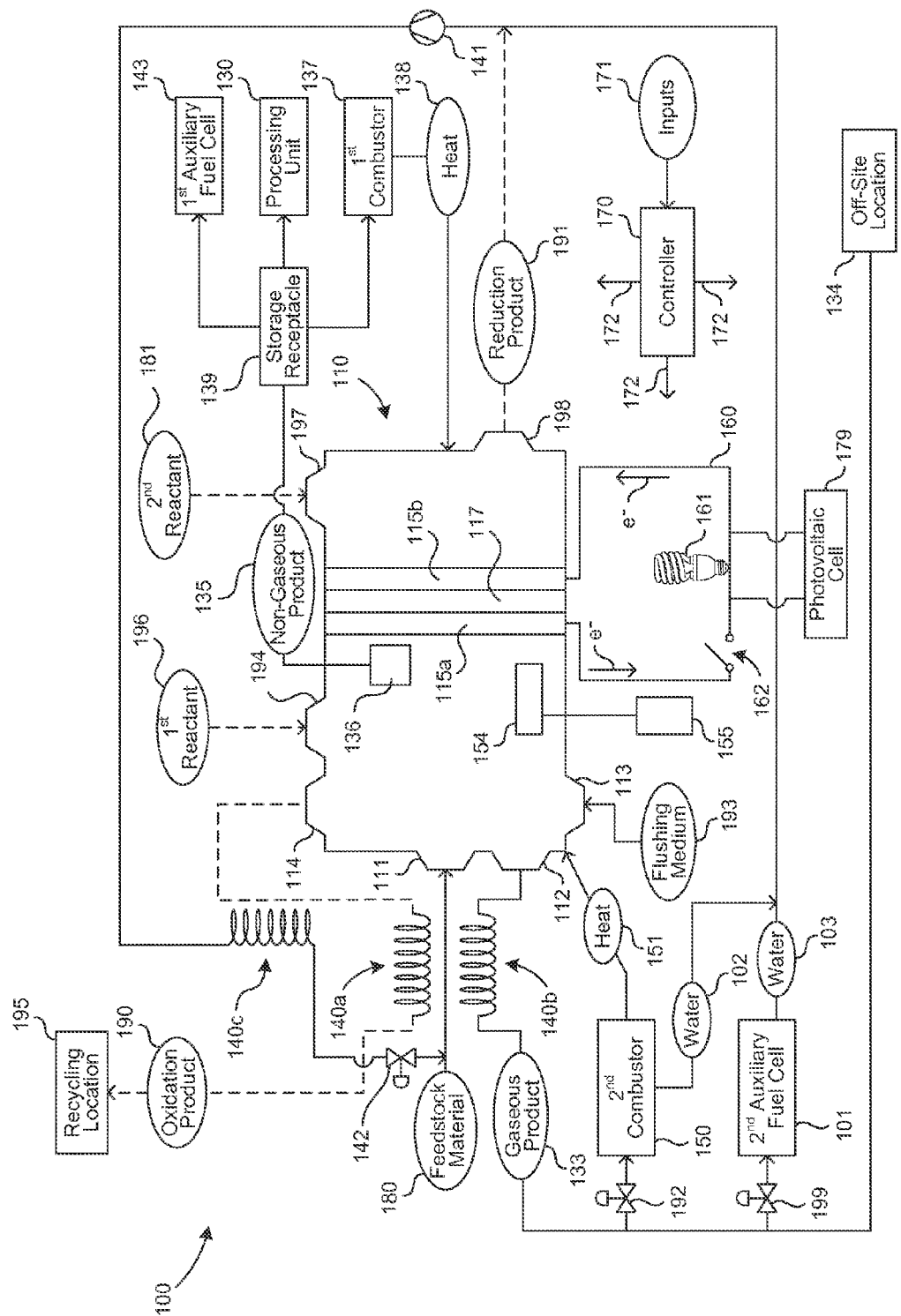
FIG. 1 is a schematic block diagram of a fuel-cell system configured in accordance with an embodiment of the presently disclosed technology.

Several examples of devices, systems, and methods for carrying out reactions within fuel cells and upstream and/or downstream of fuel cells in fuel-cell systems are described below. In some embodiments, a fuel-cell system and/or a fuel cell within the fuel-cell system can be used in accordance with multiple operational modes. For example, a first mode can include performing a non-electricity-generating reaction on a feedstock material to produce one or more first-mode reaction products. In some embodiments, the non-electricity-generating reaction can be a thermal-decomposition reaction. A second mode can include performing an electricity-generating reaction on a feedstock material to produce one or more second-mode reaction products and electrical current. In some embodiments, the electricity-generating reaction can be an electrolytic-decomposition reaction. In the case of hydrocarbon feedstock materials, for example, the first mode can be an internal-reforming mode and the second mode can be a direct-hydrocarbon fuel cell mode. Furthermore, with respect to hydrocarbon and non-hydrocarbon feedstock materials, the first mode can be a chemical-production mode (e.g., primarily directed to the production of chemical fuels, precursors, and/or other useful chemical products) and the second mode can be an electricity-production mode (e.g., primarily directed to the production of electrical current).

Reaction products from operation in the first and/or second modes can be put to a variety of suitable non-wasteful uses. The reaction products from operation in the first mode can include, for example, gaseous fuels (e.g., hydrogen), other useful gaseous materials (e.g., halogen gases), and/or useful non-gaseous materials (e.g., carbon and/or silicon). Particular embodiments are described below in the context of producing non-gaseous materials, e.g., that are collected at a material collector of the fuel-cell system. In other embodiments, the collector can collect gaseous materials. The reaction products from operation in the second mode can include, for example, useful oxidation products (e.g., carbon dioxide, carbon monoxide, silicon dioxide, and halogen gases) and/or useful reduction products (e.g., water and hydrogen halides). Accordingly, fuel-cell systems configured in accordance with at least some embodiments of the present technology can produce clean-burning chemical fuel (e.g., hydrogen), repurpose carbon, silicon, and/or other constituents of feedstock materials (e.g., for use in durable goods), and generate electricity. In some cases, constituents of feedstock materials can be used (e.g., in durable goods) without further processing. In other cases, constituents of feedstock materials can be further processed into polymers, carbon composites, and/or other useful materials. Although the following description provides many specific details of representative examples in a manner sufficient to enable a person skilled in the relevant art to practice, make, and use the representative examples, several of the details and advantages described below may not be necessary with respect to certain examples of the present technology. Additionally, the present technology may include other examples that are not described here in detail.

References throughout this specification to "one example," "an example," "one embodiment," or "an embodiment" mean that a particular feature, structure, process, or characteristic described in connection with the example is included in at least one example of the present technology. Thus, the occurrences of the phrases "in one example," "in an example," "one embodiment," "an embodiment," or the like in various places throughout this specification are not necessarily all referring to the same example. Furthermore, the particular features, structures, routines, steps, or characteristics may be combined in any of a number of suitable manners in one or more examples of the present technology. The headings provided herein are for convenience only and are not intended to limit or define the scope or meaning of the present technology.

Certain embodiments of the present technology described below may take the form of computer-executable instructions, including routines executed by a programmable computer or controller. Those skilled in the relevant art will appreciate that the present technology can be practiced on computer or controller systems other than those shown and described below. Furthermore, the present technology can be embodied in a special-purpose computer, controller, or data processor that is specifically programmed, configured, or constructed to perform one or more of the computer-executable instructions described below. Accordingly, the terms "computer" and "controller" as generally used herein refer to any data processor and can include internet appliances, handheld devices, multi-processor systems, programmable consumer electronics, network computers, mini-computers, and the like. The present technology can also be practiced in distributed environments where tasks or modules are performed by remote processing devices that are linked through a communications network. Aspects of the present technology described below may be stored or distributed on computer-readable media, including magnetic or optically readable or removable computer discs as well as media distributed electronically over networks. In particular embodiments, data structures and transmissions of data particular to aspects of the present technology are also encompassed within the scope of the present technology. The present technology encompasses methods of both programming computer-readable media to perform particular steps and executing the steps.

2. Representative Fuel-Cell Systems and Associated Methodologies

FIG. 1 is a schematic block diagram illustrating selected components of a fuel-cell system 100 configured in accordance with an embodiment of the present technology. The system 100 can include a fuel cell 110 (e.g., a first fuel cell) that performs multiple functions. In some embodiments, the system 100 includes a first electrode 115a, a second electrode 115b, and an ion-transport medium 117 (e.g., an electrolyte or an electrolyte membrane) between the first and second electrodes 115a, 115b. Depending on selected operations of the system 100, the first electrode 115a can serve as an anode and the second electrode 115b can serve as a cathode, the first electrode 115a can serve as a cathode and the second electrode 115b can serve as an anode, or the first and second electrodes 115a, 115b can function as neither anodes nor cathodes (e.g., the first and second electrodes 115a, 115b can be electrically dormant). The ion-transport medium 117, for example, can be a polymer membrane, an aqueous alkaline solution, a molten carbonate, a ceramic oxide (e.g., alumina or zirconium oxide), a spinel, a nanostructure, or another material suitable for ion-transport.

The system 100 can receive a feedstock material 180 directed from a feedstock source (not shown) to a first port 111 of the fuel cell 110. Although particular examples are described below primarily in the context of hydrocarbon feedstock materials 180, other suitable feedstock materials 180 can also be used. In some embodiments, the feedstock material 180 can include a compound containing hydrogen, a halogen, boron, nitrogen, a transition metal, or a combination thereof, as constituent elements. Suitable feedstock materials 180 can include, for example, hydrocarbons (e.g., methane), boranes (e.g., diborane), silanes (e.g., monosilane), nitrogen-containing compounds (e.g., ammonia), sulfides (e.g., hydrogen sulfide), alcohols (e.g., methanol), alkyl halides (e.g., carbon tetrachloride, chloroform, dichloromethane, fluorocarbons (e.g., carbon tetrafluoride), and chlorofluorocarbons), aryl halides (e.g., chlorobenzene), and hydrogen halides (e.g., hydrochloric acid), among others. In some cases, the feedstock material 180 can be a manmade or natural source of embodied energy or material that would otherwise be wasted or underutilized. Furthermore, the feedstock material 180 may be an environmental contaminant (e.g., a toxic substance and/or a contributor to climate change). Accordingly, in some cases, the system 100 can be used in the context of environmental remediation or waste processing.

In some embodiments, the system 100 can be configured for use in close proximity to a suitable source of the feedstock material 180. For example, the system 100 can be configured for use near a landfill for processing methane that would otherwise be flared or released into the atmosphere. As another example, the system 100 can be configured for use underwater or on a floating or anchored platform for processing ocean biomass and/or methane hydrates from the ocean floor. Similarly, the system 100 can be configured for processing stranded well gas at oil fields, methane hydrates from permafrost sources, and/or other feedstock materials 180 that would otherwise be wasted or underutilized. In some embodiments, the system 100 can be configured to be moved to new sources of feedstock material 180 as old sources of feedstock material 180 are depleted. For example, the system 100 can be configured for use on or with a floating platform that moves (e.g., under automated control) to different sources of oceanic biomass or methane hydrates. In other embodiments, the system 100 can be configured for stationary use. When operated underwater, certain input and outlet streams to and from the system 100, respectively, can travel via conduits that extend between the system 100 and a suitable above-water location.

With a few exceptions, most conventional fuel cells are configured for consumption of hydrogen. Hydrogen, however, can be costly to produce using conventional methods (e.g., steam reforming), and costly to store and to transport. Accordingly, using non-hydrogen feedstock materials 180 in the system 100 has the potential to reduce capital and operational costs of the system 100 relative to many conventional fuel-cell systems. As disclosed herein, use of non-hydrogen feedstock materials 180 can also facilitate operation of the fuel cell 110 in multiple modes. For example, the fuel cell 110 can operate in accordance with a first mode that emphasizes producing chemical fuels, structural materials, and/or other useful chemical products and a second mode that emphasizes producing electrical current. In FIG. 1, for purposes of illustration, flow paths typically associated with the first mode or both the first mode and the second mode are shown in solid lines and flow paths typically associated with the second mode are shown in broken lines. Although non-hydrogen feedstock materials 180 are useful in some embodiments, the system 100 can also be used with hydrogen as the feedstock material 180. For example, when hydrogen is the feedstock material 180, the system 100 can be configured to non-electrolytically react the hydrogen in the first mode to produce useful chemical products and electrolytically react the hydrogen in the second mode to produce electricity.

The degree to which the system 100 emphasizes the first mode or the second mode can be directed by a controller 170, as described in further detail below. Generally, in the first mode, the feedstock material 180 can be reacted (e.g., thermally decomposed) within the fuel cell 110 to form a gaseous product 133 and a non-gaseous (e.g., liquid and/or solid) product 135. For example, silane can be thermally decomposed to form hydrogen as the gaseous product 133 and silicon as the non-gaseous product 135. In other embodiments, the feedstock material 180 can be reacted within the fuel cell 110 to form only gaseous products 133 or only non-gaseous products 135. For example, suitable hydrogen halides can be thermally decomposed to form a combination of hydrogen and halogen gas as the gaseous product 133 with no accompanying non-gaseous product 135. In some embodiments, the gaseous product 133 can include a gaseous fuel (e.g., hydrogen) and/or the non-gaseous product 135 can include an elemental material (e.g., carbon or silicon). The gaseous product 133 can be directed through a second port 112 of the fuel cell 110, and the non-gaseous product 135 can be collected at a material collector 136 within the fuel cell 110. For example, carbon can be collected at the material collector 136 as pyrolytic carbon, graphene, graphite, and/or other suitable carbon-based materials. In addition to decomposition reactions, the system 100 can also be configured to perform other suitable reactions in the first mode. For example, when the feedstock material is hydrogen, the system 100 can be configured to react the hydrogen with a reactant (not shown) during operation of the system 100 in the first mode to produce the non-gaseous product 135 and/or the gaseous product 133.

In some embodiments, the non-gaseous product 135 can be further processed in a processing unit 130. For example, the non-gaseous product 135 can be a structural building block that can be further processed in the processing unit 130 to produce a useful material (not shown), examples of which can include ceramics, carbon structures, polymeric structures, films, fibers (e.g., carbon fibers and silicon fibers), and filters, among others. Processing in the processing unit 130 can include reaction with other materials (not shown), combination with other materials (e.g., mixing or coating), annealing, and shaping (e.g., molding), among other types of processing. This processing can utilize an energy source from within the system 100, such as electricity from operation of the fuel cell 110 when the system 100 is operating in the second mode. The efficiency of the system 100 and/or the ability of the system 100 to harvest energy that would otherwise be wasted can make energy-intensive processing economically viable. In a particular example, processing in the processing unit 130 includes annealing a carbon-based non-gaseous product 135. In another example, processing in the processing unit 130 includes sputtering a coating onto a carbon-based non-gaseous product 135.

The non-gaseous product 135 is typically relatively pure as it exits the fuel cell 110 and, in some cases, can be further refined, distilled, separated, and/or otherwise purified in the processing unit 130. Highly pure forms of the non-gaseous product 135 can be especially well suited for forming semiconductor devices, photo-optical sensors, and filaments for optical transmission, among other products. The non-gaseous product 135 can also be used without further processing. The non-gaseous product 135 and/or the useful material can be structural or non-structural. For example, when the non-gaseous product 135 includes silicon, the silicon can be reacted with nitrogen (e.g., from air) or with a halogen gas (e.g., recycled from a separate industrial process) to form silicon nitride as a structural material or to form a silicon halide as a non-structural material. Additional details regarding processing silicon are provided below.

In some cases, the non-gaseous product 135 can be used as a fuel. For example, the non-gaseous product 135 can be oxidized, e.g., in the presence of air (not shown), in a first combustor 137 to generate heat 138 and combustion products (not shown), e.g., carbon dioxide or silicon dioxide. In a particular example, the fuel cell 110 is operated anaerobically in the first mode and the first combustor 137 includes an aerobic reaction chamber proximate the fuel cell 110 such that the heat 138 from the first combustor 137 is released primarily into the fuel cell 110. This can be useful when the fuel cell 110 is a solid-oxide fuel cell, a molten-carbonate fuel cell, or another type of high-temperature fuel cell. The combustion products from the first combustor 137 can be further processed and/or directly put to various suitable uses. For example, when the combustion products include silicon dioxide, the silicon dioxide can be used to make high-performance glass. Furthermore, rather than being combusted in the first combustor 137, in some cases, the non-gaseous product 135 can be reacted in a split reduction-oxidation reaction within a first auxiliary fuel cell 143. For example, the non-gaseous product 135 can be reacted with a reactant (not shown) to generate one or more products (not shown) and additional electrical energy (not shown). The additional electrical energy, for example, can be provided to the circuit 160.

In some embodiments, all or a portion of the first electrode 115a can serve as the material collector 136. For example, the first electrode 115a can be configured to seed growth (e.g., epitaxial growth) of carbon fibers, silicon pillars, or other suitable structures of the non-gaseous product 135. Furthermore, such structures can be seeded at spaced-apart locations on the first electrode 115a (e.g., in an array) to reduce (e.g., prevent) inhibiting ion transfer through the ion-transport medium 117. In these and other embodiments, the non-gaseous product 135 can be periodically or continuously removed from the fuel cell 110. For example, the surface of the material collector 136 (e.g., the surface of the first electrode 115a) can be periodically or continuously flushed with a suitable flushing medium 193 introduced through a third port 113 of the fuel cell 110. In some embodiments, the flushing medium 193 can be anaerobic, e.g., if oxidation of the non-gaseous product 135 within the fuel cell 110 is not desirable. In other embodiments, the flushing medium 193 can be aerobic. Furthermore, the flushing medium 193 can be a reactant in some cases. For example, conversion of the non-gaseous product 135 into a structural material, conversion of the non-gaseous product 135 into a non-structural material, or oxidation of the non-gaseous product 135 can occur by reaction of the non-gaseous product 135 with the flushing medium 193.

In some cases, reaction of the non-gaseous product 135 and the flushing medium 193 can occur within the fuel cell 110 continuously or periodically and may be directed at specific sites and/or otherwise used to facilitate improved efficiency. For example, when the feedstock material 180 is a hydrocarbon, the fuel cell 110 can operate anaerobically in the first mode to produce hydrogen as the gaseous product 133 and carbon as the non-gaseous product 135. The fuel cell 110 can then switch (e.g., via operation of one or more valves of the system 100) to a flushing mode in which an aerobic flushing medium 193 (e.g., air) is introduced into the fuel cell 110 to oxidize the carbon and thereby release heat into the fuel cell 110. In another example, when the feedstock material 180 is a silane, the fuel cell 110 can operate in the first mode to produce hydrogen as the gaseous product 133 and silicon as the non-gaseous product 135. The fuel cell 110 can then switch to a flushing mode in which nitrogen from a suitable source (e.g., from air) is introduced into the fuel cell 110 as the flushing medium 193 to convert the silicon into silicon nitride as a structural material. In other embodiments, the flushing medium 193 can be a non-reactive carrier (e.g., helium).

In at least some embodiments, materials such as energy crops, forest slash, landfill waste, and/or other organic wastes can be transferred into the system 100 as the feedstock material 180, with or without varying degrees of pre-processing. In some cases, these materials can be anaerobically heated to produce gases such as methane, water vapor, hydrogen, and carbon monoxide, among others. This process and/or other processes can create ash and/or char, which, if allowed to accumulate, can interfere with radiative heating and/or other processes within the fuel cell 110. Accordingly, an ash and/or char residue (not shown) can be collected at an internal ash collector 154 and transferred to an external ash collector 155 (e.g., a receptacle) for various uses such as returning trace minerals to improve crop productivity from hydroponic operations or soil, or as a constituent in concrete formulas. The internal ash collector 154 can be cooled and/or positioned to selectively attract ash and/or char deposits as opposed to other products and/or reactants. The amount of ash and/or char introduced to and removed from the fuel cell 110 typically depends, at least in part, on the composition of the feedstock material 180, with relatively simple and/or pure feedstock materials 180 (e.g., pure methane) producing little or no ash and char. When ash and/or char is produced, collecting the ash and/or char within the fuel cell 110 rather than from products exiting the fuel cell 110 (e.g., from the gaseous product 133 or the non-gaseous product 135) can, in at least some cases, advantageously reduce or eliminate contamination, fouling, and/or other detrimental interference with efficient operation of the fuel cell 110. In at least some embodiments, the rate with which ash and/or char is produced and/or removed from the fuel cell 110 may have little or no effect on reaction rates within the fuel cell 110. Accordingly, in these and other embodiments, the removal of ash and/or char may be less frequent and/or not as closely controlled as the removal of the reaction products.

In addition to removing reaction products to access the reaction products for use and/or further processing, the reaction products can be removed in a manner and/or at a rate that facilitates a reaction taking place within the fuel cell 110. Solid products (e.g., carbon) can be removed, for example, via a conveyor, and fluids (gases and/or liquids) can be removed, for example, via a selective filter or membrane, such as to avoid also removing reactants. As a reaction product is removed, in some cases, the reaction product can exchange heat with one or more incoming reactants (e.g., the feedstock material 180). In addition to pre-heating the reactants, in some cases, this process can contract and/or change the phase of the reaction products, which can further expedite the removal of the reaction products, control (e.g., reduce) the pressure in the fuel cell 110, and/or increase heat transfer (e.g., due to a reaction product releasing its latent heat of vaporization). In some embodiments, water and/or an alcohol within a product stream exiting the fuel cell 110 can be condensed to facilitate removal of the product stream and/or to increase heat transfer to a reactant stream entering the fuel cell 110. In many cases, removing reaction products quickly rather than slowly can increase the rate and/or efficiency of a reaction taking place in the fuel cell 110, e.g., by shifting the shifting the reaction equilibrium toward production of the reaction products.

Equation 1 illustrates an example of a thermal-decomposition reaction for a hydrocarbon feedstock material 180. As shown in Equation 1, the hydrocarbon feedstock material 180 can be decomposed by application of energy (E) to produce hydrogen and carbon. This reaction can occur, for example, within the fuel cell 110 while the system 100 is operating in the first mode.

$$C_xH_y + E \rightarrow xC + 0.5yH_2 \qquad \text{Equation 1}$$

The resulting hydrogen and carbon can be, respectively, the gaseous product 133 and the non-gaseous product 135 shown in FIG. 1. Similar mechanisms can apply to the thermal decomposition of other suitable feedstock materials 180.

As shown in Equations 2 and 3 below, the carbon from the reaction shown in Equation 1 can be oxidized (e.g., in the first combustor 137) to produce carbon monoxide and/or carbon dioxide as the reaction products.

$$C + 0.5O_2 \rightarrow CO \qquad \text{Equation 2}$$

$$C + O_2 \rightarrow CO_2 \qquad \text{Equation 3}$$

The carbon can also be used to produce electricity (e.g., in the first auxiliary fuel cell 143), as further described below, used as a structural material, or used as a reactant for producing a structural material. For example, the carbon can be a reactant for extracting silicon from silica as shown in Equations 4 and/or 5 below.

$$C + SiO_2 \rightarrow CO_2 + Si \qquad \text{Equation 4}$$

$$2C + SiO_2 \rightarrow 2CO + Si \qquad \text{Equation 5}$$

The silica can be obtained from sand, mine tailings, coal plant effluent, or another suitable source. Silicon from the reactions shown in Equations 4 and 5 and/or as the non-gaseous product 135 may be formed, for example, in a granular (e.g., powder) form, which can include controlled amounts of amorphous and/or crystalline material. For example, the operating temperature of the fuel cell 110 can be programmed or otherwise controlled to control when, where, and/or whether the silicon is deposited in amorphous or crystalline form.

In some embodiments, silicon from the system 100 can be reacted to form halogenated silanes or silicon halides, e.g., $SiBrH_3$, $SiBrFH_2$, $SiBrH_3$, $SiBr_3H$, $SiCl_2H_2$, $SiBr_4$, or $SiCl_4$, among others. Furthermore, silicon from the system 100 may be made into various useful products and materials, such as products that are produced from or based on specialized forms of silicon (e.g., fumed silica), silicon-containing organic intermediates, and silicon-containing polymers, among others. Such products can be formed, for example, using suitable processes disclosed in U.S. Pat. Nos. 4,814,155, 4,414,364, 4,243,779, and 4,458,087, which are incorporated herein by reference. Silicon from the system 100 can also be used in the production of various structural materials, such as silicon carbide or silicon nitride, e.g., as shown in Equation 6.

$$3Si + 2N_2 \rightarrow Si_3N_4 \qquad \text{Equation 6}$$

Silicon nitride articles can be formed, for example, using silicon powders that are slip cast, pressure compacted, or injection molded and then converted into silicon nitride. Similarly, silicon carbide can be pressed into a mold with aluminum powder to form a molded composite.

Articles formed using silicon, carbon, and/or other materials from the system 100 can have density, fatigue, endurance, dielectric, chemical resistance, and/or other properties well suited for a variety of high-performance applications. For example, silicon nitride from the system 100 can be formed into a crucible for molten glass. Silicon-nitride-based durable goods can be used, for example, in thermally and electrically insulating components that have lower densities and can operate at higher operating temperatures than certain metal alloys (e.g., steel) typically used in valves, rocket engines, gas turbines, and positive-displacement combustion engines. Composites including silicon carbide and aluminum can be used, for example, to replace cobalt alloys for producing wind turbine blades, among other products. Replacing metal alloys, which typically consume critical supplies of cobalt, nickel, refractory metals, rare earths, and/or other materials in short supply with silicon nitride and/or carbon components from the system 100, can enable far more cost-effective production of engines, fuel cells, and other equipment. In a particular example, due to the relative abundance of silica (e.g., from sand) and nitrogen gas (e.g., from air), the system 100 can be configured to economically produce silicon-nitride-based products via the reactions shown in Equations 4-6 in environments (e.g., remote environments) where energy is available but most raw materials are scarce.

In addition to forming inorganic materials, the system 100 can form a variety of useful organic materials. For example, the feedstock material 180 can include propane or propylene, which can be reacted with ammonia in the first mode according to the reactions shown in Equations 7 and 8 to form acrylonitrile and hydrogen as the gaseous products 133 or electrolytically disassociated in the second mode to generate electricity.

$$C_3H_8 + NH_3 \rightarrow CH_2=CH-C\equiv N + 4H_2 \qquad \text{Equation 7}$$

$$CH_3-CH=CH_2 + NH_3 \rightarrow CH_2=CH-C\equiv N + 3H_2 \qquad \text{Equation 8}$$

Subsequent processing of gaseous products 133 including acrylonitrile can include reacting the acrylonitrile to form polymers, rubbers, carbon fiber, and/or other materials well suited for use in durable goods (e.g., equipment to harness solar, wind, moving water, or geothermal energy). Accordingly, the overall energetics of processing propane or propylene using the system 100 can be significantly more favorable than simple combustion. Furthermore, in some cases, processing propane or propylene using the system 100 can produce little or no harmful pollution (e.g., environmentally released carbon dioxide, oxides of nitrogen, or particulates) or significantly less harmful pollution relative to simple combustion.

In some embodiments, one or more chemical reaction products from operation of the system 100 can be used to form dielectric materials for use in durable goods. For example, the reaction products can be used to form polymers (e.g., polyimides, polyetherimides, parylenes, or fluoropolymers) and/or inorganic dielectrics (e.g., silicon dioxide or silicon nitride) that can incorporated into polymer-based nanodielectrics. Composites of inorganic and organic materials (one or both of which can be produced by operation of the system 100) can provide relatively high dielectric and mechanical strengths along with flexibility. Such materials can be well suited for use at a wide range of temperatures, such as temperatures ranging from cryogenic temperatures (e.g., about −200° C. or higher) to heat-engine exhaust temperatures (e.g., about 500° C. or higher). In other embodiments, the reaction products can be used to form thin films of inorganic amorphous carbon, silicon oxynitride, aluminum oxynitride, or other suitable materials. As discussed above, in some cases, the chemical reaction products from operation of the system 100 can be further processed to form useful materials with techniques that can include using electricity produced by the system 100 when it operates in the second mode. Furthermore, in some embodiments, the system 100 can have dual-beam deposition and/or web-handling capabilities useful for processing suitable chemical reaction products (e.g., to form amorphous or crystalline carbon films).

Rather than immediately use the non-gaseous product 135 (e.g., in the processing unit 130 or in the first combustor 137), the system 100 can be configured to store the non-gaseous product 135. For example, the non-gaseous product 135 can be routed to a storage receptacle 139 after exiting the fuel cell 110. In this way, processing at the processing unit 130 and/or heat production at the first combustor 137 can occur on an as-needed basis. Solid and liquid materials are typically more convenient to store than gaseous materials. Accordingly, in some embodiments, the system 100 can store a quantity of the non-gaseous product 135 produced by or equivalent to a quantity produced by continuous operation of the system 100 in the first mode for a period within a range from about one month to about five years, such as from about six months to about 2 years, or within another suitable range.

In the second operational mode, the fuel cell 110 can react (e.g., electrolytically decompose in a split reduction-oxidation reaction) the feedstock material 180 in a manner that produces electrical current. Reaction of the feedstock material 180 in the second mode can include an oxidation reaction at one side the ion-transport medium 117, a reduction reaction at the other side of the ion-transport medium 117, ion transport across the ion-transport medium 117, and electron transport through an external electrical circuit 160 of the system 100. The ion-transport medium 117 can be selected to allow suitable ion transport (e.g., transport of hydrogen, oxygen, carbonate, or another suitable ionic reactant) through the ion-transport medium 117 and to prevent electron transport through the ion-transport medium 117 such that the electron flow accompanying the reactions on either side of the ion-transport medium 117 is forced through the circuit 160. As shown in FIG. 1, operating in the second mode, the fuel cell 110 can react the feedstock material 180 to form an oxidation product 190.

In some embodiments, reacting the feedstock material 180 in the second mode can also form a non-gaseous product 135, e.g., the same or a different non-gaseous product 135 than produced by operating the system 100 in the first mode. In other embodiments, reacting the feedstock material 180 in the second mode can form the oxidation product 190 without forming the non-gaseous product 135. The oxidation product 190 can be directed through a fourth port 114 of the fuel cell 110. The feedstock material 180 can be oxidized, for example, by reaction with a first reactant 196 that can be directed into the fuel cell 110 through a fifth port 194 of the fuel cell 110 and/or directed into the fuel cell 110 along with the feedstock material 180 through the first port 111. In other embodiments, the feedstock material 180 can be oxidized by reaction with an ion passing through the ion-transport medium 117 and the first reactant 196 can be eliminated. Furthermore, in some cases, the feedstock material 180 can be reduced and the first reactant 196 or an ion passing through the ion-transport medium 117 can be oxidized to generate free electrons and the oxidation product 190.

The current (e.g., electrons) traveling through the circuit 160 can power an electrical load 161 and return to the fuel cell 110. As discussed above, in some cases, the electrical load 161 is associated with another operation within the system 100, such as a process occurring within the processing unit 130. At the fuel cell 110, the electrons can participate in a reaction of a second reactant 181 from a second-reactant source (not shown) that is provided to the fuel cell 110 via a sixth port 197. The second reactant 181 can be a reductant and can be oxidized, for example, by reaction with ions that travel across the ion-transport medium 117. Alternatively, the second reactant 181 can be an oxidant and can be reduced, for example, by reaction with the ions. Reacting the second reactant 181 can form a reduction product 191, which can exit the fuel cell 110 through a seventh port 198. In some embodiments, the second reactant 181 can be oxygen, a diatomic halogen, or another suitable oxygen-containing or halogen-containing material (e.g., an iodine containing material or bromine containing material). For example, the second reactant 181 can be oxygen from air and residual nitrogen from the air can pass through the fuel cell 110 to an exhaust (not shown). This exhaust can be collected and the residual nitrogen can be beneficially used. For example, the residual nitrogen can be combined with hydrogen to produce ammonia and/or can be otherwise processed to form other useful materials such as $Si_3N_4$, AlN, BN, TiN, ZrN, $TiCSi_3N_4$, and/or suitable sialons. The reduction product 191 can be used within the system 100 or routed elsewhere for further processing. For example, as described in greater detail below, the reduction product 191 can be water that can be reused within the system 100 as a flushing medium.

In some embodiments, the feedstock material 180 is an input to the system 100. For example, the feedstock material 180 can be collected (and in some cases transported) before being introduced into the system 100. The first reactant 196 and the second reactant 181 can be inputs to the system 100 or byproducts of operations within the system 100. For example, when the reduction product 191 is water, in some cases the water can be reintroduced into the fuel cell 110 as all or part of the first reactant 196. As another example, when the oxidation product 190 is carbon dioxide, in some cases the carbon dioxide can be reintroduced into the fuel cell 110 as all or part of the second reactant 181.

Equations 9, 10, and 11, illustrate, respectively, examples of an anode portion of a split reduction-oxidation reaction, a cathode portion of the split reduction-oxidation reaction, and a corresponding overall split reduction-oxidation reaction that can be carried out within the fuel cell 110 while the system 100 is operating in the second mode.

$$CH_4 + 2H_2O \rightarrow CO_2 + 8H^+ + 8e^- \qquad \text{Equation 9}$$

$$2O_2 + 8H^+ + 8e^- \rightarrow 4H_2O \qquad \text{Equation 10}$$

$$CH_4 + 2O_2 \rightarrow CO_2 + 2H_2O \qquad \text{Equation 11}$$

The feedstock material 180 illustrated in Equations 9-11 is methane. As shown in Equation 9, the methane can be oxidized by water (e.g., as the first reactant 196) to produce carbon dioxide (e.g., as the oxidation product 190), hydrogen ions, and free electrons. The hydrogen ions can flow across the ion-transport medium 117 and the electrons can flow through the circuit 160. At the other side of the ion-transport medium 117, oxygen (e.g., as the second reactant 181) can be reduced to form water (e.g., as the reduction product 191). Similar mechanisms can apply to the reaction of other suitable feedstock materials 180.

The nature of the oxidation products 190 can depend on the type of reactions occurring within the fuel cell 110. Examples of oxidation products 190 that may result from operation of the system 100 in the second mode include nitrogen, carbon dioxide, and carbon monoxide, among others. In some embodiments, the oxidation products 190 can be recycled at a suitable recycling location 195, which can be on-site or off-site. For example, when the oxidation products 190 include carbon monoxide, recycling can include oxidizing the carbon monoxide in the production of silicon, methanol, or other fuel alcohols or polymers. The carbon monoxide can also be decomposed into oxygen and carbon, with the carbon being used, for example, as a structural material. When the oxidation products 190 include carbon dioxide, recycling can include, for example, providing the carbon dioxide to an algae farm and/or another suitable biological outlet, or using the carbon dioxide to form open- or closed-cell voids in a carbon-based structure or insulator.

The controller 170 can control the manner in which the fuel cell 110 operates and can accordingly receive inputs 171 and provide multiple outputs 172 to control the various components and change (e.g., optimize) operations of the system 100. For purposes of illustration, the individual connections between the controller 170 and sensors, valves, switches, and/or other components of the system 100 are not shown in FIG. 1. In some embodiments, the controller 170 includes memory (not shown) and processing circuitry (not shown), and the memory stores non-transitory instructions. These instructions, when executed by the controller 170 using the processing circuitry, can cause the system 100 to switch between operating in the first mode and operating in the second mode in response to the inputs 171. One or more of the inputs 171, for example, can correspond to a change in demand for electricity, a change in demand for the non-gaseous product 135, or both. In one example, the system 100 includes a photovoltaic cell 179 connected to the circuit 160 and one or more of the inputs 171 corresponds to a level of electricity generation by the photovoltaic cell 179, a level of light incident on the photovoltaic cell 179, or both. In another example, one or more of the inputs 171 corresponds to a quantity of the non-gaseous product 135 within the storage receptacle 139. In yet another example, the system 100 is operably connected to an electrical grid (not shown) (e.g., via the circuit 160) and one or more of the inputs 171 corresponds to a change between an off-peak period and a peak period of power consumption within the electrical grid. A variety of other suitable inputs 171 are also possible.

In a particular embodiment, the controller 170 can control the operation of a load controller or switch 162 operably connected to the circuit 160. When the switch 162 is open, electrical current can be prevented from flowing through the circuit 160, which can cause the system 100 to operate in the first mode. When the controller 170 closes the switch 162, electrical current can be allowed to flow through the circuit 160, which can enable or favor the second mode of operation. As discussed below, in some embodiments, the controller 170 and the switch 162 can be configured for pulse-width modulation. Furthermore, the system 100 can include various suitable power-conditioning subsystems. For example, the system 100 can include an inverter (not shown) to provide electricity at grid voltage and frequency and the system 100 can be connected to an electrical grid. In other embodiments, electricity from the system 100 can be used to perform a specific process internal or external to the system 100. For example, the electricity can be used for electrowinning a silicon-containing compound outside the system 100 to form silicon and the silicon can then be imported into the system 100 and processed in the processing unit 130 alone or together with the non-gaseous product 135.

In addition to or instead of changing operation of the circuit 160, other operational characteristics of the system 100 can be changed to cause, or in response to, a change from operation in first mode to operation in the second mode or from operation in the second mode to operation in the first mode. For example, in the first mode, the fuel cell 110 can be operated anaerobically and, in the second mode, the fuel cell 110 can be operated aerobically. As another example, the operating temperature of the fuel cell 110 can be changed between the first mode and the second mode. In some embodiments, the operating temperature in the first mode can be greater than a temperature sufficient to cause thermal decomposition of the feedstock material 180, and the operating temperature in the second mode can be a lower or higher temperature, e.g., a lower or higher temperature selected to facilitate or enhance ion transport through the ion-transport medium 117. Furthermore, suitable valves, material conveyors, and/or other suitable components of the system 100, such as valves (not shown) associated with the first, second, third, fourth, fifth, sixth, and seventh ports 111, 112, 113, 114, 194, 197, 198 can be opened, closed, or otherwise controlled depending on whether the system 100 is operating in the first mode or the second mode. In some embodiments, the first, second, third, fourth, fifth, sixth, and/or seventh ports 111, 112, 113, 114, 194, 197, 198 can include suitable inlets or outlets extending away from the fuel cell 110.

The first and second modes can be performed sequentially (e.g., with formation of the non-gaseous product 135 and no electricity generation in the first mode followed by no formation of the non-gaseous product 135 and electricity generation in the second mode). In other embodiments, both modes can be performed simultaneously or in cyclic operations at selected regular or irregular frequencies. For example, the controller 170 can vary the load 161 and/or can vary the rate at which the first reactant 196 and/or the second reactant 181 are provided to the fuel cell 110 in a manner that allows both some production of the non-gaseous product 135 and some production of electricity. In some embodiments, the controller 170 (e.g., automatically or in response to the inputs 171) can adjust suitable valves of the fuel cell 110, the load 161, and/or other parameters to emphasize one mode over the other, without precluding the modes from being carried out simultaneously.

The rate of switching between the first and second modes of operation can be relatively fast (e.g., when the fuel cell 110 is relatively small) and conversely switching can be relatively slow (e.g., when the fuel cell 110 is relatively large). In some cases, the rate of switching can cause the first and second modes to be effectively simultaneous. For example, when the controller 170 and the switch 162 control the load 161 using pulse-width modulation, electricity can flow through the circuit 160 during a series of pulses and not flow during periods between the pulses. During the pulses, the fuel cell 110 can operate in the second mode. Between the pulses the fuel cell 110 can operate in the first mode. In this way, the fuel cell 110 can continue to do useful work continuously or nearly continuously even when the duty cycle necessary for powering the load 161 is less than 100% (e.g., less than about 80%, or less than about 60%). In some embodiments, changing between operating the system 100 in the first mode and operating the system 100 in the second mode occurs at a relatively fast rate, such as a rate within a range from about 60 to about 960,000 times per minute, such as from about 100 to about 900,000 times per minute, or within another suitable range.

The rate of switching between the first and second modes of operation can also be relatively slow. Slow switching can be useful, for example, in occasional or seasonally optimized operations of larger fuel reactor cells to meet fuel production and electricity needs. The timing of the switching, the duration and timing of operation in the first mode, the duration and timing of operation in the second mode, and other suitable parameters of operation of the system 100 can be selected based on the demand for electricity, the demand for chemical precursors and/or other products from the system 100 other than electricity, environmental constraints, and/or other factors. For example, with regard to the timing of switching, when the system 100 is connected to an electrical grid, the system 100 can be configured to operate primarily in the first mode during periods of low demand for electricity (e.g., off-peak periods) and primarily in the second mode during periods of high demand for electricity (e.g., peak periods). For example, the system 100 can be operated primarily in the first mode at night and primarily in the second mode during the day. In other cases, the system 100 can be operated primarily in the first mode during the day and primarily in the second mode at night. This can be useful, for example, when the system 100 is used in conjunction with the photovoltaic cell 179.

Switching between the first and second modes can also be seasonal. For example, when the system 100 is used for food production, the system 100 can be operated primarily in the first mode during the growing season when the need for electricity is relatively low and primarily in the second mode during harvesting when the need for electricity is relatively high (e.g., to power canning equipment). Similarly, when the system 100 is ordinarily used to produce electricity for grid distribution, the system 100 can be switched from the second mode to the first mode to accommodate certain maintenance procedures at a suitable maintenance interval (e.g., an interval within a range from about 5 to about 20 years). In these and other embodiments, the system 100 also can be capable of switching between from the second mode to the first mode to produce fuel or to meet other needs in the event of a local disaster. Under these circumstances, the system 100 can be used, for example, for conversion of pathogenically suspect wastes and/or disaster debris into fuel to operate engine powered equipment, to sterilize water, to heat emergency shelters, and/or to support medical treatment and/or hospital operations. Furthermore, relatively small local needs for electricity could be met using the system 100, for example, by switching at an adaptively adjusted portion of each 60 Hz cycle. Following such emergency relief operations, switching back to more or less steady production of electricity can follow eventual restoration of electric grid operations.

The system 100 can include one or more internal loops, circuits, and/or other arrangements that reuse, recycle, and/or recapture energy and/or materials produced by and/or associated with operation of the fuel cell 110. Thermal-decomposition, electrolytic-decomposition, and/or other reactions within the fuel cell 110 may occur at elevated temperatures (e.g., about 4,000° F., in some cases). Accordingly, products removed from the fuel cell 110 typically are cooled before they are stored and/or used. Rather than rejecting the heat from these products to the environment, the heat can be reused via one or more subsystems including suitable heat exchangers (e.g., countercurrent heat exchangers). In a particular embodiment, a first heat exchanger 140a exchanges heat between the oxidation product 190 exiting the fuel cell 110 at the fourth port 114 and the incoming feedstock material 180 directed into the fuel cell 110 from the feedstock source. In other embodiments, the system 100 can include a variety of other arrangements for reusing heat and/or other forms of energy that might otherwise be wasted.

Suitable sources of energy to produce elevated temperatures in the system 100 include concentrated solar radiation, wind, and moving water, among others. Such sources of energy can be used, for example, to generate electricity for electrical heating (e.g., resistive and/or inductive heating). Selected fuels can also be combusted to provide suitable heating. In some cases, energy can be added to the system 100 from an energy source selected to be more readily available, less polluting, and/or less expensive than other potential energy sources. Furthermore, the energy source or a combination of energy sources can be selected to allow the system 100 to operate night and day regardless of weather conditions.

In addition to or in lieu of the first heat exchanger 140a, the system 100 can include a second heat exchanger 140b configured to transfer heat from the gaseous product 133 and/or other products exiting the fuel cell 110 to the feedstock material 180 entering the fuel cell 110. Furthermore, the system 100 can include a third heat exchanger 140c configured to receive water via a pump 141. The water can be from an external source (not shown), from the fuel cell 110 (e.g., as the reduction product 191), from a unit operation associated with processing the gaseous product 133 (e.g., as described below), or from another suitable source. The water can be heated at the third heat exchanger 140c by the oxidation product 190 exiting the fourth port 114, e.g., to form steam. The heated water can then be introduced via a first valve 142 into the flow of the feedstock material 180 entering the fuel cell 110 at the first port 111. In some embodiments, heated or otherwise chemically activated substances (e.g., steam produced at the third heat exchanger 140c) can serve preventative and/or maintenance functions within the system 100. For example, such substances can prevent carbon or carbon-containing films, varnish, or particles from depositing on the surfaces of particular components of the system 100, e.g., conduits configured to carry the feedstock material 180 to the first port 111. Such preventative modes of operation can conserve heat and maintain or improve heat-exchanger effectiveness.

As discussed above, in some embodiments, the non-gaseous product 135 is reacted in a split reduction-oxidation reaction (e.g., within the first auxiliary fuel cell 143) to produce electricity. Equations 12, 13, and 14, illustrate, respectively, examples of an anode portion of a split reduction-oxidation reaction, a cathode portion of the split reduction-oxidation reaction, and a corresponding overall split reduction-oxidation reaction that can be carried out within the first auxiliary fuel cell 143.

$$C + 2O_2^- \rightarrow CO_2 + 4e^- \qquad \text{Equation 12}$$

$$O_2 + 4e^- \rightarrow 2O_2^- \qquad \text{Equation 13}$$

$$C + O_2 \rightarrow CO_2 \qquad \text{Equation 14}$$

The non-gaseous product 135 illustrated in Equations 12-14 is carbon. As shown in Equation 12, carbon can be oxidized by oxide ions to produce carbon dioxide and free electrons. The oxide ions can flow across an ion-transport medium within the first auxiliary fuel cell 143 and the electrons can flow through the circuit 160. At the other side of the ion-transport medium, oxygen can be reduced to form the oxide ions. Similar mechanisms can apply to the reaction of other suitable non-gaseous products 135.

The gaseous product 133 extracted from the fuel cell 110 during operation in the first mode can be a deliverable from the system 100 and/or can be used internally by the system 100. For example, the gaseous product 133 can be used as a chemical precursor or to generate power at an offsite location 134. When the gaseous product 133 is hydrogen, the power can be extracted from the hydrogen at the offsite location 134, for example, via combustion or via a hydrogen fuel cell (not shown). These forms of hydrogen-based energy generation can also be used internally by the system 100. For example, the system 100 can include a second combustor 150 configured to combust hydrogen, e.g., in the presence of air (not shown), to generate heat 151 which can be directed to the fuel cell 110. As discussed above with respect to the first combustor 137, directing the heat 151 to the fuel cell 110 can be useful when the fuel cell 110 is a solid-oxide fuel cell, a molten-carbonate fuel cell, or another type of high-temperature fuel cell. The system 100 can include a second valve 192 configured to control delivery of the hydrogen to the second combustor 150, e.g., to switch between use of the hydrogen internally and use of the hydrogen for power generation at the offsite location 134. The combustion products from the second combustor 150 can include water 102, which can be used, for example, in the third heat exchanger 140c. In some embodiments, the second combustor 150 can burn a portion of the feedstock material 180 in addition to or in lieu of burning the gaseous product 133. Combustion products (not shown) from burning the feedstock material 180 can be further processed and/or put to other uses, e.g., as described above with respect to the combustion products from the first combustor 137 and the oxidation products 190.

In addition to or in lieu of the second combustor 150, the system 100 can include a second auxiliary fuel cell 101 and a third valve 199 configured to control delivery of the gaseous product 133 to the second auxiliary fuel cell 101. This can be useful, for example, when the gaseous product 133 is hydrogen. The second auxiliary fuel cell 101 can be configured to produce additional electrical energy (not shown) and water 103. The additional electrical energy, for example, can be provided to the circuit 160 and the water 103 can be used, for example, in the third heat exchanger 140c. In some embodiments, the electricity from the second auxiliary fuel cell 101 can be used to generate heat within the system 100, e.g., to support operation of the fuel cell 110 and/or to support operation of the processing unit 130. Suitable heat-generation or transfer methods can include, for example, radiation, resistance, and inductance. In some cases, heat from another source can supplement or replace heat from electricity generated by the second auxiliary fuel cell 101. Such sources can include, for example, light sources (e.g., solar, concentrated-radiant, laser, or other suitable light sources), wind sources, or off-peak electricity sources, among others.

Equations 15, 16, and 17, illustrate, respectively, examples of an anode portion of a split reduction-oxidation reaction, a cathode portion of the split reduction-oxidation reaction, and a corresponding overall split reduction-oxidation reaction that can be carried out within the second auxiliary fuel cell 101.

$$H_2 + 2O^{2-} \rightarrow 2H_2O + 4e^- \quad \text{Equation 15}$$

$$O_2 + 4e^- \rightarrow 2O^{2-} \quad \text{Equation 16}$$

$$2H_2 + O_2 \rightarrow 2H_2O \quad \text{Equation 17}$$

The gaseous product 133 illustrated in Equations 15-17 is hydrogen. As shown in Equation 15, hydrogen can be oxidized by oxide ions to produce water and free electrons. The oxide ions can flow across an ion-transport medium within the second auxiliary fuel cell 101 and the electrons can flow through the circuit 160. At the other side of the ion-transport medium, oxygen can be reduced to form the oxide ions. Similar mechanisms can apply to the reaction of other suitable gaseous products 133.

Figure 2:
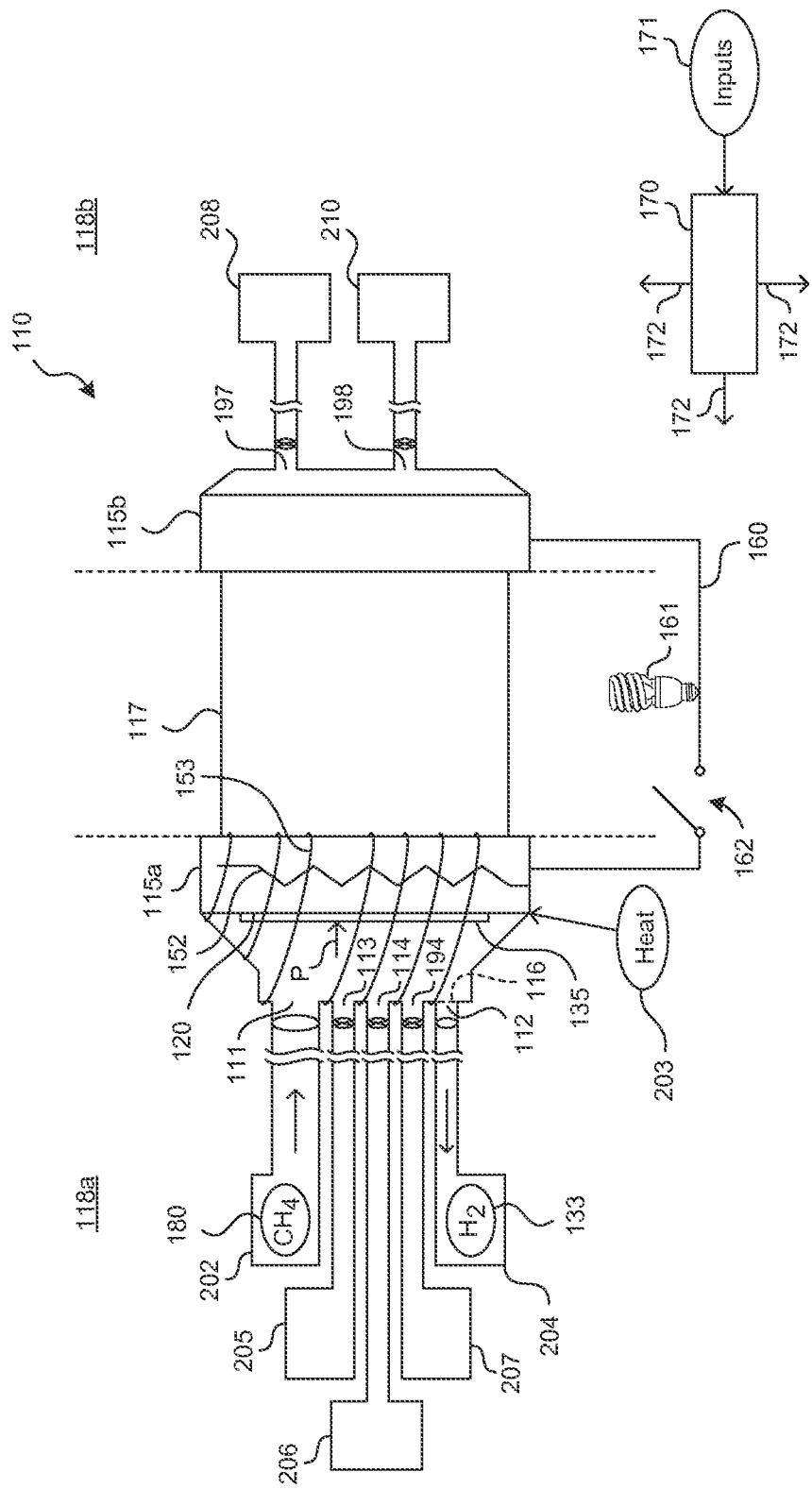
FIG. 2 is a partially schematic illustration of a fuel cell operating in a first mode in accordance with an embodiment of the presently disclosed technology.

FIG. 2 is an enlarged, partially schematic illustration of the fuel cell 110 when the system 100 operates in accordance with the first mode described above. In this particular embodiment, the fuel cell 110 receives a feedstock material 180 (e.g., methane) from a feedstock source 202 via a first port 111. The fuel cell 110 includes a first electrode 115a and a second electrode 115b separated by an ion-transport medium 117. The ion-transport medium 117 can divide the fuel cell 110 into a first region 118a that includes the first electrode 115a and a second region 118b that includes the second electrode 115b. As shown in FIG. 2, the fuel cell 110 can further include a gaseous-product destination 204, a flushing medium source 205, an oxidation-product destination 206, and a first-reactant source 207 positioned within the first region 118a. The gaseous-product destination 204 can be coupled to the fuel cell 110 at a second port 112; the flushing medium source 205 can be coupled to the fuel cell 110 at a third port 113; the oxidation-product destination 206 can be coupled to the fuel cell 110 at a fourth port 114; and the first-reactant source 207 can be coupled to the fuel cell 110 at a fifth port 194. The fuel cell 110 can also include a second-reactant source 208 and a reduction-product destination 210 within the second region 118b. The second-reactant source 208 can be coupled to the fuel cell 110 at a sixth port 197; and the reduction-product destination 210 can be coupled to the fuel cell 110 at a seventh port 198.

In the first mode, the first port 111 and the second port 112 can be active (e.g., open), while the third port 113, the fourth port 114, the fifth port 194, the sixth port 197, and the seventh port 198 are inactive (e.g., closed). For example, the controller 170 can close valves (shown schematically) associated with the inactive ports and open valves associated with the active ports. The controller 170 can also open the switch 162 or vary the impedance of the load 161 to reduce or eliminate the ability of the circuit 160 to draw electrical current from the fuel cell 110. When operating in the second mode (described below with reference to FIG. 3), the controller 170 can close a valve associated with the second port 112 and open valves associated with the fourth port 114, the fifth port 194, the sixth port 197, and the seventh port 198. The controller 170 can also close the switch 162 or vary the impedance of the load 161 to allow the circuit 160 to carry electrical current between the first and second electrodes 115a, 115b. As described above with reference to FIG. 1, the controller 170 can also make other suitable adjustments to the system 100 to change between operation in the first mode and operation in the second mode.

In the first region 118a, the first electrode 115a can be operated at an elevated temperature (e.g., at least about 3,000° F., at least about 4,000° F., or another suitable temperature). The temperature at a region around the first electrode 115a during operation in the first mode may, in some cases, be above the temperatures developed in most conventional fuel cells. For example, most conventional hydrogen-consuming fuel cells are typically operated at relatively low temperatures. In other embodiments, the fuel cell 110 can operate at other suitable temperatures (i.e., lower or higher) depending upon factors such as the composition of the feedstock material 180 and the desired compositions of the reaction products. Heat 203 can be provided to the fuel cell 110 to control the temperature. In some embodiments, the heat 203 is from a combustor (e.g., the second combustor 150 shown in FIG. 1) associated with the fuel cell 110. In other embodiments, the heat 203 can be provided to the fuel cell 110 from another suitable source, such as a suitable renewable source (e.g., solar, wind, or moving water). Furthermore, the fuel cell 110 can include one or more suitable components for delivering the heat 203, such as an electrical resistance heater 152 (shown schematically), an induction heater 153 (shown schematically), a remote induction heater (not shown) with an accompanying heat-transfer mechanism (not shown), or another suitable component. In some embodiments, the heat 203 may be applied to selected regions of the first electrode 115a and/or to the ion-transport medium 117 and/or to the second electrode 115b. Furthermore, thermal insulation (not shown) can be included around portions of the fuel cell 110 to facilitate retaining the heat 203 in one or more regions of the fuel cell 110, e.g., in a region around the first electrode 115a.

The first electrode 115a can have a collection surface 120 at which the non-gaseous product 135 can grow (e.g., epitaxially grow) or otherwise collect after reaction (e.g., decomposition) of the feedstock material 180. In a particular embodiment, the collection surface 120 can be heated to be hotter than other surfaces in the first region 118a, so as to encourage the formation of carbon, boron, or another suitable substance as the non-gaseous product 135 at the collection surface 120, and reduce or eliminate the formation of soot or other particulates elsewhere in the first region 118a. Furthermore, high fuel-cell temperatures can facilitate both reaction (e.g., decomposition) of the feedstock material 180 in the first mode and operation in the second mode, as discussed below with reference to FIG. 3.

In some embodiments, the non-gaseous product 135 may be consumed at or near the collection surface 120. For example, as discussed above, the non-gaseous product 135 can be burned to release heat or reacted to form useful reaction products. In some embodiments, these reactions can occur partially, primarily, or entirely at an interface between the deposited non-gaseous product 135 and the collection surface 120. For example, the system 100 can include a pressure device (schematically indicated by arrow P) that can apply pressure to the non-gaseous product 135 (e.g., force it against the collection surface 120) to facilitate reaction of the non-gaseous product 135 and/or to reduce or prevent the deposited non-gaseous product 135 from inhibiting ion transfer through the ion-transport medium 117. The pressure device P can include, for example, a frame with a ram, a spring, or another suitable actuator configured to apply force to the frame. In other embodiments, the pressure of the incoming feedstock material 180 and/or the flushing medium 193 (FIG. 1), e.g., directed as a jet against the non-gaseous product 135 can take the place of the pressure device P or supplement the effect of the pressure device P. The fuel cell 110 can also operate without the pressure device P.

The characteristics of the feedstock material 180 and/or of the collection surface 120 can affect (e.g., determine) the composition and/or structure of the deposited non-gaseous product 135. In some embodiments, the first electrode 115a can include a material or structure with an affinity for collecting a particular non-gaseous product 135. In the case of carbon, for example, the first electrode 115a can include a carbon structure. In some embodiments, the first electrode 115a can include a suitable architectural construct, e.g., as discussed in U.S. Patent Application No. 61/523,261, filed Aug. 12, 2011, which is incorporated herein by reference. The first electrode 115a can also include a film or coating of a metal (e.g., aluminum) on a suitable substrate (e.g., a polymer substrate). In some embodiments, the first electrode 115a can include a material that reacts with a particular non-gaseous product 135. For example, the first electrode 115a can include a boron-containing compound, a transition metal, and/or a refractory metal that reacts with carbon to form one or more carbides at the collection surface 120. Furthermore, the temperature of the collection surface 120 can affect the structure of the deposited non-gaseous product 135. For example, the temperature can be controlled to deposit non-gaseous products 135 (e.g., carbon or silicon) in amorphous or crystalline forms.

When the non-gaseous product 135 is carbon, it can be deposited at the collection surface 120, for example, in the form of pyrolytic carbon. Pyrolytic carbon can be useful, for example, in particulate, fiber, or other suitable forms to reinforce materials (e.g., plastics and metals). Pyrolytic carbon can also have useful diamagnetic properties, and can share some properties with refractory metals. Furthermore, pyrolytic carbon can have anisotropic thermal properties that make it particularly well suited for use in planar thermal insulators in some orientations and applications, and in heat conduction elements in other orientations and applications. In some embodiments, pyrolytic carbon can be used in a thermal insulator (not shown) of the fuel cell 110. As discussed above, due to elevated internal temperatures (e.g., at the first electrode 115a) thermal insulation can be useful in some cases to enhance the energy efficiency of the fuel cell 110. Pyrolytic carbon in sheet or foil form can withstand very high temperatures and provide suitable thermal insulation for enhancing the efficiency of the fuel cell 110.

In some embodiments, rather than being deposited as pyrolytic carbon, when the non-gaseous product 135 is carbon, it can be deposited at the collection surface 120 in the form of graphene or various other suitable types of nano-dimensioned graphite. The particular form of the carbon deposited can be controlled by, among other factors, the electric field, temperature, and/or pressure in the first region 118a. In any of these embodiments, the deposited carbon can be removed from the fuel cell 110 by accessing the collection surface 120 and cleaving the deposited carbon from the collection surface 120. The collection surface 120 can then be reused to produce additional carbon, and the collected carbon can be used for a suitable purpose. For example, the collected carbon can be used to produce any of a variety of suitable architectural constructs, e.g., those described U.S. patent application Ser. No. 13/027,208, filed Feb. 14, 2011, which is incorporated herein by reference. In other embodiments, the collected carbon can be removed periodically or continuously with the flushing medium 193, as described above with reference to FIG. 1.

As shown in FIG. 2, both the feedstock material 180 (e.g., methane) and the gaseous product 133 (e.g., hydrogen) may be present in the first region 118a at the same time. Accordingly, the fuel cell 110 can include an exit membrane 116 positioned proximate to the second port 112 to preferentially allow passage of the gaseous product 133 and inhibit passage of the feedstock material 180. In particular embodiments, the exit membrane 116 can include a silver-palladium membrane and/or another high-temperature membrane selective to hydrogen. Alternatively, low-temperature membranes (e.g., polymer membranes) can be used to separate the gaseous product 133 from the feedstock material 180 after cooling. In still other embodiments, other suitable structures and/or processes can be used, such as temperature-swing adsorption and/or pressure-swing adsorption processes.

Figure 3:
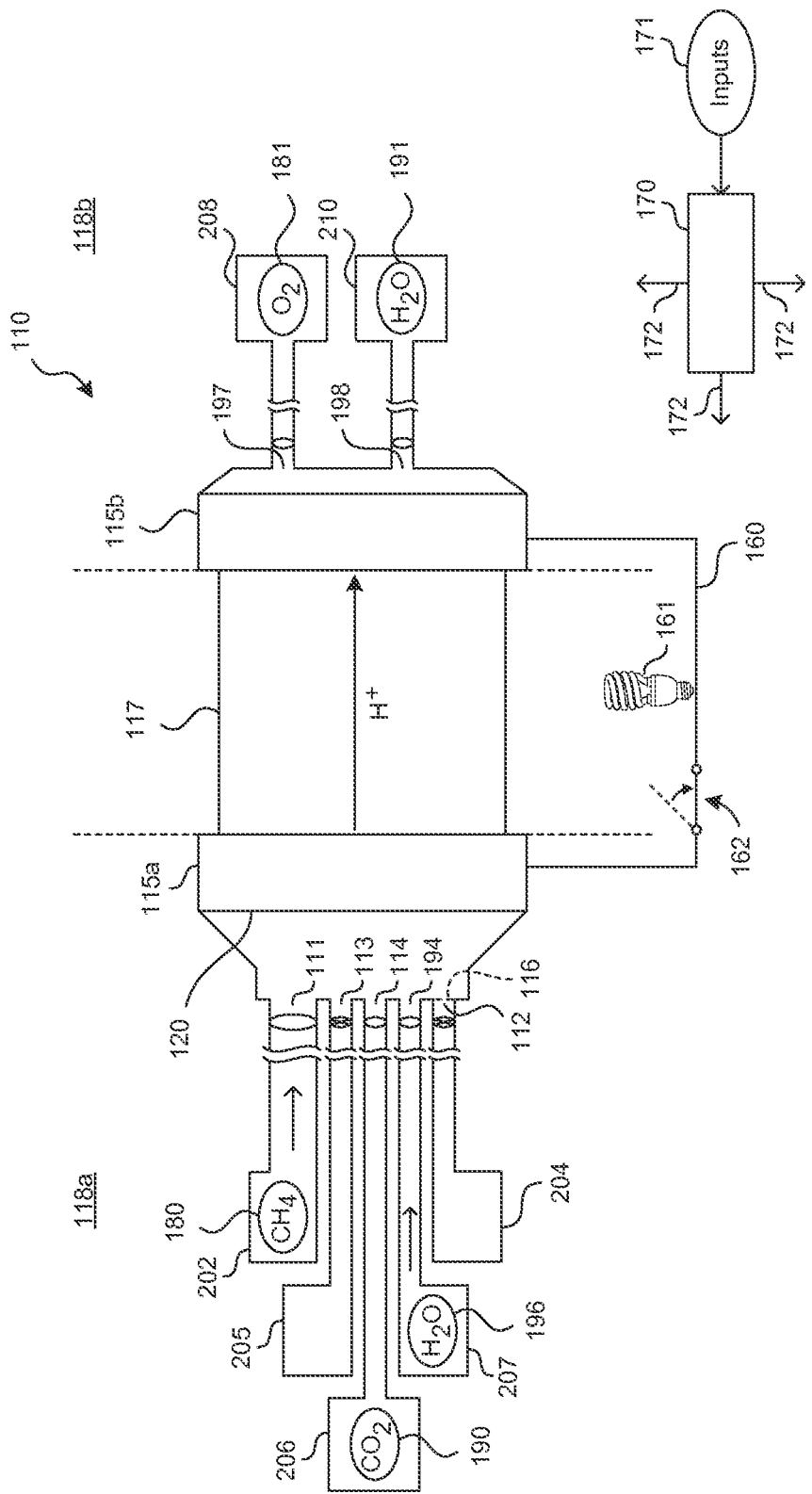
FIG. 3 is a partially schematic illustration of a fuel cell operating in a second mode in accordance with an embodiment of the presently disclosed technology.

FIG. 3 is a schematic illustration of the fuel cell 110 when the system 100 operates in the second mode. Accordingly, the controller 170 has closed the switch 162, and reversed valves associated with the second port 112, the fourth port 114, the fifth port 194, the sixth port 197, and the seventh port 198. In this mode of operation, the feedstock material 180 enters the fuel cell 110 through the first port 111 and is reacted with the first reactant 196 (e.g., water) entering the fuel cell 110 through the fifth port 194 to form the oxidation product 190 (e.g., carbon dioxide), ions (e.g. hydrogen ions), and free electrons. The oxidation product 190 exits the fuel cell 110 through the fourth port 114, the ions flow across the ion-transport medium 117, and the electrons flow through the circuit 160. At the other side of the ion-transport medium 117, the second reactant 181 (e.g., oxygen) entering the fuel cell 110 through the sixth port 197 is reacted with the ions to form the reduction product 191 (e.g., water), which exits the fuel cell 110 through the seventh port 198. In some embodiments, operation of the fuel cell 110 can be reversed depending on the reactions carried out in the fuel cell 110. For example, as shown in FIG. 3, reaction of the feedstock material 180 can liberate ions into the ion-transport medium 117 and electrons into the circuit 160. In other embodiments, reaction of the feedstock material 180 can consume ions from the ion-transport medium 117 and electrons from the circuit 160. Furthermore, the ion-transport medium 117 can be configured to selectively allow passage of a variety of suitable ions.

With reference to FIGS. 1-3, the fuel-cell system 100 and fuel cell 110 can be configured for use with a particular set of reactions or with different reactions, e.g., depending, for example, on the availability of different feedstock materials 180, demand for different chemical products, or other economic or non-economic factors. The types of the feedstock material 180, the first reactant 196, the flushing medium 193, the second reactant 181, and/or other inputs to the fuel cell 110 can be varied to change the chemical products in the first and second modes and to affect electricity generation in the second mode. Similarly, processing of the non-gaseous product 135, the gaseous product 133, the oxidation product 190, and/or the reduction product 191 can be controlled to produce different chemical products and to affect the overall energetics of the system 100.

As an additional illustrative example, the feedstock material 180 can be hydrogen (e.g., from a thermal-decomposition process), the second reactant 181 can be nitrogen (e.g., from air), and the reduction product 191 can be ammonia. A synergistic application of such ammonia can include reacting the ammonia with silicon (e.g., produced by the reactions of Equations 4 and/or 5) to form silicon nitride with particularly favorable density, strength, and fatigue endurance properties according to the reaction shown in Equation 18.

$$4NH_3 + 3Si \rightarrow Si_3N_4 + 6H_2 \qquad \text{Equation 18}$$

Hydrogen produced by the reaction shown in Equation 18 may be utilized, for example, as additional feedstock material 180 or as additional gaseous product 133.

In some embodiments, different oxidation states of the oxidation product 190 (e.g., carbon dioxide versus carbon monoxide) can be selectively favored when the system 100 operates in the second mode. With specific reference to carbon species, in general, producing carbon dioxide typically results in a higher fuel-cell voltage than producing carbon monoxide. Whether carbon dioxide or carbon monoxide is produced can be controlled, for example, by controlling the rate of delivery of the first reactant 196 to the fuel cell 110 via the fifth port 194 and/or by controlling the load 161. In some embodiments, it can be desirable to produce carbon monoxide while still obtaining a high fuel-cell voltage. One technique for achieving this result is to elevate the pressure and/or adjust the temperature of the fuel cell 110, thus respeciating the carbon dioxide that otherwise would be formed. In some cases, an intermediate reductant (e.g., iron) can be introduced into the fuel cell 110 to strip oxygen from carbon dioxide. The intermediate reductant can then be further heated and/or subjected to an electrical field in a subsequent step to release the oxygen. Furthermore, in some cases, heat alone can be sufficient to drive the reaction shown in Equation 19.

$$CO_2 + C \rightarrow 2CO \qquad \text{Equation 19}$$

In some embodiments, the controller 170 can adjust the process parameters to favor a desired oxidation state of the oxidation product 190.

Figure 4:
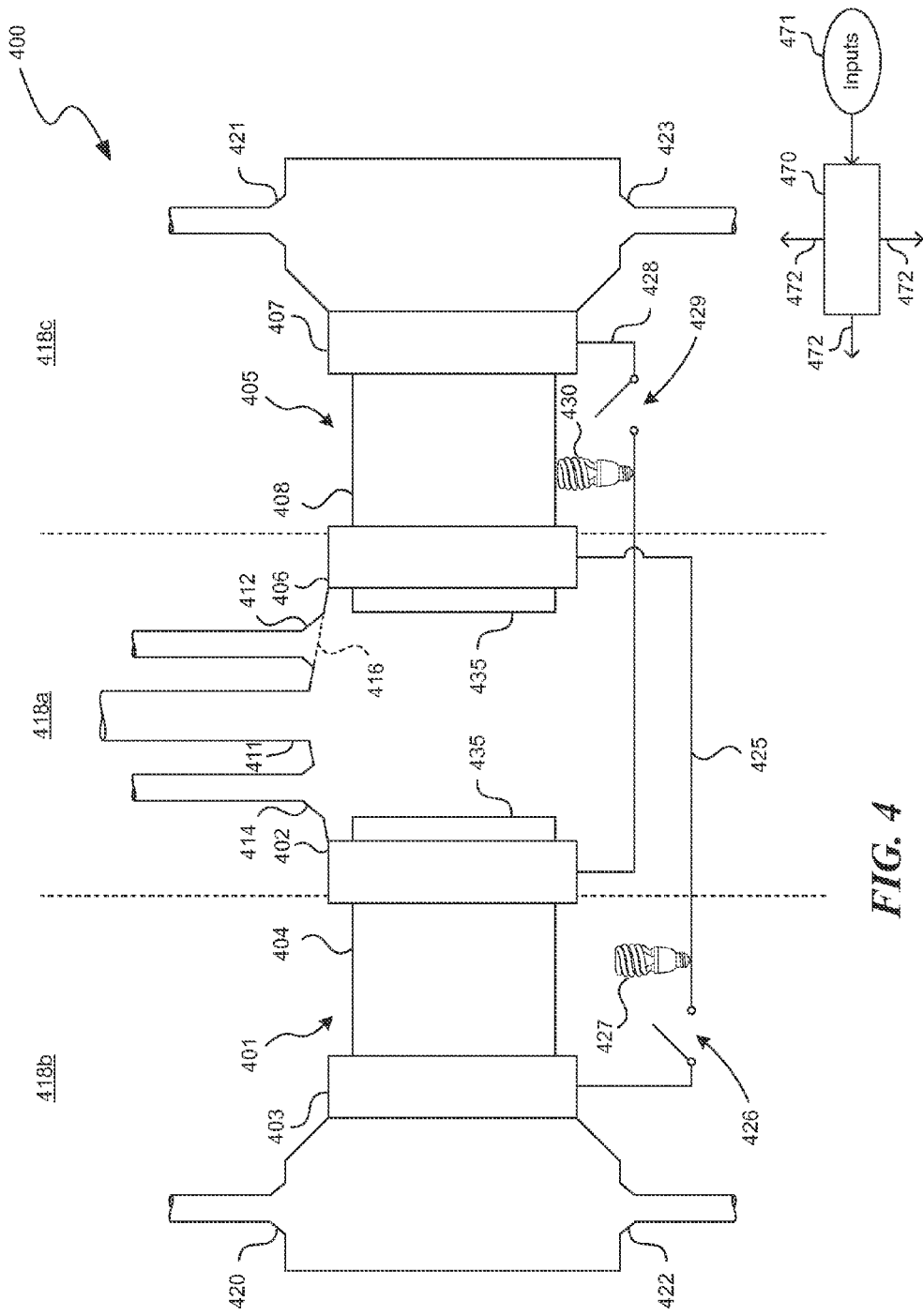
FIG. 4 is a partially schematic illustration of a system that includes multiple fuel cells connected in series in accordance with another embodiment of the presently disclosed technology.

Particular embodiments of the disclosed technology are described above with reference to FIGS. 1-3 primarily in the context of a single fuel cell receiving the feedstock material 180. In other embodiments, multiple fuel cells can be combined, e.g., in series to increase the net output voltage and/or in parallel to increase the net output current. FIG. 4 illustrates one example of a system 400 including multiple fuel cells. A first fuel cell 401 of the system 400 can include a first electrode 402, a second electrode 403, and an ion-transport medium 404 between the first electrode 402 and the second electrode 403. Similarly, a second fuel cell 405 of the system 400 can include a first electrode 406, a second electrode 407, and an ion-transport medium 408 between the first electrode 406 and the second electrode 407. The first electrodes 402, 406 can be located in a first region 418a of the system 400. The second electrode 403 of the first fuel cell 401 can be located in a second region 418b of the system 400. The second electrode 407 of the second fuel cell 405 can be located in a third region 418c of the system 400. As shown in FIG. 4, the system 400 can include a circuit 425 coupled between the first and second electrodes 402, 403 of the first fuel cell 401 with a switch 426 and a load 427 along the circuit 425. Similarly, the system 400 can include a circuit 428 coupled between the first and second electrodes 406, 407 of the second fuel cell 405 with a switch 429 and a load 430 along the circuit 428. The circuits 425, 428 and the loads 427, 430 can be operated independently or collectively (e.g., in parallel or in series).

By positioning the first electrodes 402, 406 to face toward one another in the first region 418a, each first electrode 402, 406 can individually reflect radiant energy produced by the other. Further details of an arrangement for reflecting radiant energy in this manner are described in co-pending U.S. patent application Ser. No. 13/027,215, filed Feb. 14, 2011, which is incorporated herein by reference. The arrangement of the first and second fuel cells 401, 405 shown in FIG. 4 can also reduce heat loss from the system 400 and increase the surface area available for deposition of a non-gaseous product 435. In other embodiments, the arrangement of the first and second fuel cells 401, 405 can be different and/or the system 400 can include more than two fuel cells. Furthermore, the first and second fuel cells 401, 405 can be configured to perform the same or different reactions. Operation of the first and second fuel cells 401, 405 can be coordinated by a controller 470 that receives inputs 471. For example, the inputs 471 can direct the controller 470 to issue commands 472 to select and/or emphasize one or the other of the operation modes described above with reference to FIGS. 1-3 and/or other functions of the system 400. The controller 470 can cause one or both of the first and second fuel cells 401, 405 to change between the first and second modes, for example, by controlling one or both of the switches 426, 429 and/or one or both of the second-reactant ports 422, 423.

As shown in FIG. 4, the system 400 can include a common feedstock port 411 through which methane or another suitable feedstock material can be supplied to the first electrodes 402, 406. An exit membrane 416 can be positioned at a gaseous-product exit port 412 to selectively allow a gaseous product (e.g., hydrogen) to exit the system 400 during operation in the first mode. During operation in the second mode, a first reactant (e.g., water) can be introduced with the feedstock material through the common feedstock port 411. Second reactants (e.g., oxygen) can be introduced through second-reactant ports 420, 421 of the first and second fuel cells 401, 405, individually, and reduction products (e.g., water) can exit the system 400 through reduction-product ports 422, 423 of the first and second fuel cells 401, 405, individually. The second reactants and the reduction products can be the same or different for the first and second fuel cells 401, 405. In other embodiments, the first and second fuel cells 401, 405 can be reversed, e.g., such that they can process different feedstock materials. For example, the first and second fuel cells 401, 405 can operate generally independently in the first mode and generally collectively in the second mode. Furthermore, in the configuration shown in FIG. 4, the first fuel cell 401 can operate in the first mode and the second fuel cell 405 can operate simultaneously in the second mode. When the system 400 includes multiple fuel cells, selecting (e.g., via the controller 470) the relative numbers of the fuel cells operating the first and second modes can change the relative amounts of electricity and chemical reaction products from the system 400.

In addition to or instead of including multiple fuel cells within the same system, in some embodiments, multiple systems 100 can operate in concert within a network. For example, the system 100 within a network can be operated to produce a non-gaseous product 135 that serves as a feedstock material 180 for a different system within the same network. As another example, the system 100 within a network can be configured to produce a first type of non-gaseous product 135 (e.g., a silicon-based non-gaseous product 135) and another system within the same network can be configured to produce a second type of non-gaseous product (e.g., a carbon-based non-gaseous product). In this way, the overall network can have greater versatility with respect to the feedstock materials 180 that can be processed and/or with respect to the useful materials produced. Individual systems 100 within a network can be at the same or different locations. Furthermore, whether operating independently or within a network, the system 100 can be highly scaleable. For example, the system 100 can include miniature (e.g., microfluidic) components and can be relatively small or can include standard components and be relatively large. In some embodiments, the system 100 has a total volume within a range from about 0.0003 $m^3$ to about 30 $m^3$, e.g., from about 0.003 $m^3$ to about 3 $m^3$, or within another suitable range.

3. Further Representative Reactors

The following sections describe representative reactors and associated systems that may be used alone or in any of a variety of suitable combinations for carrying out one or more of the foregoing processes described above with reference to FIGS. 1-4. In particular, any suitable component of the systems described in the following sections may replace or supplement a suitable component described in the foregoing sections.

In some embodiments, the reactants may be obtained on a local scale, the reactions may be conducted on a local scale, and the products may be used on a local scale to produce a localized result. In other embodiments, the reactants, reactions, products and overall effect of the process can have a much larger effect. For example, the technology can have continental and/or extra-continental scope. In particular embodiments, the technology can be deployed to preserve vast regions of permafrost, on a continental scale, and or preserve ecosystems located offshore from the preserved areas. In other embodiments, the technology can be deployed offshore to produce effects over large tracts of ocean waters. In still further, embodiments, the technology can be deployed on mobile systems that convey the benefits of the technology to a wide range of areas around the globe.

In general, the disclosed reactors dissociate, reform and/or respeciate a donor material (reactant) into multiple constituents (e.g., a first constituent and a second constituent). Particular aspects of the representative reactors described below are described in the context of specific reactants and products, e.g., a hydrogen and carbon bearing donor, a hydrogen-bearing product or constituent, and a carbon-bearing product or constituent. In certain other embodiments of the disclosed technology, the same or similar reactors may be used to process other reactants and/or form other products. For example, non-hydrogen feedstock materials (reactants) are used in at least some embodiments. In particular examples, sulfur dioxide can be processed in a non-combustion thermal reactor to produce sulfur and oxygen, and/or carbon dioxide can be processed to produce carbon and oxygen. In many of these embodiments, the resulting dissociation products can include a structural building block and/or a hydrogen-based fuel or other dissociated constituent. The structural building block includes compositions that may be further processed to produce architectural constructs. For example, the structural building blocks can include compounds or molecules resulting from the dissociation process and can include carbon, various organics (e.g. methyl, ethyl, or butyl groups or various alkenes), boron, nitrogen, oxygen, silicon, sulfur, halogens, and/or transition metals. In many applications the building block element does not include hydrogen. In a specific example, methane is dissociated to form hydrogen (or another hydrogen-bearing constituent) and carbon and/or carbon dioxide and/or carbon monoxide (structural building blocks). The carbon and/or carbon dioxide and/or carbon monoxide can be further processed to form polymers, graphene, carbon fiber, and/or another architectural construct. The architectural construct can include a self-organized structure (e.g., a crystal) formed from any of a variety of suitable elements, including the elements described above (carbon, nitrogen, boron, silicon, sulfur, and/or transition metals). In any of these embodiments, the architectural construct can form durable goods, e.g., graphene or carbon composites, and/or other structures.

While any one or more of the following representative reactors and associated components, devices and methodologies may be used in conjunction with the systems described above, certain reactors may have particularly synergistic and/or otherwise beneficial effects in such embodiments. For example, the induction reactor described below under heading 3.6 can be used in the first region 118a described above with reference to FIG. 2 to dissociate methane (or another hydrogen donor) into a hydrogen-bearing constituent and a donor-bearing constituent.

3.1 Representative Reactors with Transmissive Surfaces

Figure 5:
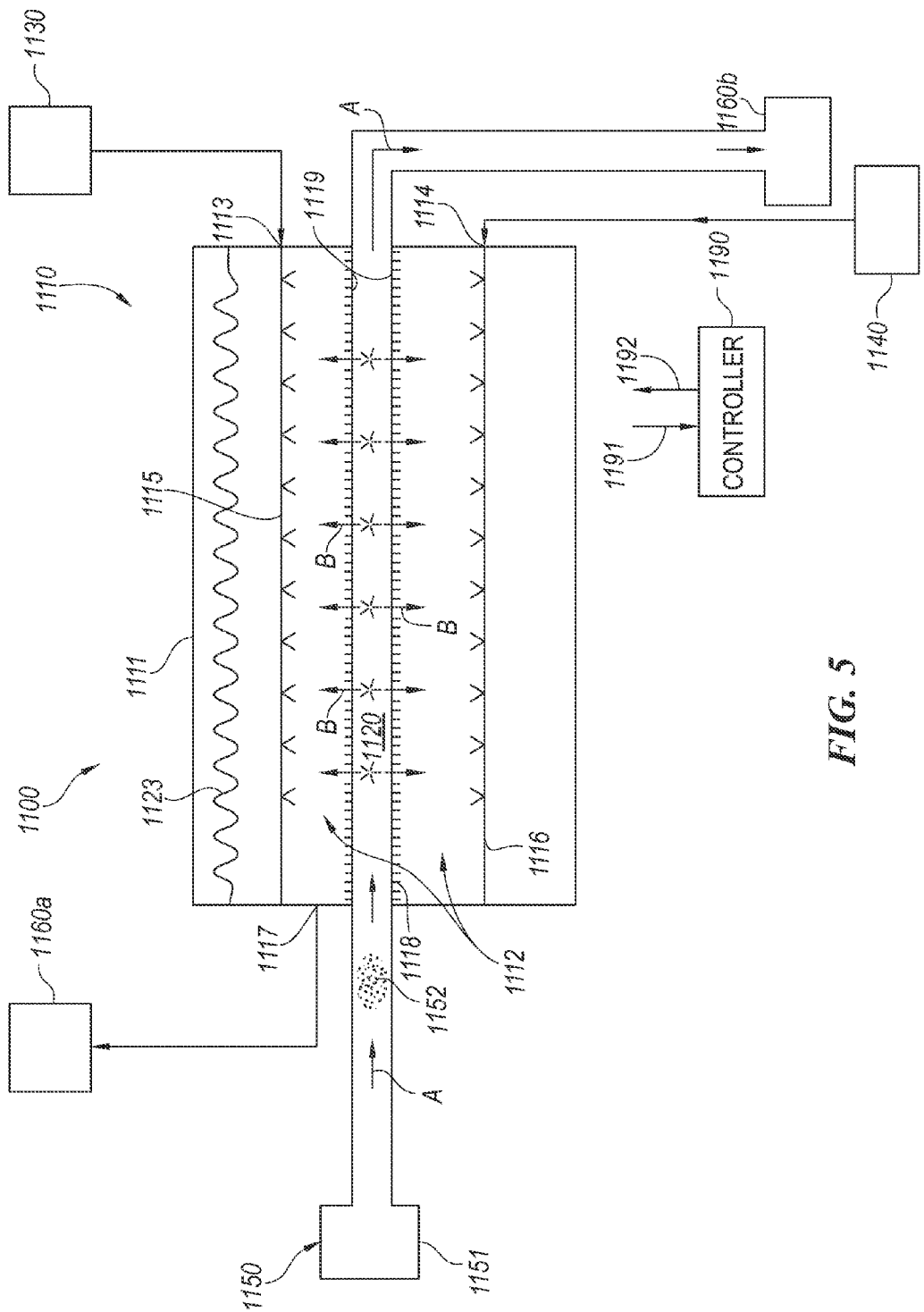
FIG. 5 is a partially schematic, partially cross-sectional illustration of a system having a reactor with transmissive surfaces in accordance with an embodiment of the disclosed technology.

FIG. 5 is a partially schematic illustration of a system 1100 that includes a reactor 1110. The reactor 1110 further includes a reactor vessel 1111 that encloses or partially encloses a reaction zone 1112. The reactor vessel 1111 has one or more transmissive surfaces positioned to facilitate the chemical reaction taking place within the reaction zone 1112. In a representative example, the reactor vessel 1111 receives a hydrogen donor provided by a donor source 1130 to a donor entry port 1113. For example, the hydrogen donor can include a nitrogenous compound such as ammonia or a compound containing carbon and hydrogen such as methane or another hydrocarbon. The hydrogen donor can be suitably filtered before entering the reaction zone 1112 to remove contaminants, e.g., sulfur. A donor distributor or manifold 1115 within the reactor vessel 1111 disperses or distributes the hydrogen donor into the reaction zone 1112. The reactor vessel 1111 also receives an oxygen donor such as an alcohol or steam from a steam/water source 1140 via a steam entry port 1114. A steam distributor 1116 in the reactor vessel 1111 distributes the steam into the reaction zone 1112. The reactor vessel 1111 can further include a heater 1123 that supplies heat to the reaction zone 1112 to facilitate endothermic reactions. Such reactions can include dissociating a compound such as a nitrogenous compound, or a compound containing hydrogen and carbon such as methane or another hydrocarbon into hydrogen or a hydrogen compound, and carbon or a carbon compound. The products of the reaction exit the reactor vessel 1111 via an exit port 1117 and are collected at a reaction product collector 1160a.

The system 1100 can further include a source 1150 of radiant energy and/or additional reactants, which provides constituents to a passage 1118 within the reactor vessel 1111. For example, the radiant energy/reactant source 1150 can include a combustion chamber 1151 that provides hot combustion products 1152 to the passage 1118, as indicated by arrow A. A combustion products collector 1160b collects combustion products exiting the reactor vessel 1111 for recycling and/or other uses. In a particular embodiment, the combustion products 1152 can include carbon dioxide, carbon monoxide, water vapor, and other constituents. One or more transmissive surfaces 1119 are positioned between the reaction zone 1112 (which can be disposed annularly around the passage 1118) and an interior region 1120 of the passage 1118. The transmissive surface 1119 can accordingly allow radiant energy and/or a chemical constituent to pass radially outwardly from the passage 1118 into the reaction zone 1112, as indicated by arrows B. By delivering the radiant energy and/or chemical constituent(s) provided by the flow of combustion products 1152, the system 1100 can enhance the reaction taking place in the reaction zone 1112, for example, by increasing the reaction zone temperature and/or pressure, and therefore the reaction rate, and/or the thermodynamic efficiency of the reaction. Similarly, a chemical constituent such as water or steam can be recycled or otherwise added from the passage 1118 to replace water or steam that is consumed in the reaction zone 1112. In a particular aspect of this embodiment, the combustion products and/or other constituents provided by the source 1150 can be waste products from another chemical process (e.g., an internal combustion process). Accordingly, the foregoing process can recycle or reuse energy and/or constituents that would otherwise be wasted, in addition to facilitating the reaction at the reaction zone 1112.

The composition and structure of the transmissive surface 1119 can be selected to allow radiant energy to readily pass from the interior region 1120 of the passage 1118 to the reaction zone 1112. For example, the transmissive surface 1119 can include glass or another material that is transparent or at least partially transparent to infrared energy and/or radiant energy at other wavelengths that are useful for facilitating the reaction in the reaction zone 1112. In many cases, the radiant energy is present in the combustion product 1152 as an inherent result of the combustion process. In other embodiments, an operator can introduce additives into the stream of combustion products 1152 to increase the amount of energy extracted from the stream and delivered to the reaction zone 1112 in the form of radiant energy. For example, the combustion products 1152 can be seeded with sodium, potassium, and/or magnesium, which can absorb energy from the combustion products 1152 and radiate the energy outwardly through the transmissive surface 1119. In particular embodiments, the walls of the reaction zone 1112 can be dark and/or can have other treatments that facilitate drawing radiant energy into the reaction zone 1112. However, it is also generally desirable to avoid forming particulates and/or tars, which may be more likely to form on dark surfaces. Accordingly, the temperature on the reaction zone 1112 and the level of darkness can be controlled/selected to produce or to prevent tar/particulate formation.

In particular embodiments, the process performed at the reaction zone includes a conditioning process to produce darkened radiation receiver zones, for example, by initially providing heat to particular regions of the reaction zone 1112. After these zones have been heated sufficiently to cause dissociation, a small amount of a hydrogen donor containing carbon is introduced to cause carbon deposition or deposition of carbon-rich material. Such operations may be repeated as needed to restore darkened zones as desired.

In another particular aspect of this embodiment, the process can further includes preventing undesirable solids or liquids, such as particles and/or tars produced by dissociation of carbon donors, from forming at certain areas and/or blocking passageways including the entry port 1113 and the distributor 1115. This can be accomplished by supplying heat from the heater 1123 and/or the transmissive surface 1119 to an oxygen donor (such as steam) to heat the oxygen donor. When the oxygen donor is heated sufficiently, it can supply the required endothermic heat and react with the carbon donor without allowing particles or tar to be formed. For example, a carbon donor such as methane or another compound containing carbon and hydrogen receives heat from steam to form carbon monoxide and hydrogen and thus avoids forming of undesirable particles and/or tar.

As noted above, the combustion products 1152 can include steam and/or other constituents that may serve as reactants in the reaction zone 1112. Accordingly, the transmissive surface 1119 can be manufactured to selectively allow such constituents into the reaction zone 1112, in addition to or in lieu of admitting radiant energy into the reaction zone 1112. In a particular embodiment, the transmissive surface 1119 can be formed from a carbon crystal structure, for example, a layered graphene structure. The carbon-based crystal structure can include spacings (e.g., between parallel layers oriented transverse to the flow direction A) that are deliberately selected to allow water molecules to pass through. At the same time, the spacings can be selected to prevent useful reaction products produced in the reaction zone 1112 from passing out of the reaction zone. Suitable structures and associated methods are further disclosed in pending U.S. patent application Ser. No. 12/857,228 titled "ARCHITECTURAL CONSTRUCT HAVING FOR EXAMPLE A PLURALITY OF ARCHITECTURAL CRYSTALS" filed Feb. 14, 2011 and incorporated herein by reference. The structure used to form the transmissive surface 1119 can be carbon-based, as discussed above, and/or can be based on other elements capable of forming a self-organized structures, or constituents capable of modifying the surface of 1119 to pass or re-radiate particular radiation frequencies, and/or block or pass selected molecules. Such elements can include transition metals, boron, nitrogen, silicon, and sulfur, among others. In particular embodiments, the transmissive surface 1119 can include re-radiating materials selected to re-radiate energy at a wavelength that is particularly likely to be absorbed by one or more reactants in the reaction zone 1112. The walls of the reaction zone 1112 can include such material treatments in addition to or in lieu of providing such treatments to the transmissive surface 1119. Further details of such structures, materials and treatments are disclosed below in Section 3.2.

The system 1100 can further include a controller 1190 that receives input signals 1191 (e.g., from sensors) and provides output signals 1192 (e.g., control instructions) based at least in part on the inputs 1191. Accordingly, the controller 1190 can include suitable processor, memory and I/O capabilities. The controller 1190 can receive signals corresponding to measured or sensed pressures, temperatures, flow rates, chemical concentrations and/or other suitable parameters, and can issue instructions controlling reactant delivery rates, pressures and temperatures, heater activation, valve settings and/or other suitable actively controllable parameters. An operator can provide additional inputs to modify, adjust and/or override the instructions carried out autonomously by the controller 1190.

One feature of forming the transmissive surface 1119 from graphene or other crystal structures is that it can allow both radiant energy and useful constituents (e.g., water) to pass into the reaction zone 1112. In a particular embodiment, the spacing between graphene layers can be selected to "squeeze" or otherwise orient water molecules in a manner that tends to present the oxygen atom preferentially at the reaction zone 1112. Accordingly, those portions of the reaction that use the oxygen (e.g., oxidation or oxygenation steps) can proceed more readily than they otherwise would. As a result, this mechanism can provide a further avenue for facilitating the process of dissociating elements or compounds from the hydrogen donor and water, (and/or other reactants) and reforming suitable end products.

Figure 6:
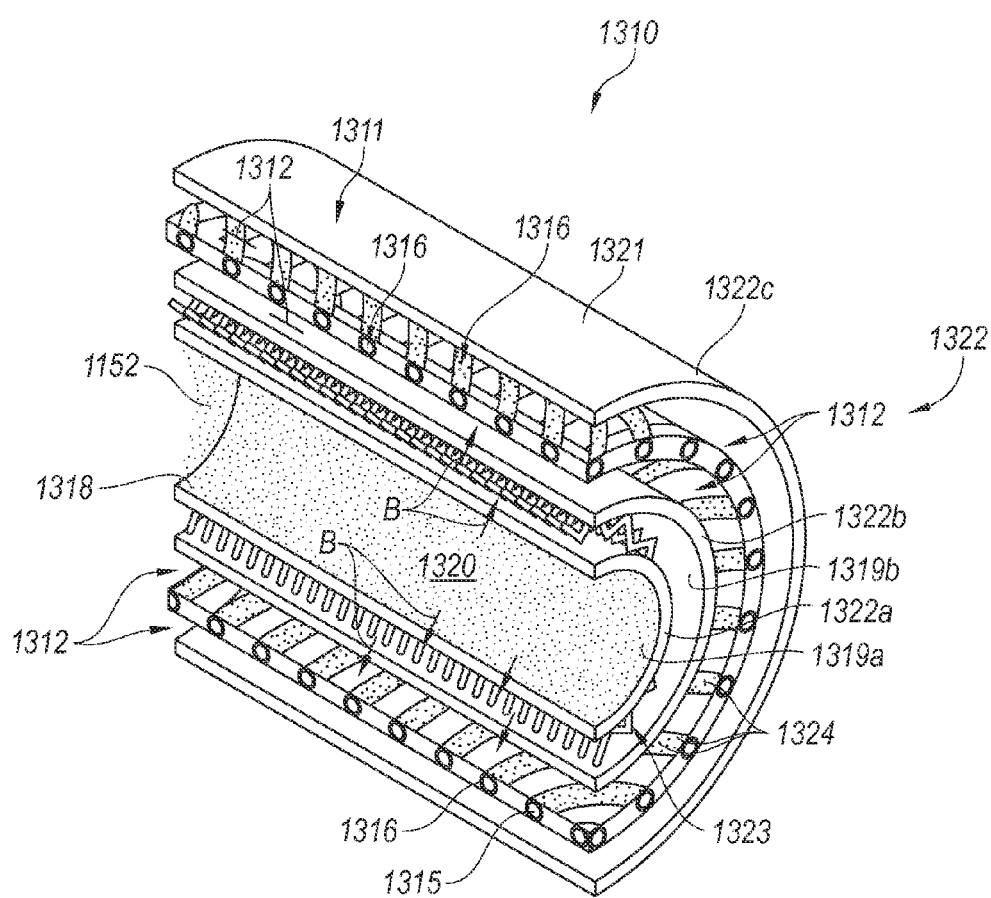
FIG. 6 is a partially schematic, cut-away illustration of a portion of a reactor having transmissive surfaces positioned annularly in accordance with an embodiment of the disclosed technology.

FIG. 6 is a partially schematic, partially cut-away illustration of a reactor 1310 that includes a vessel 1311 formed from three annularly (e.g., concentrically) positioned conduits 1322. Accordingly, the reactor 1310 can operate in a continuous flow manner. As used herein, "continuous flow" refers generally to a process in which reactants and products can be provided to and removed from the reactor vessel continuously without halting the reaction to reload the reaction zone with reactants. In other embodiments, the reactor 1310 can operate in a batch manner during which reactants are intermittently supplied to the reaction zone and products are intermittently removed from the reaction zone. The three conduits 1322 include a first or inner conduit 1322a, a second or intermediate conduit 1322b, and a third or outer conduit 1322c. The first conduit 1322a bounds a combustion products passage 1318 and accordingly has an interior region 1320 through which the combustion products 1152 pass. The first conduit 1322a has a first transmissive surface 1319a through which radiant energy passes in a radially outward direction, as indicated by arrows B. In a particular aspect of this embodiment, the annular region between the first conduit 1322a and the second conduit 1322b houses a heater 1323, and the annular region between the second conduit 1322b and the third conduit 1322c houses a reaction zone 1312. The heater 1323 together with the radiant heat from the combustion products 1152 provides heat to the reaction zone 1312. Accordingly, the second conduit 1322b can include a second transmissive surface 1319b that allows radiant energy from both the combustion products 1152 and the heater 1323 to pass radially outwardly into the reaction zone 1312. In a particular aspect of this embodiment, the first transmissive surface 1319a and the second transmissive surface 1319b are not transmissible to chemical constituents of the combustion products 1152, in order to avoid contact (e.g., corrosive or other damaging contact) between the combustion products 1152 and the heater 1323. In another embodiment, the heater 1323 can be manufactured (e.g., with appropriate coatings, treatments, or other features) in a manner that protects it from chemical constituents passing through the first and second transmissive surfaces 1319a, 1319b. In still another embodiment, the heater 1323 can be positioned outwardly from the reaction zone 1312. In any of these embodiments, the heater 1323 can include an electrical resistance heater, an induction heater or another suitable device. In at least some instances, the heater 1323 is powered by combusting a portion of the hydrogen produced in the reaction zone 1312. In other embodiments, combustion is performed in the reactor itself, for example, with the second conduit 1322b serving as a gas mantle for radiating energy at frequencies selected to accelerate the desired reactions in reaction zone 1312.

In any of the forgoing embodiments, the reaction zone 1312 can house one or more steam distributors 1316 and one or more hydrogen donor distributors 1315. Each of the distributors 1315, 1316 can include pores 1324 and/or other apertures, openings or passages that allow chemical reactants to enter the reaction zone 1312. The donor distributors 1315, 1316 can include one or more spiral conduits, including, e.g., conduits arranged in a braided fashion to distribute reactants into the reaction zone uniformly in the axial, radial and circumferential directions. The reaction zone 1312 is bounded by the third conduit 1322c which can have an insulated reactor outer surface 1321 to conserve heat within the reaction zone 1312. During operation, the reaction taking place in the reaction zone 1312 can be controlled by adjusting the rate at which steam and the hydrogen donor enter the reaction zone 1312, the rate at which heat enters the reaction zone 1312 (via the combustion product passage 1318 and/or the heater 1323) and other variables, including the pressure at the reaction zone 1312. Appropriate sensors and control feedback loops carry out these processes autonomously, with optional controller intervention, as described above with reference to FIG. 5.

Still further embodiments of suitable reactors with transmissive surfaces are disclosed in pending U.S. application Ser. No. 13/026,996, filed Feb. 14, 2011, and incorporated herein by reference.

3.2 Representative Reactors with Re-Radiative Components

Figure 7:
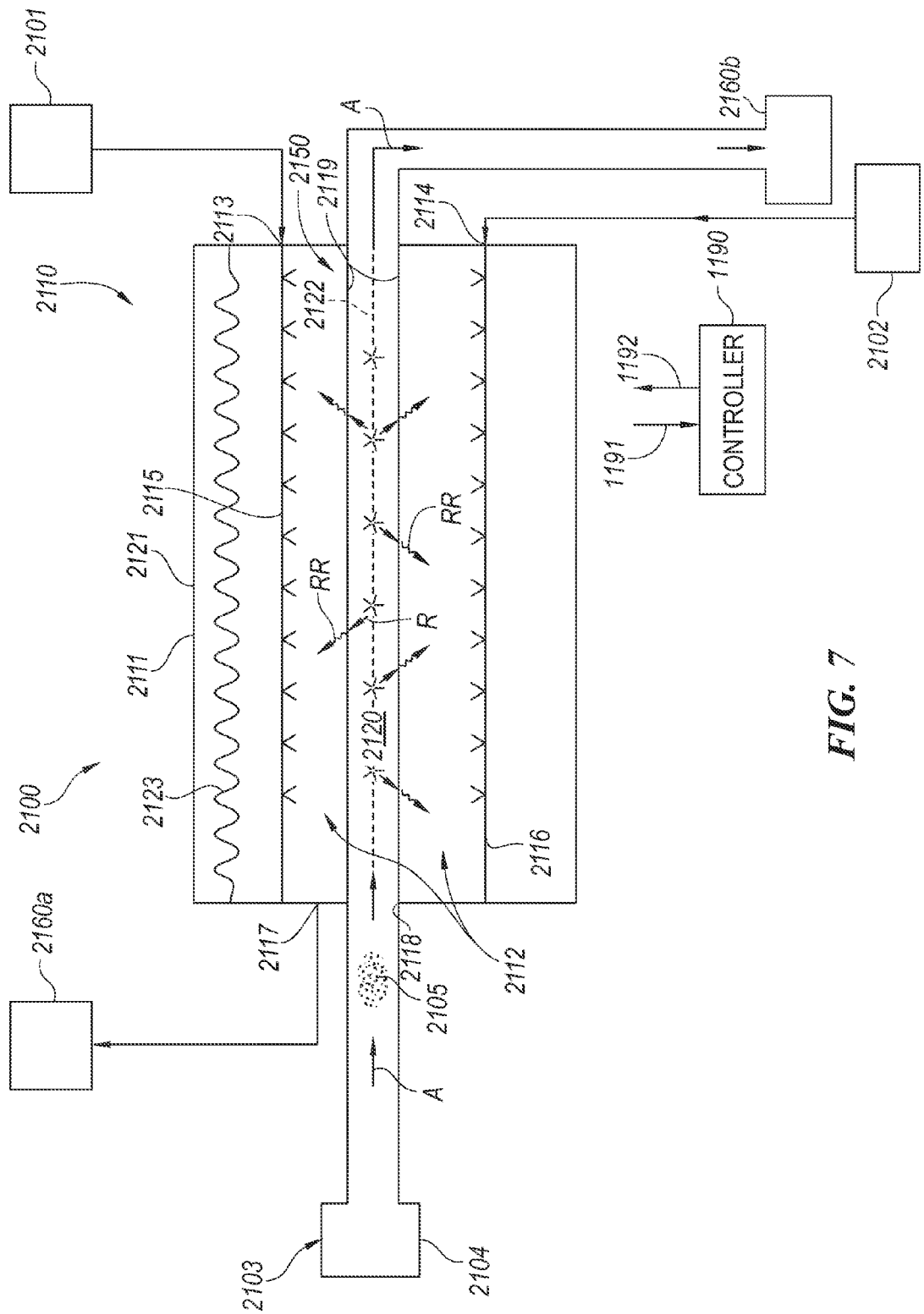
FIG. 7 is a partially schematic, partially cross-sectional illustration of a system having a reactor with a re-radiation component in accordance with an embodiment of the presently disclosed technology.

FIG. 7 is a partially schematic illustration of a system 2100 that includes a reactor 2110 having one or more selective (e.g., re-radiative) surfaces in accordance with embodiments of the disclosure. The reactor 2110 further includes a reactor vessel 2111 having an outer surface 2121 that encloses or partially encloses a reaction zone 2112. In a representative example, the reactor vessel 2111 receives a hydrogen donor provided by a donor source 2101 to a donor entry port 2113. For example, the hydrogen donor can include methane or another hydrocarbon. A donor distributor or manifold 2115 within the reactor vessel 2111 disperses or distributes the hydrogen donor into the reaction zone 2112. The reactor vessel 2111 also receives steam from a steam/water source 2102 via a steam entry port 2114. A steam distributor 2116 in the reactor vessel 2111 distributes the steam into the reaction zone 2112. The reactor vessel 2111 can still further include a heater 2123 that supplies heat to the reaction zone 2112 to facilitate endothermic reactions. Such reactions can include dissociating methane or another hydrocarbon into hydrogen or a hydrogen compound, and carbon or a carbon compound. The products of the reaction (e.g., carbon and hydrogen) exit the reactor vessel 2111 via an exit port 2117 and are collected at a reaction product collector 2160a.

The system 2100 can further include a source 2103 of radiant energy and/or additional reactants, which provides constituents to a passage 2118 within the reactor vessel 2111. For example, the radiant energy/reactant source 2103 can include a combustion chamber 2104 that provides hot combustion products 2105 to the passage 2118, as indicated by arrow A. In a particular embodiment, the passage 2118 is concentric relative to a passage centerline 2122. In other embodiments, the passage 2118 can have other geometries. A combustion products collector 2160b collects combustion products exiting the reactor vessel 2111 for recycling and/or other uses. In a particular embodiment, the combustion products 2105 can include carbon monoxide, water vapor, and other constituents.

One or more re-radiation components 2150 are positioned between the reaction zone 2112 (which can be disposed annularly around the passage 2118) and an interior region 2120 of the passage 2118. The re-radiation component 2150 can accordingly absorb incident radiation R from the passage 2118 and direct re-radiated energy RR into the reaction zone 2112. The re-radiated energy RR can have a wavelength spectrum or distribution that more closely matches, approaches, overlaps and/or corresponds to the absorption spectrum of at least one of the reactants and/or at least one of the resulting products. By delivering the radiant energy at a favorably shifted wavelength, the system 2100 can enhance the reaction taking place in the reaction zone 2112, for example, by increasing the efficiency with which energy is absorbed by the reactants, thus increasing the reaction zone temperature and/or pressure, and therefore the reaction rate, and/or the thermodynamic efficiency of the reaction. In a particular aspect of this embodiment, the combustion products 2105 and/or other constituents provided by the source 2103 can be waste products from another chemical process (e.g., an internal combustion process). Accordingly, the foregoing process can recycle or reuse energy and/or constituents that would otherwise be wasted, in addition to facilitating the reaction at the reaction zone 2112.

In at least some embodiments, the re-radiation component 2150 can be used in conjunction with, and/or integrated with, a transmissive surface 2119 that allows chemical constituents (e.g., reactants) to readily pass from the interior region 2120 of the passage 2118 to the reaction zone 2112. Further details of representative transmissive surfaces were discussed above under heading 3.1. In other embodiments, the reactor 2110 can include one or more re-radiation components 2150 without also including a transmissive surface 2119. In any of these embodiments, the radiant energy present in the combustion product 2105 may be present as an inherent result of the combustion process. In other embodiments, an operator can introduce additives into the stream of combustion products 2105 (and/or the fuel that produces the combustion products) to increase the amount of energy extracted from the stream and delivered to the reaction zone 2112 in the form of radiant energy. For example, the combustion products 2105 (and/or fuel) can be seeded with sources of sodium, potassium, and/or magnesium, which can absorb energy from the combustion products 2105 and radiate the energy outwardly into the reaction zone 2112 at desirable frequencies. These illuminant additives can be used in addition to the re-radiation component 2150.

Figure 8:
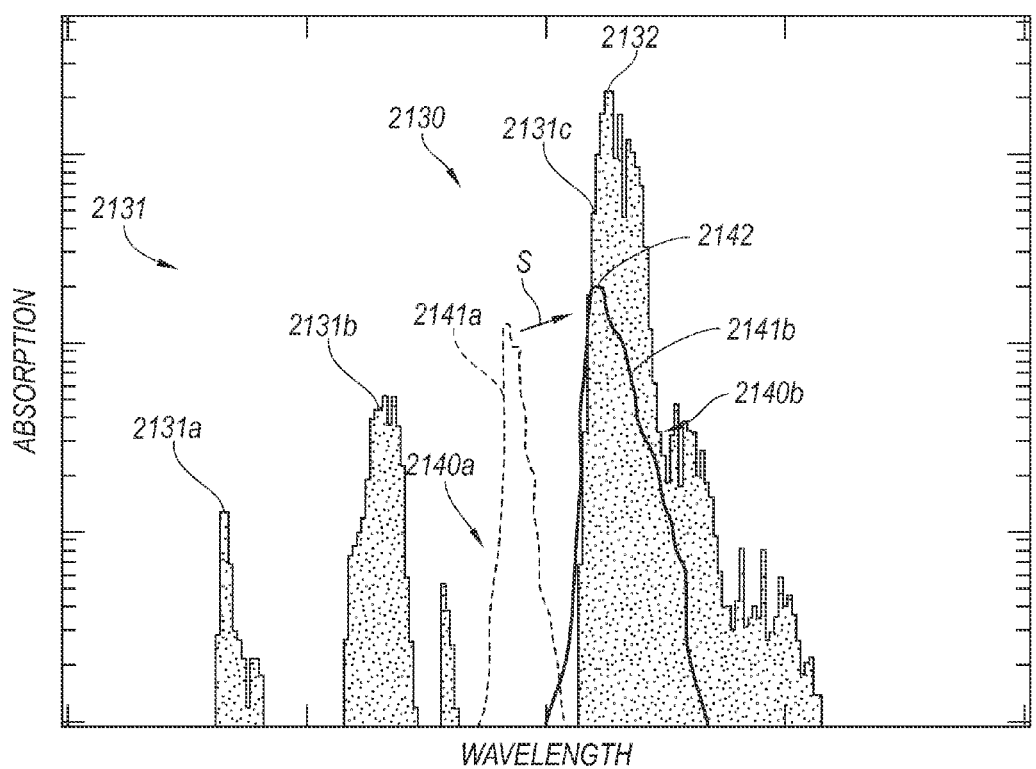
FIG. 8 illustrates absorption characteristics as a function of wavelength for a representative reactant and re-radiation material, in accordance with an embodiment of the presently disclosed technology.

FIG. 8 is a graph presenting absorption as a function of wavelength for a representative reactant (e.g., methane) and a representative re-radiation component. FIG. 8 illustrates a reactant absorption spectrum 2130 that includes multiple reactant peak absorption ranges 2131, three of which are highlighted in FIG. 8 as first, second and third peak absorption ranges 2131a, 2131b, 2131c. The peak absorption ranges 2131 represent wavelengths for which the reactant absorbs more energy than at other portions of the spectrum 2130. The spectrum 2130 can include a peak absorption wavelength 2132 within a particular range, e.g., the third peak absorption range 2131c.

FIG. 8 also illustrates a first radiant energy spectrum 2140a having a first peak wavelength range 2141a. For example, the first radiant energy spectrum 2140a can be representative of the emission from the combustion products 2105 described above with reference to FIG. 7. After the radiant energy has been absorbed and re-emitted by the re-radiation component 2150 described above, it can produce a second radiant energy spectrum 2140b having a second peak wavelength range 2141b, which in turn includes a re-radiation peak value 2142. In general terms, the function of the re-radiation component 2150 is to shift the spectrum of the radiant energy from the first radiant energy spectrum 2140a and peak wavelength range 2141a to the second radiant energy spectrum 2140b and peak wavelength range 2141b, as indicated by arrow S. As a result of the shift, the second peak wavelength range 2141b is closer to the third peak absorption range 2131c of the reactant than is the first peak wavelength range 2141a. For example, the second peak wavelength range 2141b can overlap with the third peak absorption range 2131c and in a particular embodiment, the re-radiation peak value 2142 can be at, or approximately at the same wavelength as the reactant peak absorption wavelength 2132. In this manner, the re-radiation component more closely aligns the spectrum of the radiant energy with the peaks at which the reactant efficiently absorbs energy. Representative structures for performing this function are described in further detail below with reference to FIG. 9.

Figure 9:
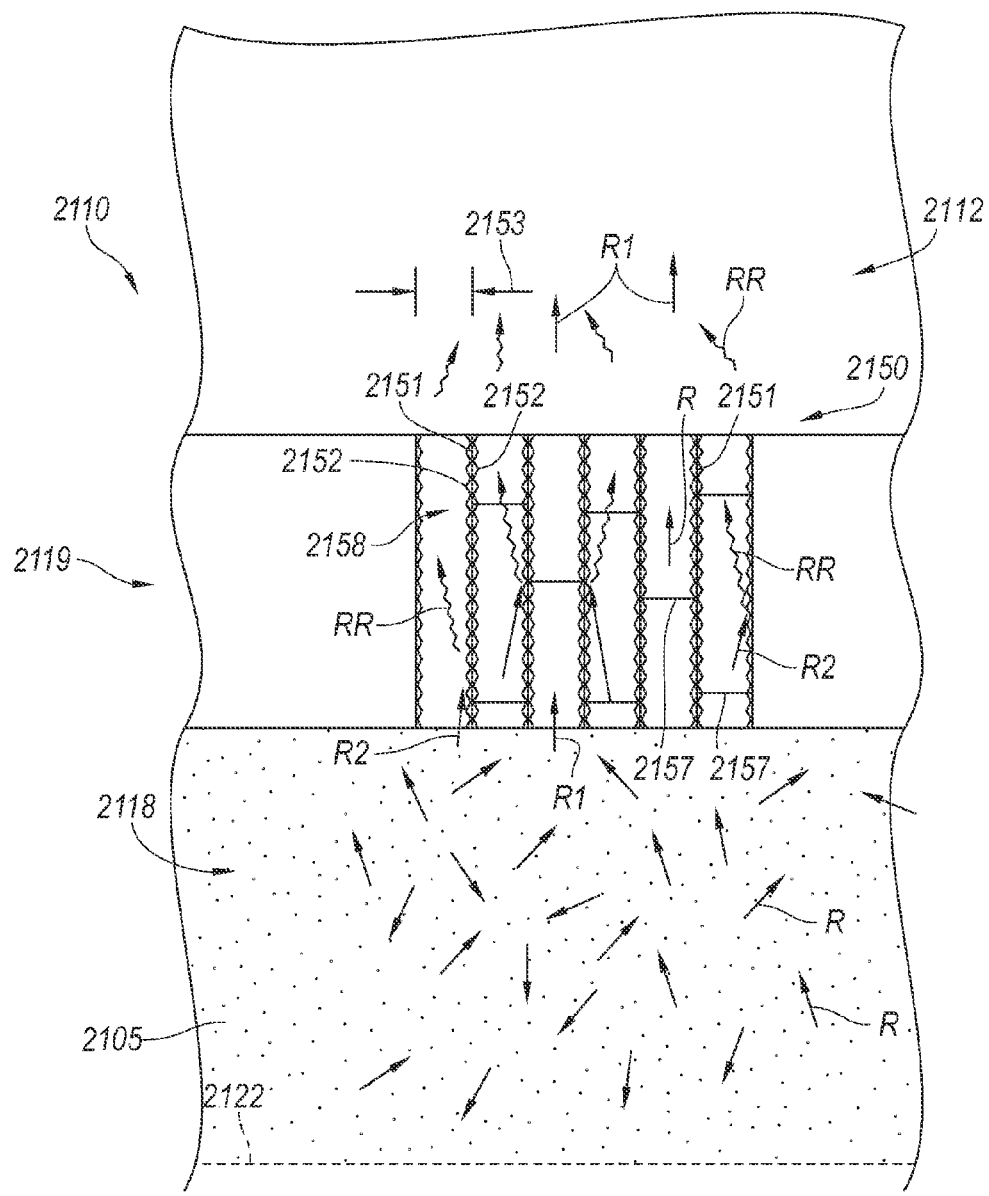
FIG. 9 is an enlarged, partially schematic illustration of a portion of the reactor shown in FIG. 7 having a re-radiation component configured in accordance with a particular embodiment of the presently disclosed technology.

FIG. 9 is a partially schematic, enlarged cross-sectional illustration of a portion of the reactor 2110 described above with reference to FIG. 7, having a re-radiation component 2150 configured in accordance with a particular embodiment of the technology. The re-radiation component 2150 is positioned between the passage 2118 (and the radiation energy R in the passage 2118), and the reaction zone 2112. The re-radiation component 2150 can include layers 2151 of material that form spaced-apart structures 2158, which in turn carry a re-radiative material 2152. For example, the layers 2151 can include graphene layers or other crystal or self-orienting layers made from suitable building block elements such as carbon, boron, nitrogen, silicon, transition metals, and/or sulfur. Carbon is a particularly suitable constituent because it is relatively inexpensive and readily available. In fact, it is a target output product of reactions that can be completed in the reaction zone 2112. Further details of suitable structures are disclosed in co-pending U.S. application Ser. No. 12/857,228 previously incorporated herein by reference. Each structure 2158 can be separated from its neighbor by a gap 2153. The gap 2153 can be maintained by spacers 2157 extending between neighboring structures 2158. In particular embodiments, the gaps 2153 between the structures 2158 can be from about 2.5 microns to about 25 microns wide. In other embodiments, the gap 2153 can have other values, depending, for example, on the wavelength of the incident radiative energy R. The spacers 2157 are positioned at spaced-apart locations both within and perpendicular to the plane of FIG. 9 so as not to block the passage of radiation and/or chemical constituents through the component 2150.

The radiative energy R can include a first portion R1 that is generally aligned parallel with the spaced-apart layered structures 2158 and accordingly passes entirely through the re-radiation component 2150 via the gaps 2153 and enters the reaction zone 2112 without contacting the re-radiative material 2152. The radiative energy R can also include a second portion R2 that impinges upon the re-radiative material 2152 and is accordingly re-radiated as a re-radiated portion RR into the reaction zone 2112. The reaction zone 2112 can accordingly include radiation having different energy spectra and/or different peak wavelength ranges, depending upon whether the incident radiation R impinged upon the re-radiative material 2152 or not. This combination of energies in the reaction zone 2112 can be beneficial for at least some reactions. For example, the shorter wavelength, higher frequency (higher energy) portion of the radiative energy can facilitate the basic reaction taking place in the reaction zone 2112, e.g., disassociating methane in the presence of steam to form carbon monoxide and hydrogen. The longer wavelength, lower frequency (lower energy) portion can prevent the reaction products from adhering to surfaces of the reactor 2110, and/or can separate such products from the reactor surfaces. In particular embodiments, the radiative energy can be absorbed by methane in the reaction zone 2112, and in other embodiments, the radiative energy can be absorbed by other reactants, for example, the steam in the reaction zone 2112, or the products. In at least some cases, it is preferable to absorb the radiative energy with the steam. In this manner, the steam receives sufficient energy to be hot enough to complete the endothermic reaction within the reaction zone 2112, without unnecessarily heating the carbon atoms, which may potentially create particulates or tar if they are not quickly oxygenated after dissociation.

The re-radiative material 2152 can include a variety of suitable constituents, including iron carbide, tungsten carbide, titanium carbide, boron carbide, and/or boron nitride. These materials, as well as the materials forming the spaced-apart structures 2158, can be selected on the basis of several properties including corrosion resistance and/or compressive loading. For example, loading a carbon structure with any of the foregoing carbides or nitrides can produce a compressive structure. An advantage of a compressive structure is that it is less subject to corrosion than is a structure that is under tensile forces. In addition, the inherent corrosion resistance of the constituents of the structure (e.g., the foregoing carbides and nitrides) can be enhanced because, under compression, the structure is less permeable to corrosive agents, including steam which may well be present as a reactant in the reaction zone 2112 and as a constituent of the combustion products 2105 in the passage 2118. The foregoing constituents can be used alone or in combination with phosphorus, calcium fluoride and/or another phosphorescent material so that the energy re-radiated by the re-radiative material 2152 may be delayed. This feature can smooth out at least some irregularities or intermittencies with which the radiant energy is supplied to the reaction zone 2112.

Another suitable re-radiative material 2152 includes spinel or another composite of magnesium and/or aluminum oxides. Spinel can provide the compressive stresses described above and can shift absorbed radiation to the infrared so as to facilitate heating the reaction zone 2112. For example, sodium or potassium can emit visible radiation (e.g., red/orange/yellow radiation) that can be shifted by spinel or another alumina-bearing material to the IR band. If both magnesium and aluminum oxides, including compositions with colorant additives such as magnesium, aluminum, titanium, chromium, nickel, copper and/or vanadium, are present in the re-radiative material 2152, the re-radiative material 2152 can emit radiation having multiple peaks, which can in turn allow multiple constituents within the reaction zone 2112 to absorb the radiative energy.

The particular structure of the re-radiation component 2150 shown in FIG. 9 includes gaps 2153 that can allow not only radiation to pass through, but can also allow constituents to pass through. Accordingly, the re-radiation component 2150 can also form the transmissive surface 2119, which, as described above with reference to FIG. 7, can further facilitate the reaction in the reaction zone 2112 by admitting reactants.

Still further embodiments of suitable reactors with re-radiative components are disclosed in pending U.S. application Ser. No. 13/027,015, filed Feb. 14, 2011, and incorporated herein by reference.

3.3 Representative Reactors with Heat Pipes and Heat Pumps

Figure 10:
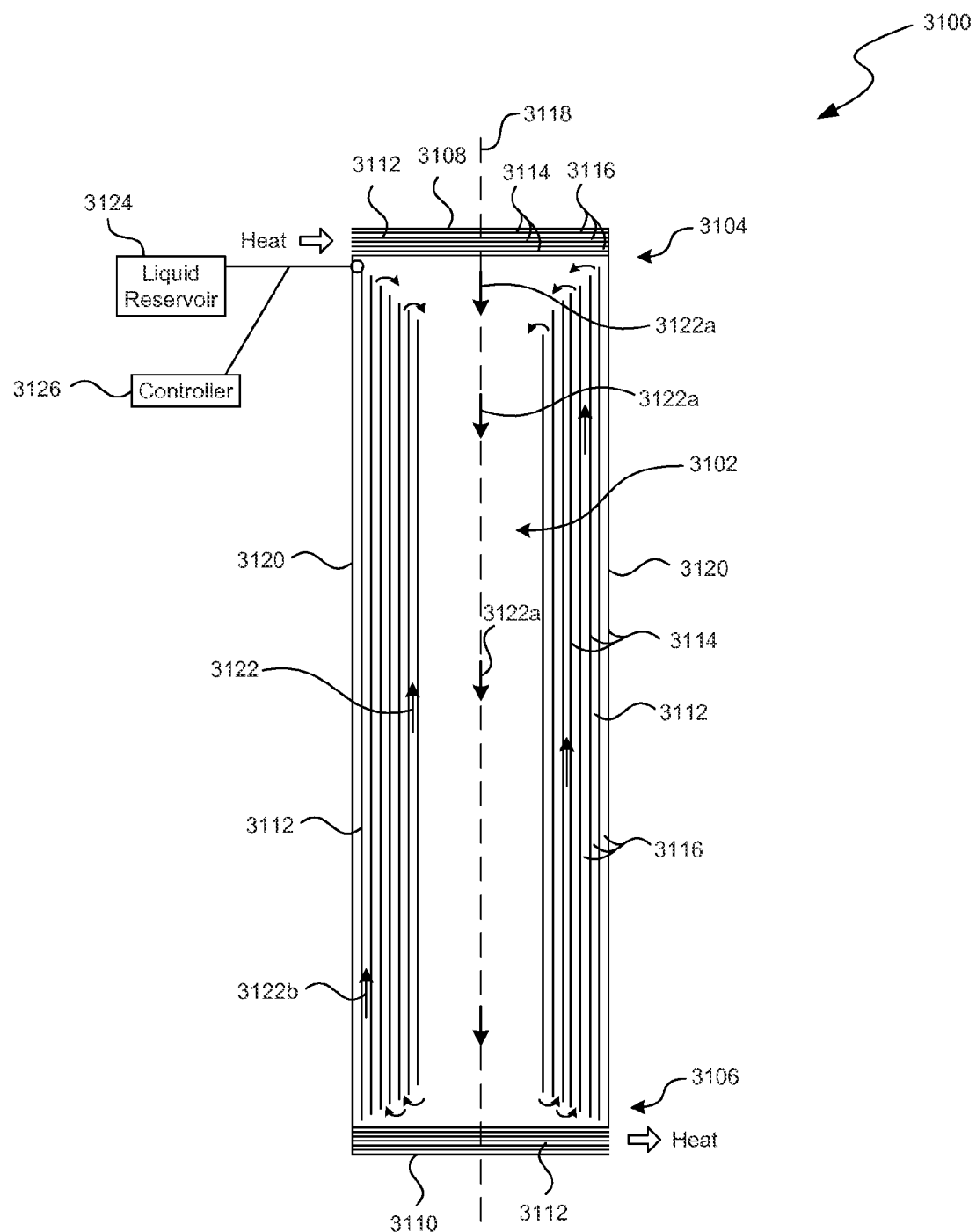
FIG. 10 is a schematic cross-sectional view of a thermal transfer device configured in accordance with an embodiment of the present technology.

FIG. 10 is a schematic cross-sectional view of a thermal transfer device 3100 ("device 3100") configured in accordance with an embodiment of the present technology. As shown in FIG. 10, the device 3100 can include a conduit 3102 that has an input portion 3104, an output portion 3106 opposite the input portion 3104, and a sidewall 3120 between the input and output portions 3104 and 3106. The device 3100 can further include a first end cap 3108 at the input portion 3104 and a second end cap 3110 at the output portion 3106. The device 3100 can enclose a working fluid 3122 (illustrated by arrows) that changes between a vapor phase 3122a and a liquid phase 3122b during a vaporization-condensation cycle.

In selected embodiments, the device 3100 can also include one or more architectural constructs 3112. Architectural constructs 3112 are synthetic matrix characterizations of crystals that are primarily comprised of graphene, graphite, boron nitride, and/or another suitable crystal. The configuration and the treatment of these crystals heavily influence the properties that the architectural construct 3112 will exhibit when it experiences certain conditions. For example, as explained in further detail below, the device 3100 can utilize architectural constructs 3112 for their thermal properties, capillary properties, sorbtive properties, catalytic properties, and electromagnetic, optical, and acoustic properties. As shown in FIG. 10, the architectural construct 3112 can be arranged as a plurality of substantially parallel layers 3114 spaced apart from one another by a gap 3116. In various embodiments, the layers 3114 can be as thin as one atom. In other embodiments, the thickness of the individual layers 3114 can be greater and/or less than one atom and the width of the gaps 3116 between the layers 3114 can vary. Methods of fabricating and configuring architectural constructs, such as the architectural constructs 3112 shown in FIG. 10, are described in U.S. patent application Ser. No. 12/857,228 previously incorporated herein by reference.

As shown in FIG. 10, the first end cap 3108 can be installed proximate to a heat source (not shown) such that the first end cap 3108 serves as a hot interface that vaporizes the working fluid 3122. Accordingly, the first end cap 3108 can include a material with a high thermal conductivity and/or transmissivity to absorb or deliver heat from the heat source. In the embodiment illustrated in FIG. 10, for example, the first end cap 3108 includes the architectural construct 3112 made from a thermally conductive crystal (e.g., graphene). The architectural construct 3112 can be arranged to increase its thermal conductively by configuring the layers 3114 to have a high concentration of thermally conductive pathways (e.g., formed by the layers 3114) substantially parallel to the influx of heat. For example, in the illustrated embodiment, the layers 3114 generally align with the incoming heat flow such that heat enters the architectural construct 3112 between the layers 3114. This configuration exposes the greatest surface area of the layers 3114 to the heat and thereby increases the heat absorbed by the architectural construct 3112. Advantageously, despite having a much lower density than metal, the architectural construct 3112 can conductively and/or radiatively transfer a greater amount of heat per unit area than solid silver, raw graphite, copper, or aluminum.

As further shown in FIG. 10, the second end cap 3110 can expel heat from the device 3100 to a heat sink (not shown) such that the second end cap 3110 serves as a cold interface that condenses the working fluid 3122. The second end cap 3110, like the first end cap 3108, can include a material with a high thermal conductivity (e.g., copper, aluminum) and/or transmissivity to absorb and/or transmit latent heat from the working fluid 3122. Accordingly, like the first end cap 3108, the second end cap 3110 can include the architectural construct 3112. However, rather than bringing heat into the device 3100 like the first end cap 3108, the second end cap 3110 can convey latent heat out of the device 3100. In various embodiments, the architectural constructs 3112 of the first and second end caps 3108 and 3110 can be made from the similar materials and/or arranged to have substantially similar thermal conductivities. In other embodiments, the architectural constructs 3112 can include different materials, can be arranged in differing directions, and/or otherwise configured to provide differing thermal conveyance capabilities including desired conductivities and transmissivities. In further embodiments, neither the first end cap 3108 nor the second end cap 3110 includes the architectural construct 3112.

In selected embodiments, the first end cap 3108 and/or the second end cap 3110 can include portions with varying thermal conductivities. For example, a portion of the first end cap 3108 proximate to the conduit 3102 can include a highly thermally conductive material (e.g., the architectural construct 3112 configured to promote thermal conductivity, copper, etc.) such that it absorbs heat from the heat source and vaporizes the working fluid 3122. Another portion of the first end cap 3108 spaced apart from the conduit 3102 can include a less thermally conductive material to insulate the high conductivity portion. In certain embodiments, for example, the insulative portion can include ceramic fibers, sealed dead air space, and/or other materials or structures with high radiant absorptivities and/or low thermal conductivities. In other embodiments, the insulative portion of the first end cap 3108 can include the architectural construct 3112 arranged to include a low concentration of thermally conductive pathways (e.g., the layers 3114 are spaced apart by large gaps 3116) such that it has a low availability for conductively transferring heat.

In other embodiments, the configurations of the architectural constructs 3112 may vary from those shown in FIG. 10 based on the dimensions of the device 3100, the temperature differential between the heat source and the heat sink, the desired heat transfer, the working fluid 3122, and/or other suitable thermal transfer characteristics. For example, architectural constructs 3112 having smaller surface areas may be suited for microscopic applications of the device 3100 and/or high temperature differentials, whereas architectural constructs 3112 having higher surface areas may be better suited for macroscopic applications of the device 3100 and/or higher rates of heat transfer. The thermal conductivities of the architectural constructs 3112 can also be altered by coating the layers 3114 with dark colored coatings to increase heat absorption and with light colored coatings to reflect heat away and thereby decrease heat absorption.

Referring still to FIG. 10, the device 3100 can return the liquid phase 3122*b* of the working fluid 3122 to the input portion 3104 by capillary action. The sidewall 3120 of the conduit 3102 can thus include a wick structure that exerts a capillary pressure on the liquid phase 3122*b* to drive it toward a desired location (e.g., the input portion 3104). For example, the sidewall 3120 can include cellulose, ceramic wicking materials, sintered or glued metal powder, nanofibers, and/or other suitable wick structures or materials that provide capillary action.

In the embodiment shown in FIG. 10, the architectural construct 3112 is aligned with the longitudinal axis 3118 of the conduit 3102 and configured to exert the necessary capillary pressure to direct the liquid phase 3122*b* of the working fluid 3122 to the input portion 3104. The composition, dopants, spacing, and/or thicknesses of the layers 3114 can be selected based on the surface tension required to provide capillary action for the working fluid 3122. Advantageously, the architectural construct 3112 can apply sufficient capillary pressure on the liquid phase 3122*b* to drive the working fluid 3122 short and long distances (e.g., millimeters to kilometers). Additionally, in selected embodiments, the surface tension of the layers 3114 can be manipulated such that the architectural construct 3112 rejects a preselected fluid. For example, the architectural construct 3112 can be configured to have a surface tension that rejects any liquid other than the liquid phase 3122*b* of the working fluid 3122. In such an embodiment, the architectural construct 3112 can function as a filter that prevents any fluid other than the working fluid 3122 (e.g., fluids tainted by impurities that diffused into the conduit 3102) from interfering with the vaporization-condensation cycle.

In other embodiments, the selective capillary action of the architectural construct 3112 separates substances at far lower temperatures than conventional distillation technologies. The faster separation of substances by the architectural construct 3112 can reduce or eliminates substance degradation caused if the substance reaches higher temperatures within the device 3100. For example, a potentially harmful substance can be removed from the working fluid 3122 by the selective capillary action of the architectural construct 3112 before the working fluid 3122 reaches the higher temperatures proximate to the input portion 3104.

The conduit 3102 and the first and second end caps 3108 and 3110 can be sealed together using suitable fasteners able to withstand the temperature differentials of the device 3100. In other embodiments, the device 3100 is formed integrally. For example, the device 3100 can be molded using one or more materials. A vacuum can be used to remove any air within the conduit 3102, and then the conduit 3102 can be filled with a small volume of the working fluid 3122 chosen to match the operating temperatures.

In operation, the device 3100 utilizes a vaporization-condensation cycle of the working fluid 3122 to transfer heat. More specifically, the first end cap 3108 can absorb heat from the heat source, and the working fluid 3122 can in turn absorb the heat from the first end cap 3108 to produce the vapor phase 3122*a*. The pressure differential caused by the phase change of the working fluid 3122 can drive the vapor phase 3122*a* of the working fluid 3122 to fill the space available and thus deliver the working fluid 3122 through the conduit 3102 to the output portion 3104. At the output portion 3104, the second end cap 3110 can absorb heat from the working fluid 3122 to change the working fluid 3122 to the liquid phase 3122*b*. The latent heat from the condensation of the working fluid 3122 can be transferred out of the device 3100 via the second end cap 3110. In general, the heat influx to the first end cap 3108 substantially equals the heat removed by the second end cap 3110. As further shown in FIG. 10, capillary action provided by the architectural construct 3112 or other wick structure can return the liquid phase 3122*b* of the working fluid 3122 to the input portion 3104. In selected embodiments, the termini of the layers 3114 can be staggered or angled toward the conduit 3102 to facilitate entry of the liquid phase 3122*b* between the layers 3114 and/or to facilitate conversion of the liquid phase 3122*b* to the vapor phase 3122*b* at the input portion 3104. At the input portion 3104, the working fluid 3122 can again vaporize and continue to circulate through the conduit 3102 by means of the vaporization-condensation cycle.

The device 3100 can also operate the vaporization-condensation cycle described above in the reverse direction. For example, when the heat source and heat sink are reversed, the first end cap 3108 can serve as the cold interface and the second end cap 3110 can serve as the hot interface. Accordingly, the input and output portions 3104 and 3106 are inverted such that the working fluid 3122 vaporizes proximate to the second end cap 3110, condenses proximate to the first end cap 3108, and returns to the second end cap 3110 using the capillary action provided by the sidewall 3120. The reversibility of the device 3100 allows the device 3100 to be installed irrespective of the positions of the heat source and heat sink. Additionally, the device 3100 can accommodate environments in which the locations of the heat source and the heat sink may reverse. For example, as described further below, the device 3100 can operate in one direction during the summer to utilize solar energy and the device 3100 can reverse direction during the winter to utilize heat stored during the previous summer.

Embodiments of the device 3100 including the architectural construct 3112 at the first end cap 3108 and/or second end cap 3110 have higher thermal conductivity per unit area than conventional conductors. This increased thermal conductivity can increase process rate and the temperature differential between the first and second end caps 3108 and 3110 to produce greater and more efficient heat transfer. Additionally, embodiments including the architectural construct 3112 at the first and/or second end caps 3108 and 3110 require less surface area to absorb the heat necessary to effectuate the vaporization-condensation cycle. Thus, the device 3100 can be more compact than a conventional heat pipe that transfers an equivalent amount of heat and provide considerable cost reduction.

Referring still to FIG. 10, in various embodiments, the device 3100 can further include a liquid reservoir 3124 in fluid communication with the conduit 3102 such that the liquid reservoir 3124 can collect and store at least a portion of the working fluid 3122. As shown in FIG. 10, the liquid reservoir 3124 can be coupled to the input portion 3104 of the conduit 3102 via a pipe or other suitable tubular shaped structure. The liquid phase 3122*b* can thus flow from the sidewall 3102 (e.g., the architectural construct 3112, wick structure, etc.) into the liquid reservoir 3124. In other embodiments, the liquid reservoir 3124 is in fluid communication with another portion of the conduit 3102 (e.g., the output portion 3106) such that the liquid reservoir 3124 collects the working fluid 3122 in the vapor phase 3122*a* or in mixed phases.

The liquid reservoir 3124 allows the device 3100 to operate in at least two modes: a heat accumulation mode and a heat transfer mode. During the heat accumulation mode, the vaporization-condensation cycle of the working fluid 3122 can be slowed or halted by funneling the working fluid 3122 from the conduit 3102 to the liquid reservoir 3124. The first end cap 3108 can then function as a thermal accumulator that absorbs heat without the vaporization-condensation cycle dissipating the accumulated heat. After the first end cap 3108 accumulates a desired amount of heat and/or the heat source (e.g., the sun) no longer supplies heat, the device 3100 can change to the heat transfer mode by funneling the working fluid 3122 into the conduit 3102. The heat stored in first end cap 3108 can vaporize the incoming working fluid 3122 and the pressure differential can drive the vapor phase 3122*a* toward the output portion 3106 of the conduit 3102 to restart the vaporization-condensation cycle described above. In certain embodiments, the restart of the vaporization-condensation cycle can be monitored to analyze characteristics (e.g., composition, vapor pressure, latent heat, efficiency) of the working fluid 3122.

As shown in FIG. 10, a controller 3126 can be operably coupled to the liquid reservoir 3124 to modulate the rate at which the working fluid 3122 enters the conduit 3102 and/or adjust the volume of the working fluid 3122 flowing into or out of the conduit 3102. The controller 3126 can thereby change the pressure within the conduit 3102 such that the device 3100 can operate at varying temperature differentials between the heat source and sink. Thus, the device 3100 can provide a constant heat flux despite a degrading heat source (e.g., first end cap 3108) or intermittent vaporization-condensation cycles.

FIGS. 11A and 11B are schematic cross-sectional views of thermal transfer devices 3200*a*, 3200*b* ("devices 3200") in accordance with other embodiments of the present technology. Several features of the devices 3200 are generally similar to the features of the device 3100 shown in FIG. 10. For example, each device 3200 can include the conduit 3102, the sidewall 3120, and the first and second end caps 3108 and 3110. The device 3200 also transfers heat from a heat source to a heat sink utilizing a vaporization-condensation cycle of the working fluid 3122 generally similar to that described with reference to FIG. 10. Additionally, as shown in FIGS. 11A and 11B, the device 3200 can further include the liquid reservoir 3124 and the controller 3126 such that the device 3200 can operate in the heat accumulation mode and the heat transfer mode.

The devices 3200 shown in FIGS. 11A and 11B can utilize gravity, rather than the capillary action described in FIG. 10, to return the liquid phase 3122*b* of the working fluid 3122 to the input portion 3104. Thus, as shown in FIGS. 11A and 11B, the heat inflow is below the heat output such that gravity can drive the liquid phase 3122*b* down the sidewall 3120 to the input portion 3104. Thus, as shown in FIG. 11A, the sidewall 3120 need only include an impermeable membrane 3228, rather than a wick structure necessary for capillary action, to seal the working fluid 3122 within the conduit 3102. The impermeable membrane 3228 can be made from a polymer such as polyethylene, a metal or metal alloy such as copper and stainless steel, and/or other suitable impermeable materials. In other embodiments, the devices 3200 can utilize other sources of acceleration (e.g., centrifugal force, capillary action) to return the liquid phase 3122*b* to the input portion 3104 such that the positions of the input and output portions 3104 and 3106 are not gravitationally dependent.

As shown in FIG. 11B, in other embodiments, the sidewall 3120 can further include the architectural construct 3112. For example, the architectural construct 3112 can be arranged such that the layers 3114 are oriented orthogonal to the longitudinal axis 3118 of the conduit 3102 to form thermally conductive passageways that transfer heat away from the conduit 3102. Thus, as the liquid phase 3122*b* flows along the sidewall 3120, the architectural construct 3112 can draw heat from the liquid phase 3122*b*, along the layers 3114, and away from the sidewall 3120 of the device 3200. This can increase the temperature differential between the input and output portions 3104 and 3106 to increase the rate of heat transfer and/or facilitate the vaporization-condensation cycle when the temperature gradient would otherwise be insufficient. In other embodiments, the layers 3114 can be oriented at a different angle with respect to the longitudinal axis 3118 to transfer heat in a different direction. In certain embodiments, the architectural construct 3112 can be positioned radially outward of the impermeable membrane 3228. In other embodiments, the impermeable membrane 3228 can be radially outward of architectural construct 3112 or the architectural construct 3112 itself can provide a sufficiently impervious wall to seal the working fluid 3122 within the conduit 3102.

The first and second end caps 3108 and 3110 shown in FIGS. 11A and 11B can also include the architectural construct 3112. As shown in FIGS. 11A and 11B, the layers 3114 of the architectural constructs 3112 are generally aligned with the direction heat input and heat output to provide thermally conductive passageways that efficiently transfer heat. Additionally, the architectural constructs 3112 of the first and/or second end caps 3108 and 3110 can be configured to apply a capillary pressure for a particular substance entering or exiting the conduit. For example, the composition, spacing, dopants, and/or thicknesses of the layers 3114 of the architectural constructs 3112 can be modulated to selectively draw a particular substance between the layers 3114. In selected embodiments, the architectural construct 3112 can include a first zone of layers 3114 that are configured for a first substance and a second zone of layers 3114 that are configured for a second substance to selectively remove and/or add two or more desired substances from the conduit 3102.

In further embodiments, the second end cap 3110 can utilize the sorbtive properties of the architectural constructs 3112 to selectively load a desired constituent of the working fluid 3122 between the layers 3114. The construction of the architectural construct 3112 can be manipulated to obtain the requisite surface tension to load almost any element or soluble. For example, the layers 3114 can be preloaded with predetermined dopants or materials to adjust the surface tension of adsorption along these surfaces. In certain embodiments, the layers 3114 can be preloaded with $CO_2$ such that the architectural construct 3112 can selectively mine $CO_2$ from the working fluid 3122 as heat releases through the second end cap 3110. In other embodiments, the layers 3114 can be spaced apart from one another by a predetermined distance, include a certain coating, and/or otherwise be arranged to selectively load the desired constituent. In some embodiments, the desired constituent adsorbs onto the surfaces of individual layers 3114, while in other embodiments the desired constituent absorbs into zones between the layers 3114. In further embodiments, substances can be purposefully fed into the conduit 3102 from the input portion 3104 (e.g., through the first end cap 3108) such that the added substance can combine or react with the working fluid 3122 to produce the desired constituent. Thus, the architectural construct 3112 at the second end cap 3110 can facilitate selective mining of constituents. Additionally, the architectural construct 3112 can remove impurities and/or other undesirable solubles that may have entered the conduit 3102 and potentially interfere with the efficiency of the device 3200.

Similarly, in selected embodiments, the architectural construct 3112 at the first end cap 3110 can also selectively load desired compounds and/or elements to prevent them from ever entering the conduit 3102. For example, the architectural construct 3112 can filter out paraffins that can impede or otherwise interfere with the heat transfer of the device 3200. In other embodiments, the devices 3200 can include other filters that may be used to prevent certain materials from entering the conduit 3102.

Moreover, similar to selective loading of compounds and elements, the architectural construct 3112 at the first and second end caps 3108 and 3110 may also be configured to absorb radiant energy of a desired wavelength. For example, the layers 3114 can have a certain thickness, composition, spacing to absorb a particular wavelength of radiant energy. In selected embodiments, the architectural construct 3112 absorbs radiant energy of a first wavelength and converts it into radiant energy of a second wavelength, retransmitting at least some of the absorbed energy. For example, the layers 3114 may be configured to absorb ultraviolet radiation and convert the ultraviolet radiation into infrared radiation.

Additionally, the layers 3114 can also catalyze a reaction by transferring heat to a zone where the reaction is to occur. In other implementations, the layers 3114 catalyze a reaction by transferring heat away from a zone where a reaction is to occur. For example, heat may be conductively transferred into the layers 3114 (e.g., as discussed in U.S. patent application Ser. No. 12/857,515, filed Aug. 16, 2010, entitled "APPARATUSES AND METHODS FOR STORING AND/OR FILTERING A SUBSTANCE" which is incorporated by reference herein in its entirety) to supply heat to an endothermic reaction within a support tube of the layers 3114. In some implementations, the layers 3114 catalyze a reaction by removing a product of the reaction from the zone where the reaction is to occur. For example, the layers 3114 may absorb alcohol from a biochemical reaction within a central support tube in which alcohol is a byproduct, thereby expelling the alcohol on outer edges of the layers 3114, and prolonging the life of a microbe involved in the biochemical reaction.

Figure 12A:
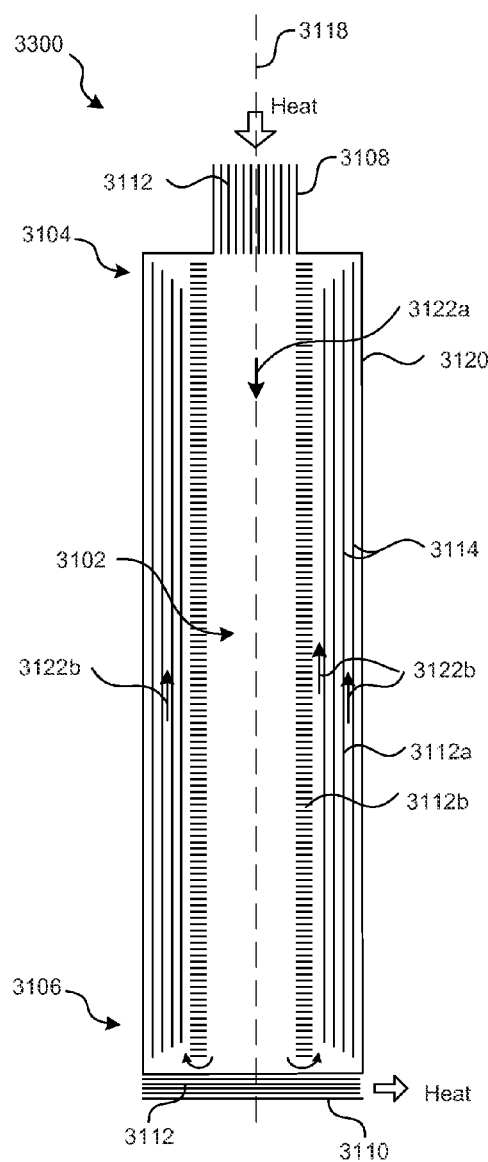
FIG. 12A is a schematic cross-sectional view of a thermal transfer device operating in a first direction in accordance with a further embodiment of the present technology.
Figure 12B:
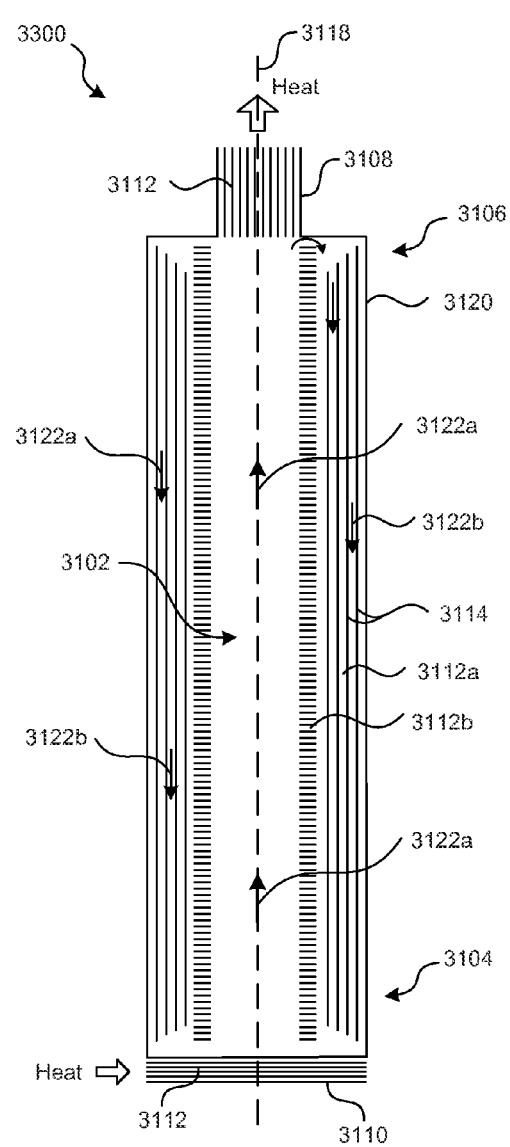
FIG. 12B is a schematic cross-sectional view of the thermal transfer device of FIG. 12A operating in a second direction opposite the first direction.

FIG. 12A is schematic cross-sectional view of a thermal transfer device 3300 ("device 3300") operating in a first direction in accordance with a further embodiment of the present technology, and FIG. 12B is a schematic cross-sectional view of the device 3300 of FIG. 12A operating in a second direction opposite the first direction. Several features of the device 3300 are generally similar to the features of the devices 3100 and 3200 shown in FIG. 10-2B. For example, the device 3300 can include the conduit 3102, the first and second end caps 3108 and 3110, and the architectural construct 3112. As shown in FIGS. 12A and 12B, the sidewall 3120 of the device 3300 can include two architectural constructs 3112: a first architectural construct 3112a having layers 3114 oriented parallel to the longitudinal axis 3118 of the conduit 3102 and a second architectural construct 3112b radially inward from the first architectural construct 3112a having layers 3114 oriented perpendicular to the longitudinal axis 3118. The layers 3114 of the first architectural construct 3112a can perform a capillary action, and the layers 3114 of the second architectural construct 3112b can form thermally conductive passageways that transfer heat away from the side of the conduit 3102 and thereby increase the temperature differential between the input and output portions 3104 and 3106.

Similar to the device 3100 shown in FIG. 10, the device 3300 can also operate when the direction of heat flow changes and the input and output portions 3104 and 3106 are inverted. As shown in FIG. 12A, for example, the device 3300 can absorb heat at the first end cap 3108 to vaporize the working fluid 3122 at the input portion 3104, transfer the heat via the vapor phase 3122a of the working fluid 3122 through the conduit 3102, and expel heat from the second end cap 3110 to condense the working fluid 3122 at the output portion 3106. As further shown in FIG. 12A, the liquid phase 3122b of the working fluid 3122 can move between the layers 3114 of the first architectural construct 3112b by capillary action as described above with reference to FIG. 10. In other embodiments, the sidewall 3120 can include a different capillary structure (e.g., cellulose) that can drive the liquid phase 3122b from the output portion 3106 to the input portion 3104. As shown in FIG. 12B, the conditions can be reversed such that heat enters the device 3300 proximate to the second end cap 3110 and exits the device 3300 proximate to the first end cap 3108. Advantageously, as discussed above, the dual-direction vapor-condensation cycle of the working fluid 3122 accommodates environments in which the locations of the heat source and the heat sink reverse.

Figure 13:
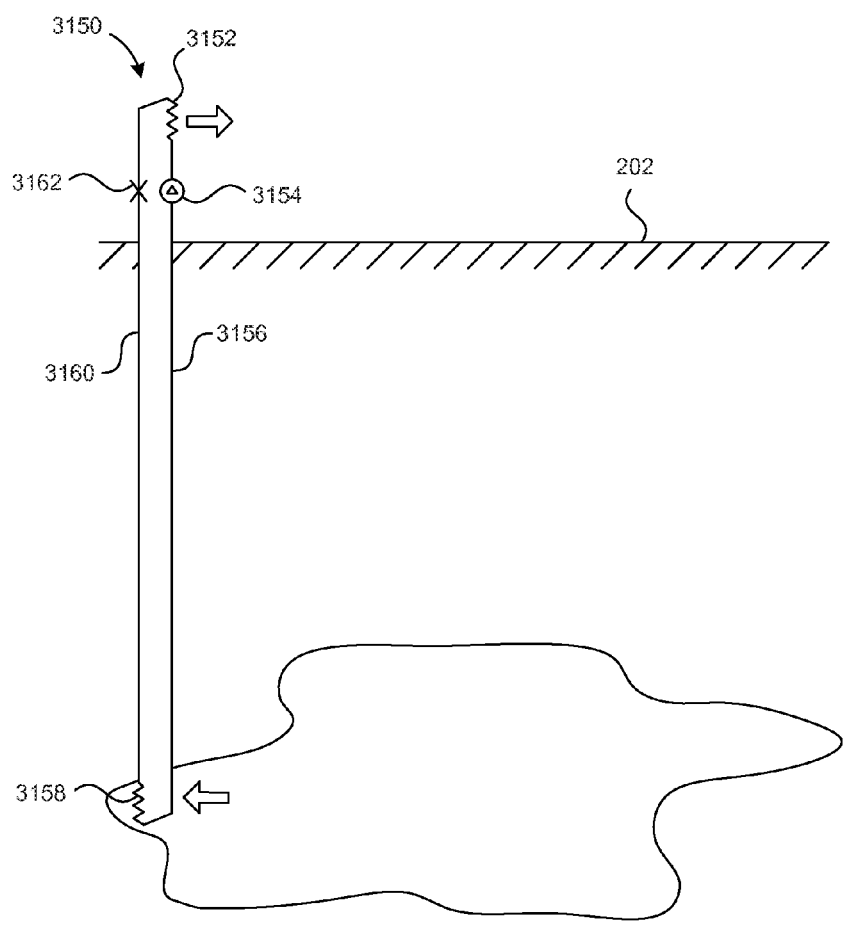
FIG. 13 is a partially schematic illustration of a heat pump suitable for transferring heat in accordance with an embodiment of the present technology.

In at least some embodiments, a heat pump can be used to transfer heat, in addition to or in lieu of a heat pipe, and the transferred heat can be used to enhance the efficiency and/or performance of a reactor to which the heat pump is coupled. In particular embodiments, the heat is extracted from a permafrost, geothermal, ocean and/or other source. FIG. 13 is a partially schematic illustration of a reversible heat pump 3150 positioned to receive heat from a source 3200 (e.g., a geothermal source), as indicated by arrow H1, and deliver the heat at a higher temperature than that of the source, as indicated by arrow H2. The heat pump 3150 transfers heat via a working fluid that can operate in a closed loop refrigeration cycle. Accordingly, the heat pump 3150 can include a compressor 3154, an expansion valve 3162, supply and return conduits 3156, 3160, and first and second heat exchangers 3152, 3158. In operation, the working fluid receives heat from the source 3200 via the second heat exchanger 3158. The working fluid passes through the supply conduit 3156 to the compressor 3154 where it is compressed, and delivers heat (e.g., to a non-combustion reactor) at the first heat exchanger 3152. The working fluid then expands through the expansion valve 3162 and returns to the second heat exchanger 3158 via the return conduit 3160.

The working fluid can be selected based at least in part on the temperature of the source 3200 and the required delivery temperature. For example, the working fluid can be a relatively inert fluid such as Freon, ammonia, or carbon dioxide. Such fluids are compatible with various polymer and metal components. These components can include tube liner polymers such as fluorinated ethylene-propylene, perfluoroalkoxy, polyvinylidene fluoride, tetrafluoroethylene, an ethylene-propylene dimer, and/or many other materials that may be reinforced with fibers such as graphite, E-glass, S-glass, glass-ceramic or various organic filaments to form the conduits 3156, 3160. The heat exchangers 3158 can be made from metal alloys, e.g., Type 304 or other "300" series austenitic stainless steels, aluminum alloys, brass or bronze selections. The compressor 3154 can be a positive displacement or turbine type compressor depending upon factors that include the scale of the application. The expansion valve 3162 can be selected to meet the pressure drop and flow requirements of a particular application.

In a representative embodiment for which the source 3200 is at a moderate temperature (e.g., 125° F. (52° C.)), the working fluid can include carbon dioxide that is expanded through the valve 3162 to a reduced temperature (e.g., 115° F. (46° C.)). The working fluid receives heat at the source 3200 to achieve a representative temperature of 120° F. (49° C.). At the compressor 3154, the temperature of the working fluid is elevated to a representative value of 325° F. (163° C.) or higher. In particular embodiments, one or more additional heat pump cycles (not shown) can be used to further elevate the delivery temperature. It can be particularly advantageous to use heat pump cycles to deliver heat at a higher temperature than the source 3200 because such cycles typically deliver two to ten times more heat energy compared to the energy required for operation of the compressor 3154.

In a generally similar manner, it can be advantageous to use one or more heat pump cycles in reverse to cool a working fluid to a temperature below the ambient temperature and thus "refrigerate" the substance being cooled. For example, permafrost or methane hydrates in lake bottoms or ocean deposits can be cooled to a temperature far below the ambient temperature of the air or surrounding water in such applications.

Still further embodiments of suitable reactors with transmissive surfaces are disclosed in pending U.S. application Ser. No. 13/027,244, filed Feb. 14, 2011, and incorporated herein by reference.

3.4 Representative Reactors with Solar Conveyors

Figure 14:
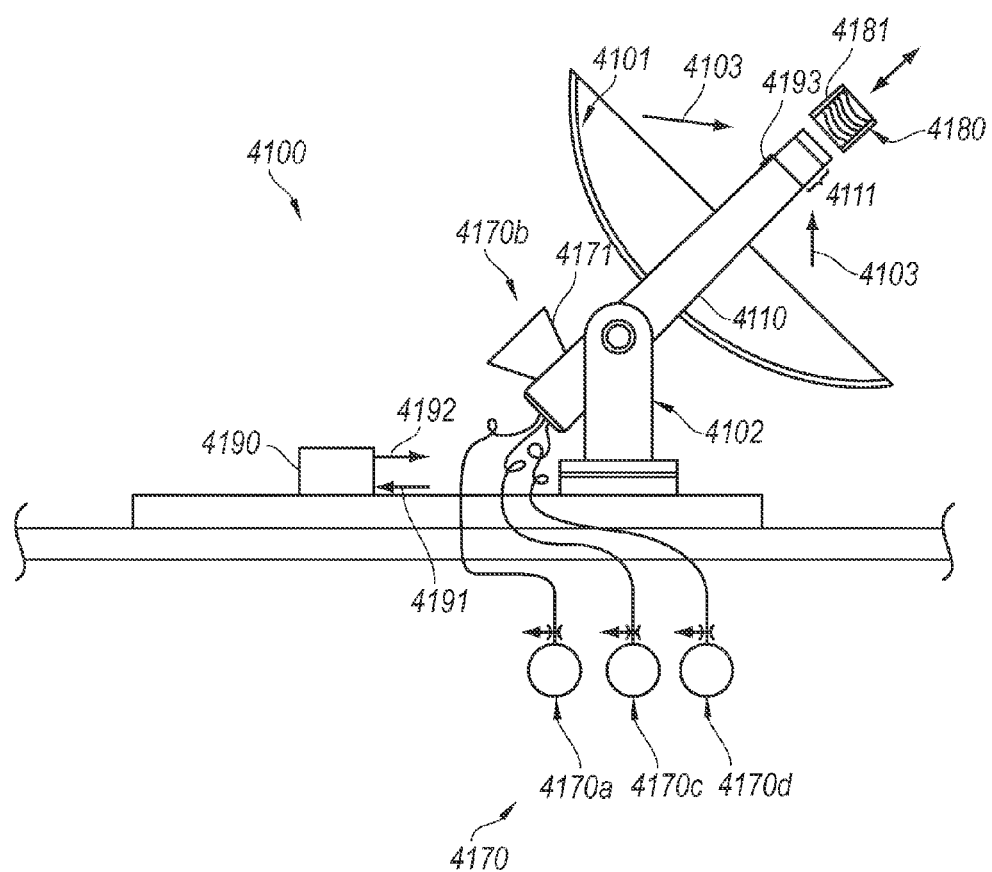
FIG. 14 is a partially schematic illustration of a system having a solar concentrator that directs heat to a reactor vessel in accordance with an embodiment of the disclosed technology.

FIG. 14 is a partially schematic illustration of a system 4100 including a reactor vessel 4110 having a reaction zone 4111. The system 4100 further includes a solar collector 4101 that directs solar energy 4103 to the reaction zone 4111. The solar collector 4103 can include a dish, trough, heliostat arrangement, fresnel lens and/or other radiation-focusing element. The reactor vessel 4110 and the solar collector 4101 can be mounted to a pedestal 4102 that allows the solar collector 4101 to rotate about at least two orthogonal axes in order to continue efficiently focusing the solar energy 4103 as the earth rotates. The system 4100 can further include multiple reactant/product vessels 4170, including first and second reactant vessels 4170a, 4170b, and first and second product vessels, 4170c, 4170d. In particular embodiments, the first reactant vessel 4170a can provide a reactant that contains hydrogen and carbon, such as methane, which is processed at the reaction zone 4111 in an endothermic reaction to produce hydrogen and carbon which is provided to the first and second product vessels 4170c, 4170d, respectively. In other embodiments, other reactants, for example, municipal solid waste streams, biomass reactants, and/or other waste streams can be provided at a hopper 4171 forming a portion of the second reactant vessel 4170b. In any of these embodiments, an internal reactant delivery system and product removal system provide the reactants to the reaction zone 4111 and remove the products from the reaction zone 4111, as will be described in further detail later with reference to FIG. 16.

The system 4100 can further include a supplemental heat source 4180 that provides heat to the reaction zone 4111 when the available solar energy 4103 is insufficient to sustain the endothermic reaction at the reaction zone 4111. In a particular embodiment, the supplemental heat source 4180 can include an inductive heater 4181 that is positioned away from the reaction zone 4111 during the day to allow the concentrated solar energy 4103 to enter the reaction zone 4111, and can slide over the reaction zone 4111 at night to provide heat to the reaction zone 4111. The inductive heater 4181 can be powered by a renewable clean energy source, for example, hydrogen produced by the reactor vessel 4110 during the day, or falling water, geothermal energy, wind energy, or other suitable sources.

In any of the foregoing embodiments, the system 4100 can further include a controller 4190 that receives input signals 4191 and directs the operation of the devices making up the system 4100 via control signals or other outputs 4192. For example, the controller 4190 can receive a signal from a radiation sensor 4193 indicating when the incident solar radiation is insufficient to sustain the reaction at the reaction zone 4111. In response, the controller 4190 can issue a command to activate the supplemental heat source 4180. The controller 4190 can also direct the reactant delivery and product removal systems, described further below with reference to FIG. 16.

Figure 15:
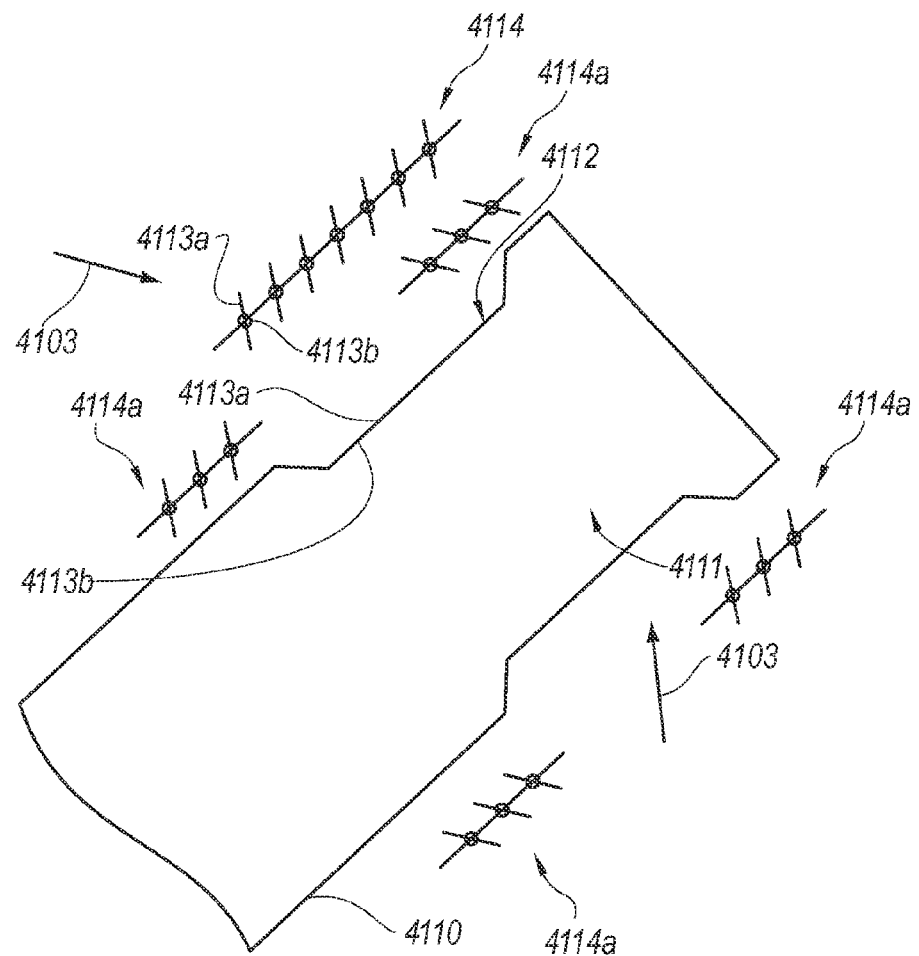
FIG. 15 is a partially schematic, enlarged illustration of a portion of a reactor vessel, including additional features for controlling the delivery of solar energy to the reaction zone in accordance with an embodiment of the disclosed technology.

FIG. 15 is a partially schematic illustration of an embodiment of the reactor vessel 4110 shown in FIG. 14, illustrating a transmissive component 4112 positioned to allow the incident solar energy 4103 to enter the reaction zone 4111. In a particular embodiment, the transmissive component 4112 can include a glass or other suitably transparent, high temperature material that is easily transmissible to solar radiation, and configured to withstand the high temperatures in the reaction zone 4111. For example, temperatures at the reaction zone 4111 are in some embodiments expected to reach 44000° F., and can be higher for the reactants and/or products.

In other embodiments, the transmissive component 4112 can include one or more elements that absorb radiation at one wavelength and re-radiate it at another. For example, the transmissive component 4112 can include a first surface 4113a that receives incident solar energy at one wavelength and a second surface 4113b that re-radiates the energy at another wavelength into the reaction zone 4111. In this manner, the energy provided to the reaction zone 4111 can be specifically tailored to match or approximate the absorption characteristics of the reactants and/or products placed within the reaction zone 4111. Further details of representative re-radiation devices were described above in Section 3.2.

In other embodiments, the reactor vessel 4110 can include other structures that perform related functions. For example, the reactor vessel 4110 can include a Venetian blind arrangement 4114 having first and second surfaces 4113a, 4113b that can be pivoted to present one surface or the other depending upon external conditions, e.g., the level of incident solar energy 4103. In a particular aspect of this embodiment, the first surface 4113a can have a relatively high absorptivity and a relatively low emissivity. This surface can accordingly readily absorb radiation during the day. The second surface 4113b can have a relatively low absorptivity and a relatively high emissivity and can accordingly operate to cool the reaction zone 4111 (or another component of the reactor 4110), e.g., at night. A representative application of this arrangement is a reactor that conducts both endothermic and exothermic reactions, as is described further in Section 3.8 below. Further details of other arrangements for operating the solar collector 4101 (FIG. 14) in a cooling mode are described in Section 3.5 below.

In still further embodiments, the reactor 4110 can include features that redirect radiation that "spills" (e.g., is not precisely focused on the transmissive component 4112) due to collector surface aberrations, environmental defects, non-parallel radiation, wind and/or other disturbances or distortions. These features can include additional Venetian blinds 4114a that can be positioned and/or adjusted to redirect radiation (with or without wavelength shifting) into the reaction zone 4111.

Figure 16:
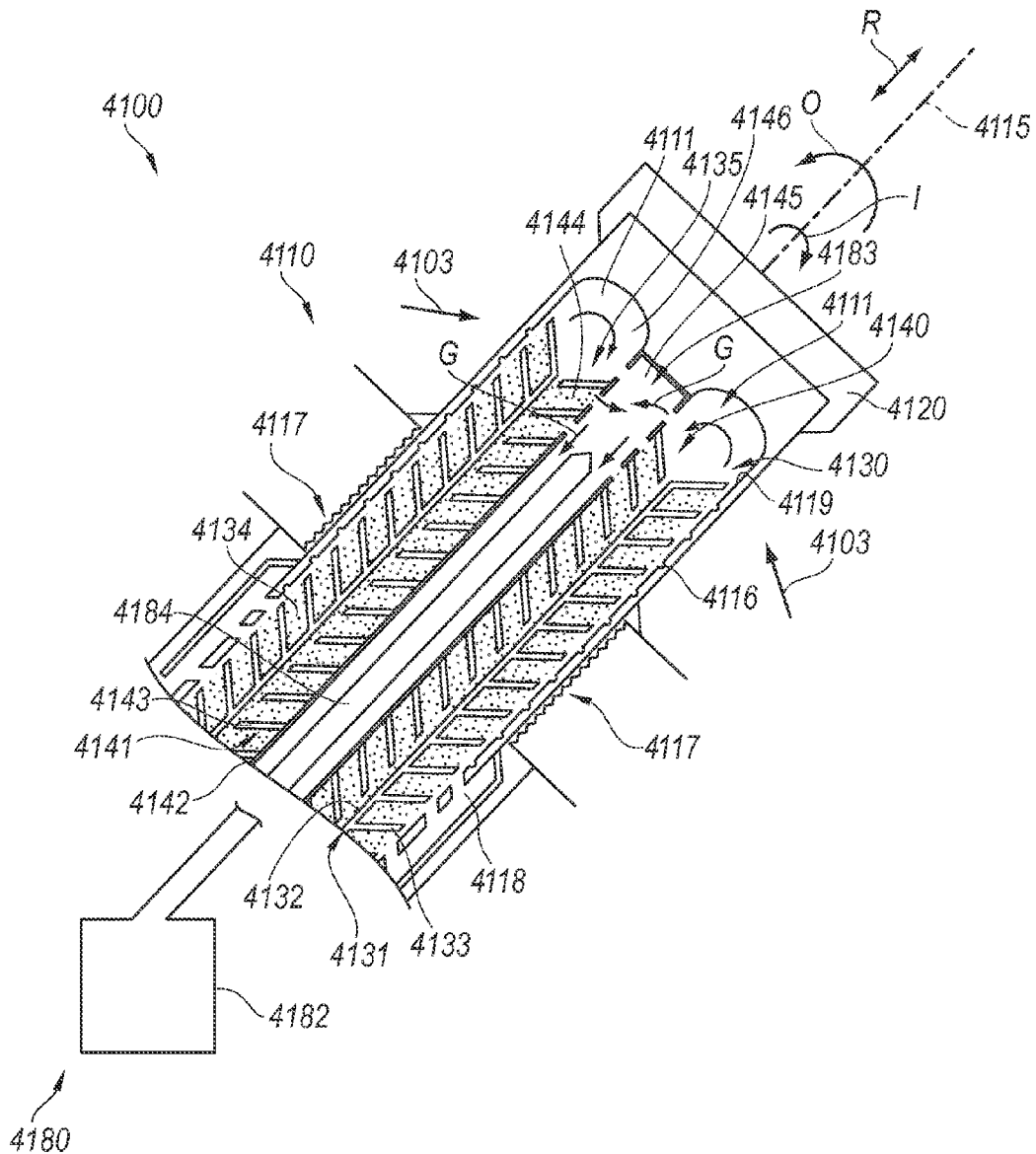
FIG. 16 is a partially schematic, cross-sectional illustration of an embodiment of a reactor vessel having annularly positioned product removal and reactant delivery systems in accordance with an embodiment of the disclosure.

FIG. 16 is a partially schematic, cross-sectional illustration of a portion of a reactor vessel 4110 configured in accordance with an embodiment of the present disclosure. In one aspect of this embodiment, the reactor 4110 includes a reactant delivery system 4130 that is positioned within a generally cylindrical, barrel-shaped reactor vessel 4110, and a product removal system 4140 positioned annularly inwardly from the reactant delivery system 4130. For example, the reactant delivery system 4130 can include an outer screw 4131, which in turn includes an outer screw shaft 4132 and outwardly extending outer screw threads 4133. The outer screw 4131 has an axially extending first axial opening 4135 in which the product removal system 4140 is positioned. The outer screw 4131 rotates about a central rotation axis 4115, as indicated by arrow O. As it does so, it carries at least one reactant 4134 (e.g., a gaseous, liquid, and/or solid reactant) upwardly and to the right as shown in FIG. 16, toward the reaction zone 4111. As the reactant 4134 is carried within the outer screw threads 4133, it is also compacted, potentially releasing gases and/or liquids, which can escape through louvers and/or other openings 4118 located annularly outwardly from the outer screw 4131. As the reactant 4134 becomes compacted in the outer screw threads 4133, it forms a seal against an inner wall 4119 of the vessel 4110. This arrangement can prevent losing the reactant 4134, and can instead force the reactant 4134 to move toward the reaction zone 4111. The reactant delivery system 4130 can include other features, in addition to the outer screw threads 4133, to force the reactant 4134 toward the reaction zone 4111. For example, the inner wall 4119 of the reactor vessel 4110 can include one or more spiral rifle grooves 4116 that tend to force the reactant 4134 axially as the outer screw 4131 rotates. In addition to, or in lieu of this feature, the entire outer screw 4131 can reciprocate back and forth, as indicated by arrow R to prevent the reactant 4134 from sticking to the inner wall 4119, and/or to release reactant 4134 that may stick to the inner wall 4119. A barrel heater 4117 placed near the inner wall 4119 can also reduce reactant sticking, in addition to or in lieu of the foregoing features. In a least some embodiments, it is expected that the reactant 4134 will be less likely to stick when warm.

The reactant 4134 can include a variety of suitable compositions, e.g., compositions that provide a hydrogen donor to the reaction zone 4111. In representative embodiments, the reactant 4134 can include biomass constituents, e.g., municipal solid waste, commercial waste, forest product waste or slash, cellulose, lignocellulose, hydrocarbon waste (e.g., tires), and/or others. After being compacted, these waste products can be highly subdivided, meaning that they can readily absorb incident radiation due to rough surface features and/or surface features that re-reflect and ultimately absorb incident radiation. This property can further improve the efficiency with which the reactant 4134 heats up in the reaction zone 4111.

Once the reactant 4134 has been delivered to the reaction zone 4111, it receives heat from the incident solar energy 4103 or another source, and undergoes an endothermic reaction. The reaction zone 4111 can have an annular shape and can include insulation 4120 to prevent heat from escaping from the vessel 4110. In one embodiment, the endothermic reaction taking place at the reaction zone 4111 includes dissociating methane, and reforming the carbon and hydrogen constituents into elemental carbon and diatomic hydrogen, or other carbon compounds (e.g., oxygenated carbon in the form of carbon monoxide or carbon dioxide) and hydrogen compounds. The resulting product 4146 can include gaseous portions (indicated by arrow G), which passed annularly inwardly from the reaction zone 4111 to be collected by the product removal system 4140. Solid portions 4144 (e.g., ash and/or other byproducts) of the product 4146 are also collected by the product removal system 4140.

The product removal system 4140 can include an inner screw 4141 positioned in the first axial opening 4135 within the outer screw 4131. The inner screw 4141 can include an inner screw shaft 4142 and inner screw threads 4143. The inner screw 4141 can also rotate about the rotation axis 4115, as indicated by arrow I, in the same direction as the outer screw 4131 or in the opposite direction. The inner screw 4141 includes a second axial passage 4145 having openings that allow the gaseous product G to enter. The gaseous product G travels down the second axial opening 4145 to be collected and, in at least some instances, further processed (e.g., to isolate the carbon produced in the reaction from the hydrogen produced in the reaction). In particular embodiments, the gaseous product G can exchange additional heat with the incoming reactant 4134 via an additional heat exchanger (not shown in FIG. 16) to cool the product G and heat the reactant 4134. In other embodiments, the gaseous product G can be cooled by driving a Stirling engine or other device to generate mechanical and/or electric power. As the inner screw 4141 rotates, it carries the solid portions 4144 of the product 4146 downwardly and to the left as shown in FIG. 16. The solid products 4144 (and the gaseous product G) can convey heat via conduction to the outer screw 4130 to heat the incoming reactant 4134, after which the solid portions 4144 can be removed for use. For example, nitrogenous and/or sulfurous products from the reaction performed at the reaction zone 4111 can be used in agricultural or industrial processes. The products and therefore the chemical and physical composition of the solid portions can depend on the characteristics of the incoming reactants, which can vary widely, e.g., from municipal solid waste to industrial waste to biomass.

As discussed above with reference to FIGS. 14 and 15, the system 4100 can include features that direct energy (e.g., heat) into the reaction zone 4111 even when the available solar energy is insufficient to sustain the reaction. In an embodiment shown in FIG. 16, the supplemental heat source 4180 can include combustion reactants 4182 (e.g., an oxidizer and/or a hydrogen-containing combustible material) that is directed through a delivery tube 4184 positioned in the second axial opening 4145 to a combustor or combustor zone 4183 that is in thermal communication with the reaction zone 4111. During the night or other periods of time when the incident solar energy is low, the supplemental heat source 4180 can provide additional heat to the reaction zone 4111 to sustain the endothermic reaction taking place therein.

One feature of an embodiment described above with reference to FIG. 16 is that the incoming reactant 4134 can be in close or intimate thermal communication with the solid product 4144 leaving the reaction zone. In particular, the outer screw shaft 4132 and outer screw threads 4133 can be formed from a highly thermally conductive material, so as to receive heat from the solid product 4144 carried by the inner screw 4141, and deliver the heat to the incoming reactant 4134. An advantage of this arrangement is that it is thermally efficient because it removes heat from products that would otherwise be cooled in a manner that wastes the heat, and at the same time heats the incoming reactants 4134, thus reducing the amount of heat that must be produced by the solar concentrator 4101 (FIG. 14) and/or the supplemental heat source 4180. By improving the efficiency with which hydrogen and/or carbon or other building blocks are produced in the reactor vessel 4110, the reactor system 4100 can increase the commercial viability of the renewable reactants and energy sources used to produce the products.

Still further embodiments of suitable reactors with solar conveyors are disclosed in issued U.S. Pat. No. 8,187,549, incorporated herein by reference.

3.5 Representative Reactors with Solar Concentrators

Figure 17:
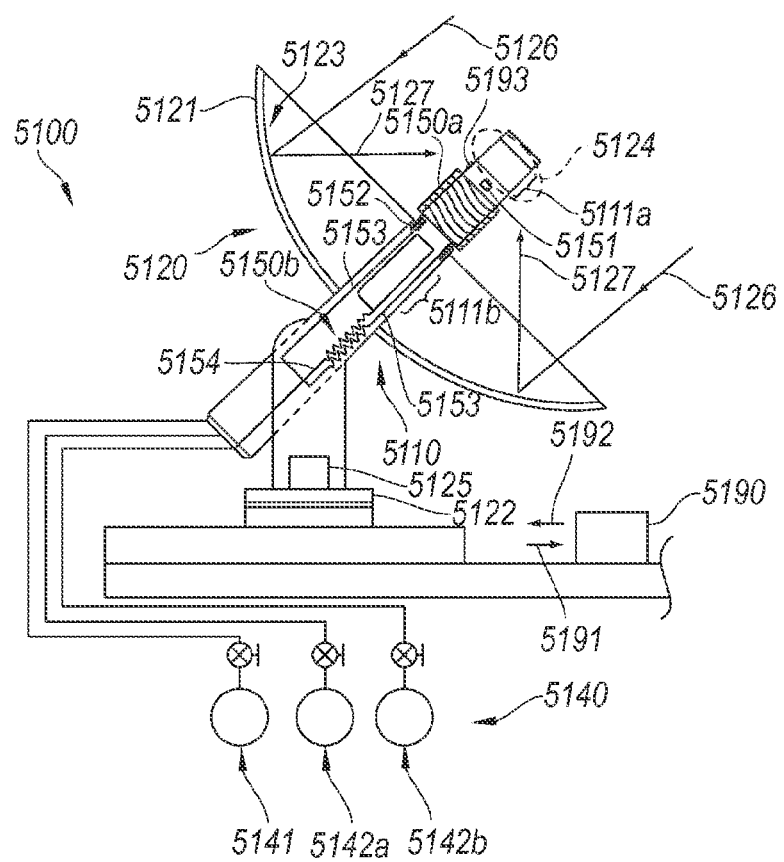
FIG. 17 is a partially schematic, partial cross-sectional illustration of a system having a solar concentrator configured in accordance with an embodiment of the present technology.

FIG. 17 is a partially schematic, partial cross-sectional illustration of a system 5100 having a reactor 5110 coupled to a solar concentrator 5120 in accordance with the particular embodiment of the technology. In one aspect of this embodiment, the solar concentrator 5120 includes a dish 5121 mounted to pedestal 5122. The dish 5121 can include a concentrator surface 5123 that receives incident solar energy 5126, and directs the solar energy as focused solar energy 5127 toward a focal area 5124. The dish 5121 can be coupled to a concentrator actuator 5125 that moves the dish 5121 about at least two orthogonal axes in order to efficiently focus the solar energy 5126 as the earth rotates. As will be described in further detail below, the concentrator actuator 5125 can also be configured to deliberately position the dish 5121 to face away from the sun during a cooling operation.

The reactor 5110 can include one or more reaction zones 5111, shown in FIG. 17 as a first reaction zone 5111a and second reaction zone 5111b. In a particular embodiment, the first reaction zone 5111a is positioned at the focal area 5124 to receive the focused solar energy 5127 and facilitate a dissociation reaction or other endothermic reaction. Accordingly, the system 5100 can further include a distribution/collection system 5140 that provides reactants to the reactor 5110 and collects products received from the reactor 5110. In one aspect of this embodiment, the distribution/collection system 5140 includes a reactant source 5141 that directs a reactant to the first reaction zone 5111a, and one or more product collectors 5142 (two are shown in FIG. 17 as a first product collector 5142a and a second product collector 5142b) that collect products from the reactor 5110. When the reactor 5110 includes a single reaction zone (e.g. the first reaction zone 5111a) the product collectors 5142a, 5142b can collect products directly from the first reaction zone 5111a. In another embodiment, intermediate products produced at the first reaction zone 5111a are directed to the second reaction zone 5111b. At the second reaction zone 5111b, the intermediate products can undergo an exothermic reaction, and the resulting products are then delivered to the product collectors 5142a, 5142b along a product flow path 5154. For example, in a representative embodiment, the reactant source 5141 can include methane and carbon dioxide, which are provided (e.g., in an individually controlled manner) to the first reaction zone 5111a and heated to produce carbon monoxide and hydrogen. The carbon monoxide and hydrogen are then provided to the second reaction zone 5111b to produce methanol in an exothermic reaction. Further details of this arrangement and associated heat transfer processes between the first reaction zone 5111a and second reaction zone 5111b are described in more detail below in Section 3.8.

In at least some instances, it is desirable to provide cooling to the reactor 5110, in addition to the solar heating described above. For example, cooling can be used to remove heat produced by the exothermic reaction being conducted at the second reaction zone 5111b and thus allow the reaction to continue. When the product produced at the second reaction zone 5111b includes methanol, it may desirable to further cool the methanol to a liquid to provide for convenient storage and transportation. Accordingly, the system 5100 can include features that facilitate using the concentrator surface 5123 to cool components or constituents at the reactor 5110. In a particular embodiment, the system 5100 includes a first heat exchanger 5150a operatively coupled to a heat exchanger actuator 5151b that moves the first heat exchanger 5150a relative to the focal area 5124. The first heat exchanger 5150a can include a heat exchanger fluid that communicates thermally with the constituents in the reactor 5110, but is in fluid isolation from these constituents to avoid contaminating the constituents and/or interfering with the reactions taking place in the reactor 5110. The heat exchanger fluid travels around a heat exchanger fluid flow path 5153 in a circuit from the first heat exchanger 5150a to a second heat exchanger 5150b and back. At the second heat exchanger 5150b, the heat exchanger fluid receives heat from the product (e.g. methanol) produced by the reactor 5110 as the product proceeds from the second reaction zone 5111b to the distribution/collection system 5140. The heat exchanger fluid flow path 5153 delivers the heated heat exchanger fluid back to the first heat exchanger 5150a for cooling. One or more strain relief features 5152 in the heat exchanger fluid flow path 5153 (e.g., coiled conduits)

facilitate the movement of the first heat exchanger 5150a. The system 5100 can also include a controller 5190 that receives input signals 5191 from any of a variety of sensors, transducers, and/or other elements of the system 5100, and, in response to information received from these elements, delivers control signals 5192 to adjust operational parameters of the system 5100.

Figure 18:
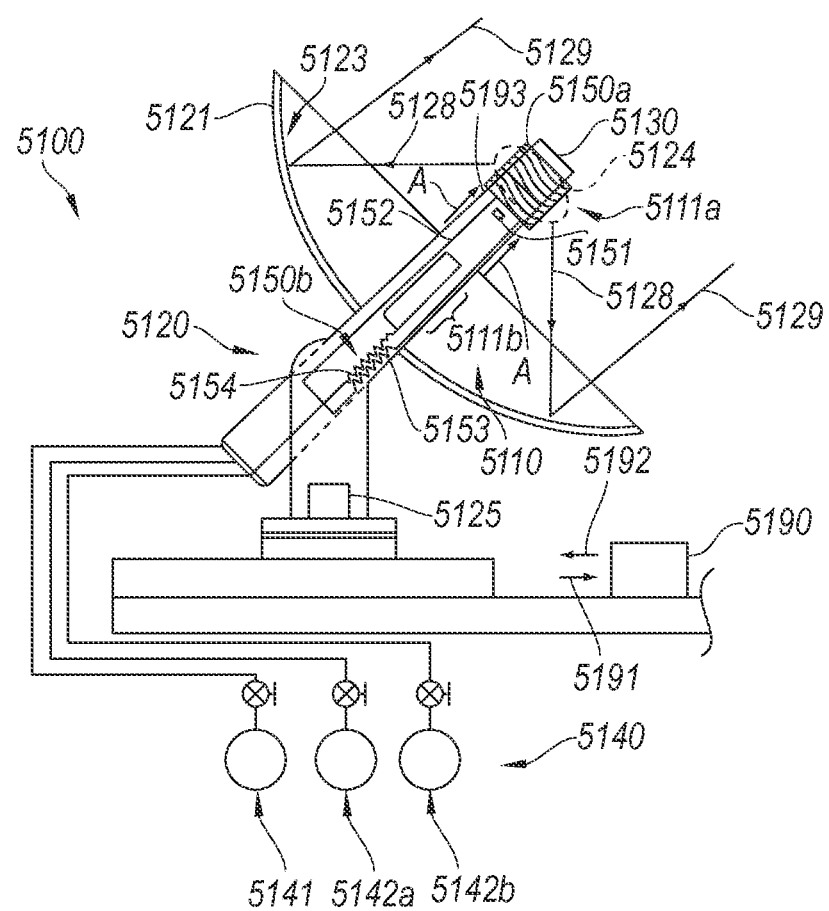
FIG. 18 is a partially schematic, partial cross-sectional illustration of an embodiment of the system shown in FIG. 1 with the solar concentrator configured to emit energy in a cooling process, in accordance with an embodiment of the disclosure.

FIG. 18 illustrates one mechanism by which the heat exchanger fluid provided to the first heat exchanger 5150a is cooled. In this embodiment, the controller 5190 directs the heat exchanger actuator 5151 to drive the first heat exchanger 5150a from the position shown in FIG. 17 to the focal area 5124, as indicated by arrows A. In addition, the controller 5190 can direct the concentrator actuator 5125 to position the dish 5121 so that the concentrator surface 5123 points away from the sun and to an area of the sky having very little radiant energy. In general, this process can be completed at night, when it is easier to avoid the radiant energy of the sun and the local environment, but in at least some embodiments, this process can be conducted during the daytime as well. A radiant energy sensor 5193 coupled to the controller 5190 can detect when the incoming solar radiation passes below a threshold level, indicating a suitable time for positioning the first heat exchanger 5150a in the location shown in FIG. 18.

With the first heat exchanger 5150a in the position shown in FIG. 18, the hot heat transfer fluid in the heat exchanger 5150a radiates emitted energy 5128 that is collected by the dish 5121 at the concentrator surface 5123 and redirected outwardly as directed emitted energy 5129. An insulator 5130 positioned adjacent to the focal area 5124 can prevent the radiant energy from being emitted in direction other than toward the concentrator surface 5123. By positioning the concentrator surface 5123 to point to a region in space having very little radiative energy, the region in space can operate as a heat sink, and can accordingly receive the directed emitted energy 5129 rejected by the first heat exchanger 5150a. The heat exchanger fluid, after being cooled at the first heat exchanger 5150a returns to the second heat exchanger 5150b to absorb more heat from the product flowing along the product flow path 5154. Accordingly, the concentrator surface 5123 can be used to cool as well as to heat elements of the reactor 5110.

In a particular embodiment, the first heat exchanger 5150a is positioned as shown in FIG. 17 during the day, and as positioned as shown in FIG. 18 during the night. In other embodiments, multiple systems 5100 can be coupled together, some with the corresponding first heat exchanger 5150a positioned as shown in FIG. 17, and others with the first heat exchanger 5150a positioned as shown in FIG. 18, to provide simultaneous heating and cooling. In any of these embodiments, the cooling process can be used to liquefy methanol, and/or provide other functions. Such functions can include liquefying or solidifying other substances, e.g., carbon dioxide, ethanol, butanol or hydrogen.

In particular embodiments, the reactants delivered to the reactor 5110 are selected to include hydrogen, which is dissociated from the other elements of the reactant (e.g. carbon, nitrogen, boron, silicon, a transition metal, and/or sulfur) to produce a hydrogen-based fuel (e.g. diatomic hydrogen) and a structural building block that can be further processed to produce durable goods. Such durable goods include graphite, graphene, and/or polymers, which may produced from carbon structural building blocks, and other suitable compounds formed from hydrogenous or other structural building blocks. Further details of suitable processes and products are disclosed in the following co-pending U.S. patent applications: Ser. Nos. 13/027,208 titled "CHEMICAL PROCESSES AND REACTORS FOR EFFICIENTLY PRODUCING HYDROGEN FUELS AND STRUCTURAL MATERIALS, AND ASSOCIATED SYSTEMS AND METHODS"; 13/027,214 titled "ARCHITECTURAL CONSTRUCT HAVING FOR EXAMPLE A PLURALITY OF ARCHITECTURAL CRYSTALS"; and 12/027,068 titled "CARBON-BASED DURABLE GOODS AND RENEWABLE FUEL FROM BIOMASS WASTE DISSOCIATION", all of which were filed Feb. 14, 2011 and are incorporated herein by reference.

Figure 19:
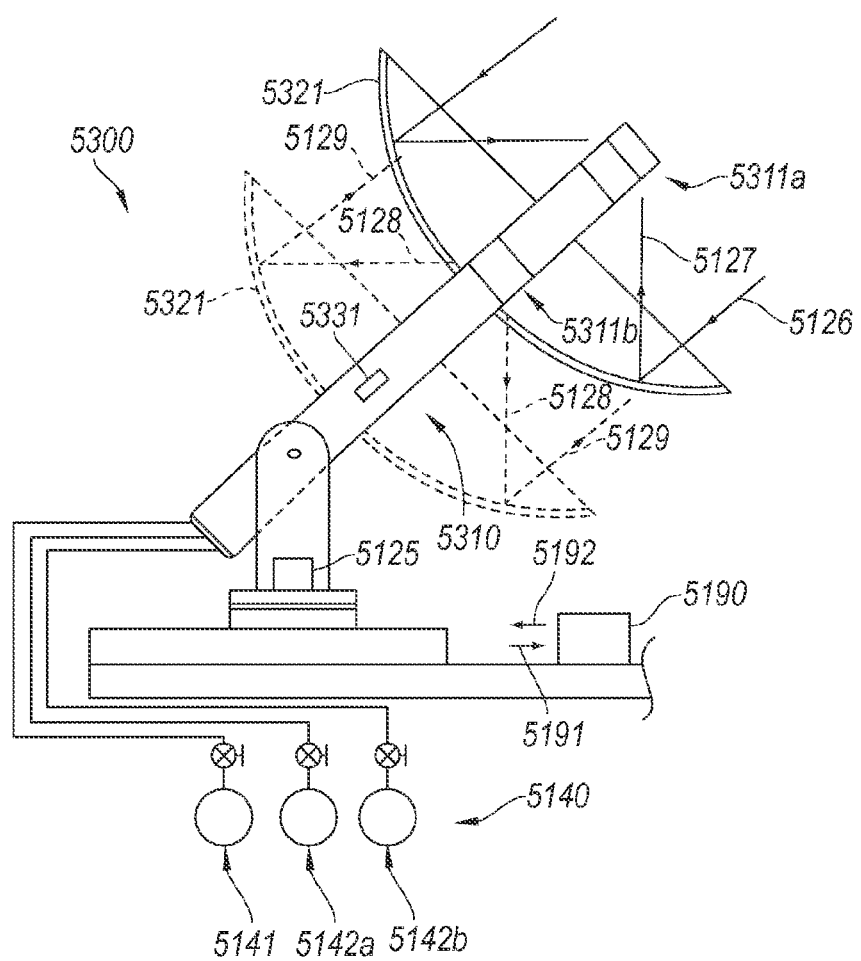
FIG. 19 is a partially schematic, partial cross-sectional illustration of a system having a movable solar concentrator dish in accordance with an embodiment of the disclosure.

FIG. 19 illustrates a system 5300 having a reactor 5310 with a movable dish 5321 configured in accordance another embodiment of the disclosed technology. In a particular aspect of this embodiment, the reactor 5310 includes a first reaction zone 5311a and a second reaction zone 5311b, with the first reaction zone 5311a receiving focused solar energy 5127 when the dish 5321 has a first position, shown in solid lines in FIG. 19. The dish 5321 is coupled to a dish actuator 5331 that moves the dish 5321 relative to the reaction zones 5311a, 5311b. Accordingly, during a second phase of operation, the controller 5190 directs the dish actuator 5331 to move the dish 5321 to the second position shown in dashed lines in FIG. 19. In one embodiment, this arrangement can be used to provide heat to the second reaction zone 5311b when the dish 5321 is in the second position. In another embodiment, this arrangement can be used to cool the second reaction zone 5311b. Accordingly, the controller 5190 can direct the concentrator actuator 5125 to point the dish 5321 to a position in the sky having little or no radiant energy, thus allowing the second reaction zone 5311b to reject heat to the dish 5321 and ultimately to space, in a manner generally similar to that described above with reference to FIGS. 17 and 18.

Still further embodiments of suitable reactors with solar concentrators are disclosed in issued U.S. Pat. No. 8,187,550, incorporated herein by reference.

3.6 Representative Reactors with Induction Heating

Figure 20:
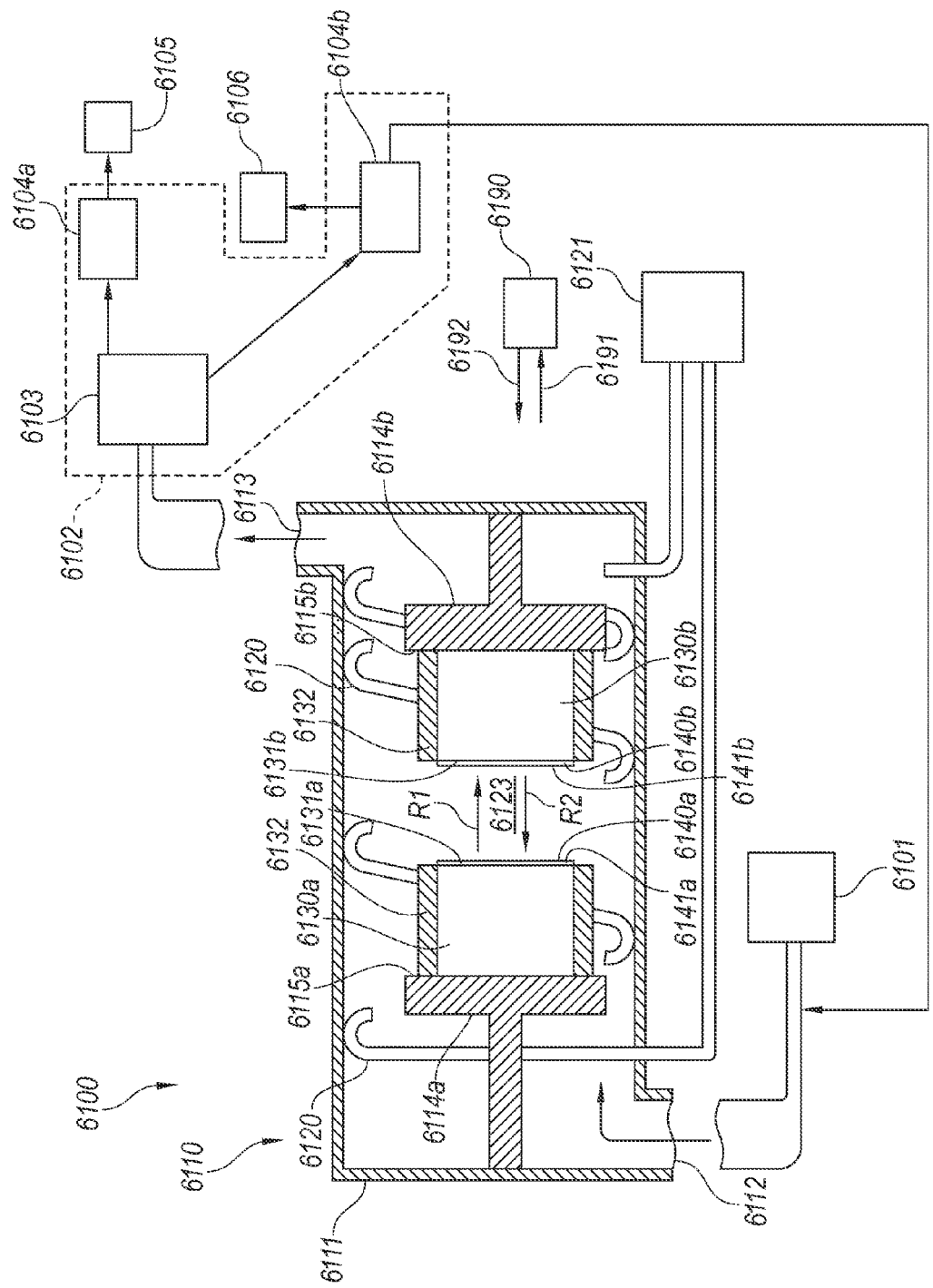
FIG. 20 is a partially schematic illustration of a system having a reactor with facing substrates for operation in a batch mode in accordance with an embodiment of the presently disclosed technology.

FIG. 20 is a partially schematic, partial cross-sectional illustration of a system 6100 having a reactor 6110 configured in accordance with an embodiment of the presently disclosed technology. In one aspect of this embodiment, the reactor 6110 includes a reactor vessel 6111 having a reaction or induction zone 6123 which is heated by an induction coil 6120. The induction coil 6120 can be a liquid-cooled, high frequency alternating current coil coupled to a suitable electrical power source 6121. The reactor vessel 6111 can further include an entrance port 6112 coupled to a precursor gas source 6101 to receive a suitable precursor gas, and an exit port 6113 positioned to remove spent gas and/or other constituents from the vessel 6111. In a particular embodiment, the precursor gas source 6101 carries a hydrocarbon gas (e.g., methane), which is dissociated into carbon and hydrogen at the induction zone 6123. The carbon is then deposited on a substrate to form a product, as is described further below, and the hydrogen and/or other constituents are removed for further processing, as is also described further below.

The reaction vessel 6111 houses a first support 6114a having a first support surface 6115a, and a second support 6114b having a second support surface 6115b facing toward the first support surface 6115a. Each support 6114a, 6114b can carry a substrate upon which one or more constituents of the precursor gas are deposited. For example, the first support 6114a can carry a first substrate 6130a and the second support 6114b can carry a second substrate 6130b. In a representative embodiment in which the precursor gas is selected to deposit carbon, the first and second substances 6130a, 6130b can also include carbon, e.g., in the form of graphite or a constituent of steel. When the precursor gas includes a different deposition element (e.g., nitrogen and/or boron), the composition of the first and second substrates 6130a, 6130b can be different. Each of the substrates 6130a, 6130b can have an initially exposed surface facing the other. Accordingly, the first substrate 6130a can have an exposed first surface 6131a facing toward a second exposed surface 6131b of the second substrate 6130b. The remaining surfaces of each substrate 6130a, 6130b can be insulated to prevent or significantly restrict radiation losses from these surfaces. The supports 6114a, 6114b can insulate at least one surface of each of the substrates 6130a, 6130b. The other surfaces (other than the exposed first and second substrates 6131a, 6131b) can be protected by a corresponding insulator 6132. The insulator 6132 can be formed from a suitable high temperature ceramic or other material.

The system 6100 can further include a controller 6190 that receives input signals 6191 from any of a variety of sensors, transducers, and/or other elements of the system 6100, and in response to information received from these elements, delivers control signals 6192 to adjust operational parameters of the system 6100. These parameters can include the pressures and flow rates with which the gaseous constituents are provided to and/or removed from the reactor vessel 6111, the operation of the induction coil 6120 and associated power source 6121, and the operation of a separator 6103 (described below), among others.

In operation, the precursor gas source 6101 supplies gas to the induction zone 6123, the induction coil 6120 is activated, and the precursor gas dissociates into at least one constituent (e.g., carbon) that is deposited onto the first and second substrates 6130a, 6130b. The constituent can be deposited in an epitaxial process that preserves the crystal grain orientation of the corresponding substrate 6130a, 6130b. Accordingly, the deposited constituent can also have a crystal and/or other self-organized structure. As the constituent is deposited, it forms a first formed structure or product 6140a at the first substrate 6130a, and a second formed structure or product 6140b at the second substrate 6130b. The first and second formed structures 6140a, 6140b each have a corresponding exposed surface 6141a, 6141b facing toward the other. The structures 6140a, 6140b can have the same or different cross-sectional shapes and/or areas, and/or can have non-crystalline, single crystal or multicrystal organizations, depending upon the selected embodiment. Radiation emitted by the first exposed surface 6131a of the first substrate 6130a, and/or by the first exposed surface 6141a of the first formed structure 6140a (collectively identified by arrow R1) is received at the second exposed surface 6141b of the second formed structure 6140b, and/or the second exposed surface 6131b of the second substrate 6130b. Similarly, radiation emitted by the second exposed surface 6141b of the second formed structure 6140b and/or the second exposed surface 6131b of the second substrate 6130b (collectively identified by arrow R2) is received at the first formed structure 6140a and/or the first substrate 6130a.

As the formed structures 6140a, 6140b grow, the exit port 6113 provides an opening through which residual constituents from the dissociated precursor gas and/or non-dissociated quantities of the precursor gas can pass. These constituents are directed to a collection system 6102, which can include a separator 6103 configured to separate the constituents into two or more flow streams. For example, the separator 6103 can direct one stream of constituents to a first product collector 6104a, and a second stream of constituents to a second product collector 6104b. In a particular embodiment, the first product collector 6104a can collect pure or substantially pure hydrogen, which can be delivered to a hydrogen-based fuel cell 6105 or other device that requires hydrogen at a relatively high level of purity. The second stream of constituents directed to the second product collector 6104b can include hydrogen mixed with other elements or compounds. Such elements or compounds can include methane or another undissociated precursor gas, and/or carbon (or another element or compound targeted for deposition) that was not deposited on the first substrate 6130a or the second substrate 6130b. These constituents can be directed to an engine 6106, for example, a turbine engine or another type of internal combustion engine that can burn a mixture of hydrogen and the other constituents. The engine 6106 and/or the fuel cell 6105 can provide power for any number of devices, including the electrical power source 6121 for the inductive coil 6120. In another aspect of this embodiment, at least some of the constituents (e.g., undissociated precursor gas) received at the second collector 6104b can be directed back into the reactor 6110 via the entrance port 6112.

An advantage of the foregoing arrangement is that the radiation losses typically encountered in a chemical vapor deposition apparatus can be avoided by positioning multiple substrates in a manner that allows radiation emitted from one surface to be received by another surface that is also targeted for deposition. In a particular embodiment shown in FIG. 20, two substrates are shown, each having a single exposed surface facing the other. In other embodiments, additional substrates can be positioned (e.g., in a plane extending inwardly and/or outwardly transverse to the plane of FIG. 20) to allow additional exposed surfaces of a formed product to radiate heat to corresponding surfaces of other formed products.

Another advantage of the foregoing arrangement is that it can be used to produce a structural building block and/or an architectural construct, as well as clean burning hydrogen fuel from a hydrogen donor. When the precursor gas includes a hydrocarbon, the architectural construct can include graphene and/or another carbon-bearing material, for example, a material that can be further processed to form a carbon-based composite or a carbon-based polymer. In other embodiments, the precursor gas can include other elements (e.g., boron, nitrogen, sulfur, silicon, and/or a transition metal) than can also be used to form structural building blocks that contain the element, and/or architectural constructs formed from the building blocks. Suitable processes and representative architectural constructs are further described in the following co-pending U.S. patent applications, all of which were filed on Feb. 14, 2011 and are incorporated herein by reference: application Ser. No. 13/027,208; application Ser. No. 13/027,214; and application Ser. No. 13/027,068.

One feature of an embodiment described above with reference to FIG. 20 is that it may be conducted in a batch process. For example, each of the first and second formed structures 6140a, 6140b can be grown by a particular amount and then removed from the reaction vessel 6111. In other embodiments, the products can be formed in a continuous manner, without the need for halting the reaction to remove the product.

Still further embodiments of suitable reactors with induction heating are disclosed in pending U.S. application Ser. No. 13/027,215, filed Feb. 14, 2011, and incorporated herein by reference.

3.7 Representative Reactors Using Engine Heat

Figure 21:
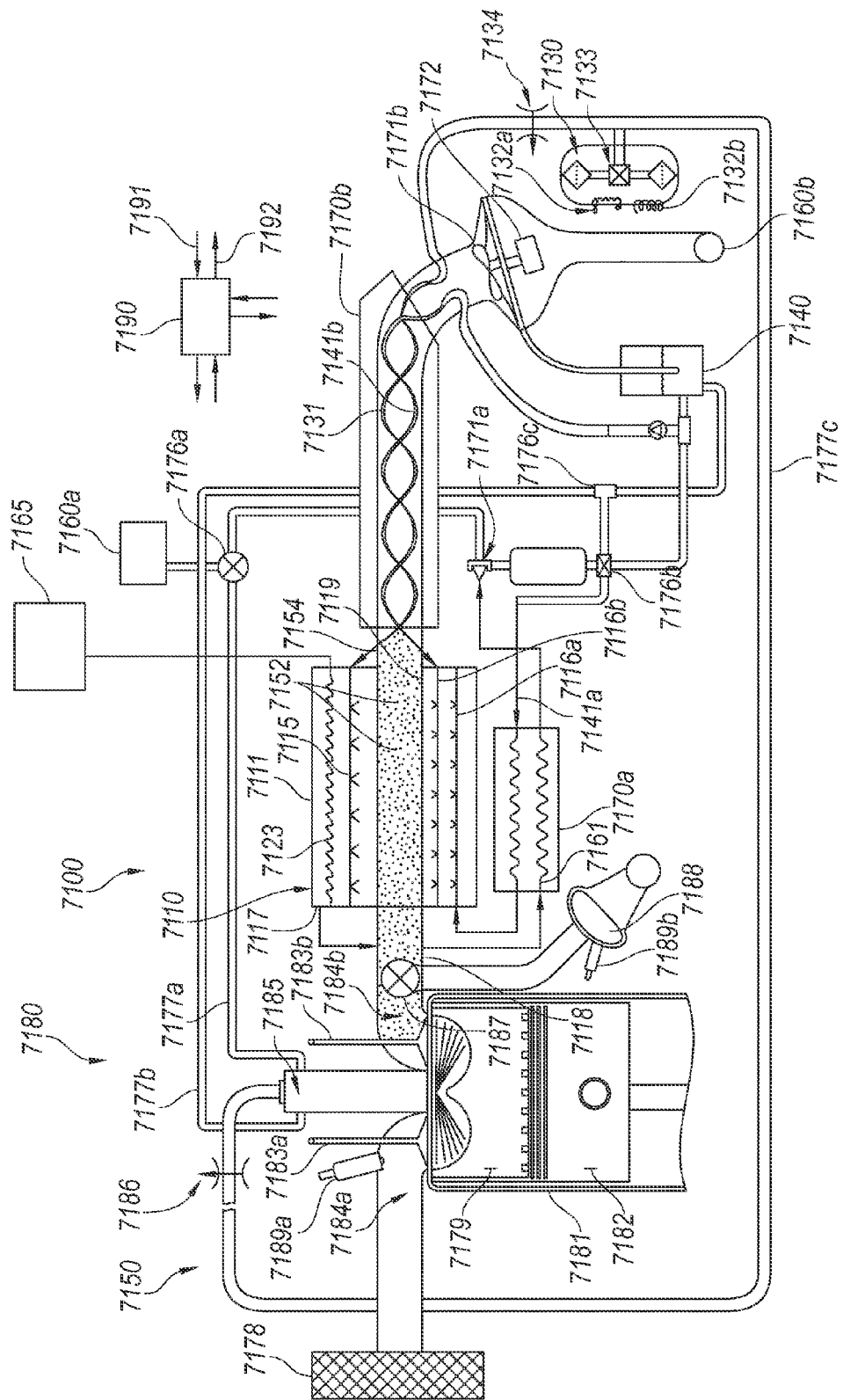
FIG. 21 is a partially schematic, partially cross-sectional illustration of a reactor system that receives energy from a combustion engine and returns reaction products to the engine in accordance with an embodiment of the presently disclosed technology.

FIG. 21 is a partially schematic illustration of system 7100 that includes a reactor 7110 in combination with a radiant energy/reactant source 7150 in accordance with another embodiment of the technology. In this embodiment, the radiant energy/reactant source 7150 includes an engine 7180, e.g., an internal combustion engine having a piston 7182 that reciprocates within a cylinder 7181. In other embodiments, the engine 7180 can have other configurations, for example, an external combustion configuration. In an embodiment shown in FIG. 21, the engine 7180 includes an intake port 7184a that is opened and closed by an intake valve 7183a to control air entering the cylinder 7181 through an air filter 7178. The air flow can be unthrottled in an embodiment shown in FIG. 21, and can be throttled in other embodiments. A fuel injector 7185 directs fuel into the combustion zone 7179 where it mixes with the air and ignites to produce the combustion products 7152. Additional fuel can be introduced by an injection valve 7189a. The combustion products 7152 exit the cylinder 7181 via an exhaust port 7184b controlled by an exhaust valve 7183b. Further details of representative engines and ignition systems are disclosed in co-pending U.S. application Ser. No. 12/653,085 filed on Dec. 7, 2010, and incorporated herein by reference.

The engine 7180 can include features specifically designed to integrate the operation of the engine with the operation of the reactor 7110. For example, the engine 7180 and the reactor 7110 can share fuel from a common fuel source 7130 which is described in further detail below. The fuel is provided to the fuel injector 7185 via a regulator 7186. The engine 7180 can also receive end products from the reactor 7110 via a first conduit or passage 7177a, and water (e.g., liquid or steam) from the reactor 7110 via a second conduit or passage 7177b. Further aspects of these features are described in greater detail below, following a description of the other features of the overall system 7100.

The system 7100 shown in FIG. 21 also includes heat exchangers and separators configured to transfer heat and segregate reaction products in accordance with the disclosed technology. In a particular aspect of this embodiment, the system 7100 includes a steam/water source 7140 that provides steam to the reactor vessel 7111 to facilitate product formation. Steam from the steam/water source 7140 can be provided to the reactor 7110 via at least two channels. The first channel includes a first water path 7141a that passes through a first heat exchanger 7170a and into the reactor vessel 7111 via a first steam distributor 7116a. Products removed from the reactor vessel 7111 pass through a reactor product exit port 7117 and along a products path 7161. The products path 7161 passes through the first heat exchanger 7170a in a counter-flow or counter-current manner to cool the products and heat the steam entering the reactor vessel 7111. The products continue to a reaction product separator 7171a that segregates useful end products (e.g., hydrogen and carbon or carbon compounds). At least some of the products are then directed back to the engine 7180, and other products are then collected at a products collector 7160a. A first valve 7176a regulates the product flow. Water remaining in the products path 7161 can be separated at the reaction product separator 7171a and returned to the steam/water source 7140.

The second channel via which the steam/water source 7140 provides steam to the reactor 7110 includes a second water path 7141b that passes through a second heat exchanger 7170b. Water proceeding along the second water path 7141b enters the reactor 7110 in the form of steam via a second stream distributor 7116b. This water is heated by combustion products that have exited the combustion zone 7179 and passed through the transfer passage 7118 (which can include a transmissive surface 7119) along a combustion products path 7154. The spent combustion products 7152 are collected at a combustion products collector 7160b and can include nitrogen compounds, phosphates, re-used illuminant additives (e.g., sources of sodium, magnesium and/or potassium), and/or other compositions that may be recycled or used for other purposes (e.g., agricultural purposes). The illuminant additives can be added to the combustion products 7152 (and/or the fuel used by the engine 7180) upstream of the reactor 7110 to increase the amount of radiant energy available for transmission into the reaction zone 7112.

In addition to heating water along the second water path 7141b and cooling the combustion products along the combustion products path 7154, the second heat exchanger 7170b can heat the hydrogen donor passing along a donor path 7131 to a donor distributor 7115 located within the reactor vessel 7111. The donor vessel 7130 houses a hydrogen donor, e.g., a hydrocarbon such as methane, or a nitrogenous donor such as ammonia. The donor vessel 7130 can include one or more heaters 7132 (shown as first heater 7132a and a second heater 7132b) to vaporize and/or pressurize the hydrogen donor within. A three-way valve 7133 and a regulator 7134 control the amount of fluid and/or vapor that exits the donor vessel 7130 and passes along the donor path 7131 through the second heat exchanger 7170b and into the reactor vessel 7111. As discussed above, the hydrogen donor can also serve as a fuel for the engine 7180, in at least some embodiments, and can be delivered to the engine 7180 via a third conduit or passage 7177c.

In the reactor vessel 7111, the combustion products 7152 pass through the combustion products passage 7118 while delivering radiant energy and/or reactants through the transmissive surface 7119 into the reaction zone 7112. After passing through the second heat exchanger 7170b, the combustion products 7152 can enter a combustion products separator 7171b that separates water from the combustion products. The water returns to the steam/water source 7140 and the remaining combustion products are collected at the combustion products collector 7160b. In a particular embodiment, the separator 7171b can include a centrifugal separator that is driven by the kinetic energy of the combustion product stream. If the kinetic energy of the combustion product stream is insufficient to separate the water by centrifugal force, a motor/generator 7172 can add energy to the separator 7171b to provide the necessary centrifugal force. If the kinetic energy of the combustion product stream is greater than is necessary to separate water, the motor/generator 7172 can produce energy, e.g., to be used by other components of the system 7100. The controller 7190 receives inputs from the various elements of the system 7100 and controls flow rates, pressures, temperatures, and/or other parameters.

The controller 7190 can also control the return of reactor products to the engine 7180. For example, the controller can direct reaction products and/or recaptured water back to the engine 7180 via a series of valves. In a particular embodiment, the controller 7190 can direct the operation of the first valve 7176a which directs hydrogen and carbon monoxide obtained from the first separator 7171a to the engine 7180 via the first conduit 7177a. These constituents can be burned in the combustion zone 7179 to provide additional power from the engine 7180. In some instances, it may be desirable to cool the combustion zone 7179 and/or other elements of the engine 7180 as shown. In such instances, the controller 7190 can control a flow of water or steam to the engine 7180 via second and third valves 7176b, 7176c and the corresponding second conduit 7177b.

In some instances, it may be desirable to balance the energy provided to the reactor 7110 with energy extracted from the engine 7180 used for other purposes. According, the system 7100 can included a proportioning valve 7187 in the combustion products stream that can direct some combustion products 7152 to a power extraction device 7188, for example, a turbo-alternator, turbocharger or a supercharger. When the power extraction device 7188 includes a supercharger, it operates to compress air entering the engine cylinder 7181 via the intake port 7184a. When the extraction device 7188 includes a turbocharger, it can include an additional fuel injection valve 7189b that directs fuel into the mixture of combustion products for further combustion to produce additional power. This power can supplement the power provided by the engine 7180, or it can be provided separately, e.g., via a separate electrical generator.

As is evident from the forgoing discussion, one feature of the system 7100 is that it is specifically configured to conserve and reuse energy from the combustion products 7152. Accordingly, the system 7100 can include additional features that are designed to reduce energy losses from the combustion products 7152. Such features can include insulation positioned around the cylinder 7181, at the head of the piston 7182, and/or at the ends of the valves 7183a, 7183b. Accordingly, the insulation prevents or at least restricts heat from being conveyed away from the engine 7180 via any thermal channel other than the passage 7118.

One feature of at least some of the foregoing embodiments is that the reactor system can include a reactor and an engine linked in an interdependent manner. In particular, the engine can provide waste heat that facilitates a dissociation process conducted at the reactor to produce a hydrogen-based fuel and a non-hydrogen based structural building block. The building block can include a molecule containing carbon, boron, nitrogen, silicon and/or sulfur, and can be used to form an architectural construct. Representative examples of architectural constructs, in addition to the polymers and composites described above are described in further detail in co-pending U.S. application Ser. No. 12/027,214, previously incorporated herein by reference. An advantage of this arrangement is that it can provide a synergy between the engine and the reactor. For example, the energy inputs normally required by the reactor to conduct the dissociation processes described above can be reduced by virtue of the additional energy provided by the combustion product. The efficiency of the engine can be improved by adding clean-burning hydrogen to the combustion chamber, and/or by providing water (e.g., in steam or liquid form) for cooling the engine. Although both the steam and the hydrogen-based fuel are produced by the reactor, they can be delivered to the engine at different rates and/or can vary in accordance with different schedules and/or otherwise in different manners.

Still further embodiments of suitable reactors with using engine heat are disclosed in pending U.S. application Ser. No. 13/027,198, filed Feb. 14, 2011, and incorporated herein by reference.

3.8 Representative Exothermic/Endothermic Reactors

Figure 22:
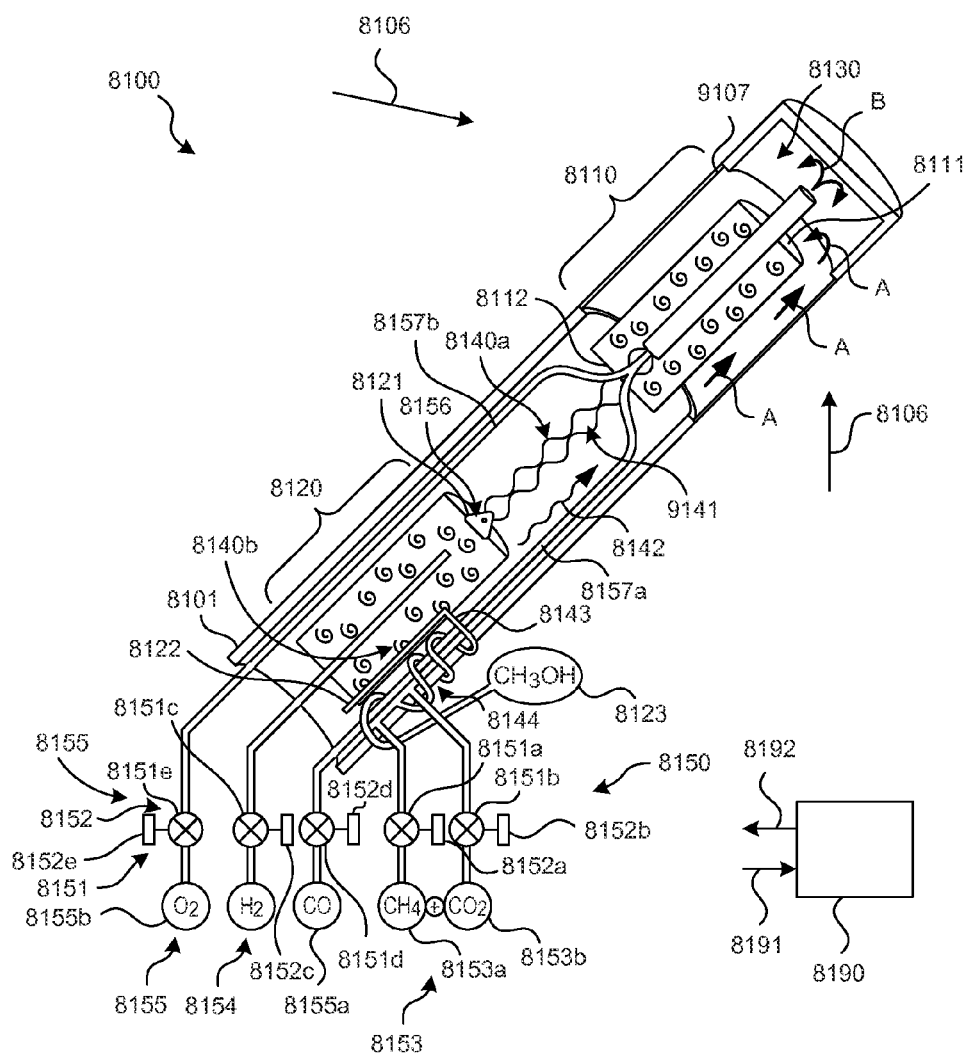
FIG. 22 is a partially schematic, cross-sectional illustration of a reactor having interacting endothermic and exothermic reaction zones in accordance with an embodiment of the disclosure.

FIG. 22 is a partially schematic, cross-sectional illustration of particular components of the system 8100, including the reactor vessel 8101. The reactor vessel 8101 includes the first reaction zone 8110 positioned toward the upper left of FIG. 22 (e.g., at a first reactor portion) to receive incident solar radiation 8106, e.g., through a solar transmissive surface 8107. The second reaction zone 8120 is also positioned within the reactor vessel 8101, e.g., at a second reactor portion, to receive products from the first reaction zone 8110 and to produce an end product, for example, methanol. Reactant sources 8153 provide reactants to the reactor vessel 8101, and a product collector 8123 collects the resulting end product. A regulation system 8150, which can include valves 8151 or other regulators and corresponding actuators 8152, is coupled to the reactant sources 8153 to control the delivery of reactants to the first reaction zone 8110 and to control other flows within the system 8100. In other embodiments, the valves can be replaced by or supplemented with other mechanisms, e.g., pumps.

In a particular embodiment, the reactant sources 8153 include a methane source 8153a and a carbon dioxide source 8153b. The methane source 8153a is coupled to a first reactant valve 8151a having a corresponding actuator 8152a, and the carbon dioxide source 8153b is coupled to a second reactant valve 8151b having a corresponding actuator 8152b. The reactants pass into the reaction vessel 8101 and are conducted upwardly around the second reaction zone 8120 and the first reaction zone 8110 as indicated by arrows A. As the reactants travel through the reactor vessel 8101, they can receive heat from the first and second reaction zones 8110, 8120 and from products passing from the first reaction zone 8110 to the second reaction zone 8120, as will be described in further detail later. The reactants enter the first reaction zone 8110 at a first reactant port 8111. At the first reaction zone 8110, the reactants can undergo the following reaction:

$$CH_4+CO_2+HEAT \rightarrow 2CO+2H_2 \quad \text{[Equation 20]}$$

In a particular embodiment, the foregoing endothermic reaction is conducted at about 900° C. and at pressures of up to about 1,500 psi. In other embodiments, reactions with other reactants can be conducted at other temperatures at the first reaction zone 8110. The first reaction zone 8110 can include any of a variety of suitable catalysts, for example, a nickel/aluminum oxide catalyst. In particular embodiments, the reactants and/or the first reaction zone 8110 can be subjected to acoustic pressure fluctuation (in addition to the overall pressure changes caused by introducing reactants, undergoing the reaction, and removing products from the first reaction zone 8110) to aid in delivering the reactants to the reaction sites of the catalyst. In any of these embodiments, the products produced at the first reaction zone 8110 (e.g. carbon monoxide and hydrogen) exit the first reaction zone 8110 at a first product port 8112 and enter a first heat exchanger 8140a. The first products travel through the first heat exchanger 8140a along a first flow path 8141 and transfer heat to the incoming reactants traveling along a second flow path 8142. Accordingly, the incoming reactants can be preheated at the first heat exchanger 8140a, and by virtue of passing along or around the outside of the first reaction zone 8110. In particular embodiments, one or more surfaces of the first heat exchanger 8140a can include elements or materials that absorb radiation at one frequency and re-radiate it at another. Further details of suitable materials and arrangements are disclosed in Section 3.2 above.

The first products enter the second reaction zone 8120 via a second reactant port 8121 and a check valve 8156 or other flow inhibitor. The check valve 8156 is configured to allow a one-way flow of the first products into the second reaction zone 8120 when the pressure of the first products exceeds the pressure in the second reaction zone 8120. In other embodiments, the check valve 8156 can be replaced with another mechanism, e.g., a piston or pump that conveys the first products to the second reaction zone 8120.

At the second reaction zone 8120, the first products from the first reaction zone 8110 undergo an exothermic reaction, for example:

$$2CO+2H_2+2'H_2 \rightarrow CH_3OH+HEAT \quad \text{[Equation 21]}$$

The foregoing exothermic reaction can be conducted at a temperature of approximately 250° C. and in many cases at a pressure higher than that of the endothermic reaction in the first reaction zone 8110. To increase the pressure at the second reaction zone 8120, the system 8100 can include an additional constituent source 8154 (e.g. a source of hydrogen) that is provided to the second reaction zone 8120 via a valve 8151c and corresponding actuator 8152c. The additional constituent (e.g. hydrogen, represented by 2'H$_2$ in Equation 21) can pressurize the second reaction zone with or without necessarily participating as a consumable in the reaction identified in Equation 21. In particular, the additional hydrogen may be produced at pressure levels beyond 1,500 psi, e.g., up to about 5,000 psi or more, to provide the increased pressure at the second reaction zone 8120. In a representative embodiment, the additional hydrogen may be provided in a separate dissociation reaction using methane or another reactant. For example, the hydrogen can be produced in a separate endothermic reaction, independent of the reactions at the first and second reaction zones 8110, 8120, as follows:

$$CH_4 + HEAT \rightarrow C + 2H_2 \qquad \text{[Equation 22]}$$

In addition to producing hydrogen for pressurizing the second reaction zone 8120, the foregoing reaction can produce carbon suitable to serve as a building block in the production of any of a variety of suitable end products, including polymers, self-organizing carbon-based structures such as graphene, carbon composites, and/or other materials. Further examples of suitable products are included in co-pending U.S. application Ser. No. 12/027,214 previously concurrently herewith and incorporated herein by reference.

The reaction at the second reaction zone 8120 can be facilitated with a suitable catalyst, for example, copper, zinc, aluminum and/or compounds including one or more of the foregoing elements. The product resulting from the reaction at the second reaction zone 8120 (e.g. methanol) is collected at the product collector 8123. Accordingly, the methanol exits the second reaction zone 8120 at a second product port 8122 and passes through a second heat exchanger 8140b. At the second heat exchanger 8140b, the methanol travels along a third flow path 8143 and transfers heat to the incoming constituents provided to the first reaction zone 8110 along a fourth flow path 8144. Accordingly, the two heat exchangers 8140a, 8140b can increase the overall efficiency of the reactions taking place in the reactor vessel 8101 by conserving and recycling the heat generated at the first and second reaction zones.

In a particular embodiment, energy is provided to the first reaction zone 8110 via the solar concentrator 8103 described above with reference to FIG. 22. Accordingly, the energy provided to the first reaction zone 8110 by the solar collector 8103 will be intermittent. The system 8100 can include a supplemental energy source that allows the reactions to continue in the absence of sufficient solar energy. In particular, the system 8100 can include a supplemental heat source 8155. For example, the supplemental heat source 8155 can include a combustion reactant source 8155a (e.g. providing carbon monoxide) and an oxidizer source 8155b (e.g. providing oxygen). The flows from the reactant source 8155a and oxidizer source 8155b are controlled by corresponding valves 8151d, 8151e, and actuators 8152d, 8152e. In operation, the reactant and oxidizer are delivered to the reactor vessel 8101 via corresponding conduits 8157a, 8157b. The reactant and oxidizer can be preheated within the reactor vessel 8101, before reaching a combustion zone 8130, as indicated by arrow B. At the combustion zone 8130, the combustion reactant and oxidizer are combusted to provide heat to the first reaction zone 8110, thus supporting the endothermic reaction taking place within the first reaction zone 8110 in the absence of sufficient solar energy. The result of the combustion can also yield carbon dioxide, thus reducing the need for carbon dioxide from the carbon dioxide source 8153b. The controller 8190 can control when the secondary heat source 8155 is activated and deactivated, e.g., in response to a heat or light sensor.

In another embodiment, the oxygen provided by the oxidizer source 8155b can react directly with the methane at the combustion zone 8130 to produce carbon dioxide and hydrogen. This in turn can also reduce the amount of carbon dioxide required at the first reaction zone 8110. Still further embodiments of suitable exothermic/endothermic reactors are disclosed in pending U.S. application Ser. No. 13/027,060, filed Feb. 14, 2011, and incorporated herein by reference.

From the foregoing, it will be appreciated that specific embodiments of the presently disclosed technology have been described herein for purposes of illustration, but that various modifications may be made without deviating from the presently disclosed technology. For example, while particular embodiments are described above in the context of hydrocarbon feedstock materials and, more particularly, methane, other embodiments can include other suitable hydrocarbon and non-hydrocarbon feedstock materials. For example, suitable hydrocarbon feedstock materials can include ethane, propane, and butane, among others. In some embodiments, a hydrocarbon feedstock material can include a hazardous (e.g., carcinogenic) compound, such as benzene or other polycyclic aromatic hydrocarbons. In such instances, systems configured in accordance with embodiments of the present technology can dispose of the harmful compounds (e.g., by processing them into harmless or less harmful compounds).

The methods disclosed herein include and encompass, in addition to methods of making and using the disclosed devices and systems, methods of instructing others to make and use the disclosed devices and systems. For example, a method in accordance with a particular embodiment includes operating a fuel cell in a first mode to react a feedstock material by a first reaction to produce a product, recovering the product from the fuel cell, operating the fuel cell in a second mode to react the feedstock material by a second reaction to produce electricity, and switching between operating the fuel cell in the first mode and operating the fuel cell in the second mode in response to an increase in demand for electricity, a decrease in demand for the product, or both. A method in accordance with another embodiment includes instructing such a method. Accordingly, any and all methods of use and manufacture disclosed herein also fully disclose and enable corresponding methods of instructing such methods of use and manufacture.

Certain aspects of the technology described in the context of particular embodiments may be combined or eliminated in other embodiments. For example, the heat exchangers, combustors, and/or hydrogen fuel cells described in the context of FIG. 1 can be applied to the arrangement described with reference to FIG. 4. The following U.S. non-provisional applications describe additional embodiments of thermochemical reactors and associated systems, are filed concurrently herewith, and are incorporated herein by reference:

U.S. Ser. No. 13/584,741, titled "SYSTEM AND METHOD FOR COLLECTING AND PROCESSING PERMAFROST GASES, AND FOR COOLING PERMAFROST";

U.S. Ser. No. 13/584,688, titled "GEOTHERMAL ENERGIZATION OF A NON-COMBUSTION CHEMICAL REACTOR AND ASSOCIATED SYSTEMS AND METHODS";

U.S. Ser. No. 13/584,773, titled "SYSTEMS AND METHODS FOR PROVIDING SUPPLEMENTAL AQUEOUS THERMAL ENERGY";

U.S. Ser. No. 13/584,708, titled "SYSTEMS AND METHODS FOR EXTRACTING AND PROCESSING GASES FROM SUBMERGED SOURCES";

U.S. Ser. No. 13/584,749, titled "MOBILE TRANSPORT PLATFORMS FOR PRODUCING HYDROGEN AND STRUCTURAL MATERIALS, AND ASSOCIATED SYSTEMS AND METHODS"; and U.S. Ser. No. 13/584,786, titled "REDUCING AND/OR HARVESTING DRAG ENERGY FROM TRANSPORT VEHICLES, INCLUDING FOR CHEMICAL REACTORS, AND ASSOCIATED SYSTEMS AND METHODS".

Further, while advantages associated with certain embodiments of the technology have been described in the context of those embodiments, other embodiments may also exhibit such advantages, and not all embodiments need necessarily exhibit such advantages to fall within the scope of the presently disclosed technology. Accordingly, the present disclosure and associated technology can encompass other embodiments not expressly shown or described herein.

I claim:

1. A fuel-cell system, comprising:
a first electrode positioned in a first region of the system, the first region positioned to receive a feedstock material;
a second electrode positioned in a second region of the system;
an ion-transport medium positioned between the first and second regions;
an electrical circuit extending between the first and second electrodes; and
a controller including memory and processing circuitry, wherein—
the system is operable in a first mode to react a first mass of the feedstock material in the absence of oxygen by a non-electricity-generating reaction to produce a product,
the system is operable in a second mode to react a second mass of the same feedstock material by an electricity-generating reaction to produce electricity, and
the memory stores non-transitory instructions that, when executed by the controller using the processing circuitry, cause the system to switch between operating in the first mode and operating in the second mode in response to an input corresponding to a change in demand for electricity, a change in demand for the product, or both.

2. The system of claim 1, further comprising a photovoltaic cell, wherein the input corresponds to a level of electricity generation by the photovoltaic cell, a level of light incident on the photovoltaic cell, or both.

3. The system of claim 1, further comprising a storage receptacle positioned to receive the product, wherein the input corresponds to a quantity of the product within the storage receptacle.

4. The system of claim 1 wherein the electrical circuit is operably connected to an electrical grid.

5. The system of claim 1, further comprising an auxiliary fuel cell configured to react the product to produce electricity.

6. The system of claim 5 wherein:
the product is a non-gaseous product;
the non-electricity-generating reaction further produces a gaseous product;
the auxiliary fuel cell is a first auxiliary fuel cell; and
the system further comprises a second auxiliary fuel cell configured to react the gaseous product to produce electricity.

7. A method, comprising:
operating a fuel cell in a first mode to react a first mass of a feedstock material by a first reaction preferentially relative to a second reaction so as to produce a non-gaseous product, the first reaction not being a split reduction-oxidation reaction;
recovering the non-gaseous product from the fuel cell;
operating the fuel cell in a second mode to react a second mass of the same feedstock material by the second reaction preferentially relative to the first reaction so as to produce electricity, the second reaction being a split reduction-oxidation reaction; and
switching between operating the fuel cell in the first mode and operating the fuel cell in the second mode in response to an increase in demand for electricity, a decrease in demand for the product, or both.

8. The method of claim 7, further comprising changing from operating the fuel cell in the second mode to operating the fuel cell in the first mode in response to a decrease in demand for electricity, an increase in demand for the product, or both.

9. The method of claim 7, further comprising storing the product in a storage receptacle after recovering the product.

10. The method of claim 7, wherein:
the fuel cell is operably connected to an electrical grid; and
the method further comprises switching between operating the fuel cell in the first mode and operating the fuel cell in the second mode in response to a change between an off-peak period and a peak period of power consumption within the electrical grid.

11. The method of claim 7 wherein:
the first reaction further produces a gaseous product; and
the method further comprises—
reacting the non-gaseous product in a first auxiliary fuel cell to produce electricity, and
reacting the gaseous product in a second auxiliary fuel cell to produce electricity.

12. A fuel-cell system, comprising:
a first electrode positioned in a first region of the system, the first region positioned to receive a feedstock material;
a second electrode positioned in a second region of the system;
a material collector in the first region, the material collector positioned to collect a non-gaseous product from a non-electricity-generating reaction in which a first mass of the feedstock material is a reactant during operation of the system in a first mode;
an ion-transport medium positioned between the first and second regions, the ion-transport medium being configured to convey an ionic reactant or product in an electricity-generating reaction in which a second mass of the same feedstock material is a reactant during operation of the system in a second mode;
an electrical circuit extending between the first and second electrodes;
an auxiliary fuel cell positioned to receive a gaseous product from the non-electricity-generating reaction during operation of the system in the first mode; and
a processing unit separate from the material collector, wherein the processing unit is configured to process the non-gaseous product using electricity from the electrical circuit, the auxiliary fuel cell, or both.

13. A method, comprising:
operating a fuel cell in a first mode to react a first mass of a feedstock material by a first reaction preferentially relative to a second reaction so as to produce a non-gaseous product and a gaseous product, the first reaction not being a split reduction-oxidation reaction;
recovering the non-gaseous product from the fuel cell;

operating the fuel cell in a second mode to react a second mass of the same feedstock material by the second reaction preferentially relative to the first reaction so as to produce electricity, the second reaction being a split reduction-oxidation reaction;

operating an auxiliary fuel cell to react the gaseous product by a third reaction to produce electricity, the third reaction being a split reduction-oxidation reaction; and processing the non-gaseous product using at least a portion of the electricity from operating the fuel cell in the second mode, operating the auxiliary fuel cell, or both.

14. The method of claim 13 wherein:
the non-gaseous product includes silicon; and
processing the product includes reacting the product with nitrogen to form silicon nitride.

15. The method of claim 13 wherein processing includes annealing the non-gaseous product.

16. The method of claim 13 wherein processing includes shaping the non-gaseous product.

17. A fuel-cell system, comprising:
a first electrode positioned in a first region of the system, the first region positioned to receive a feedstock material;
a second electrode positioned in a second region of the system;
an ion-transport medium positioned between the first and second regions;
an electrical circuit extending between the first and second electrodes; and
a controller including memory and processing circuitry, wherein—
the system is operable in a first mode to react a first mass of the feedstock material by a non-electricity-generating reaction preferentially relative to an electricity-generating reaction so as to produce a non-gaseous product,
the system is operable in a second mode to react a second mass of the same feedstock material by the electricity-generating reaction preferentially relative to the non-electricity-generating reaction so as to produce electricity, and
the memory stores non-transitory instructions that, when executed by the controller using the processing circuitry, cause the system to switch between operating in the first mode and operating in the second mode at a rate within a range from about 60 to about 960,000 times per minute.

18. The system of claim 17, further comprising a switch operably connected to the electrical circuit, wherein the instructions, when executed by the controller using the processing circuitry, cause the system to switch between operating in the first mode and operating in the second mode by changing a state of the switch.

19. The system of claim 18 wherein the instructions, when executed by the controller using the processing circuitry, cause the system to switch between operating in the first mode and operating in the second mode by pulse-width modulation using the switch.

20. The system of claim 19 wherein a duty cycle of the pulse-width modulation is less than 60%.

21. A method, comprising:
operating a fuel cell in a first mode to react a first mass of a feedstock material by a first reaction preferentially relative to a second reaction so as to produce a non-gaseous product, the first reaction not being a split reduction-oxidation reaction;
recovering the non-gaseous product from the fuel cell;
operating the fuel cell in a second mode to react a second mass of the same feedstock material by the second reaction preferentially relative to the first reaction so as to produce electricity, the second reaction being a split reduction-oxidation reaction; and
switching between operating the fuel cell in the first mode and operating the fuel cell in the second mode at a rate within a range from about 60 to about 960,000 times per minute.

22. The method of claim 21 wherein switching between operating the fuel cell in the first mode and operating the fuel cell in the second mode includes switching between operating the fuel cell in the first mode and operating the fuel cell in the second mode by changing a state of a switch operably connected to an electrical circuit of the fuel cell.

23. The method of claim 22 wherein switching between operating the fuel cell in the first mode and operating the fuel cell in the second mode includes switching between operating the fuel cell in the first mode and operating the fuel cell in the second mode by pulse-width modulation using the switch.

24. The method of claim 23 wherein a duty cycle of the pulse-width modulation is less than 60%.

* * * * *